(12) United States Patent
Koukis

(10) Patent No.: US 8,266,021 B2
(45) Date of Patent: Sep. 11, 2012

(54) SYSTEM AND METHOD FOR PROVIDING REFERENCE COST OF FRAUD DATA RELATED TO FINANCIAL PRESENTATION DEVICES THAT ARE PRESENTABLE TO PROVIDERS OF GOODS OR SERVICES

(75) Inventor: Stephen C. Koukis, San Mateo, CA (US)

(73) Assignee: Visa International Service Association, San Francisco, CA (US)

( * ) Notice: Subject to any disclaimer, the term of this patent is extended or adjusted under 35 U.S.C. 154(b) by 340 days.

(21) Appl. No.: 12/123,019

(22) Filed: May 19, 2008

(65) Prior Publication Data

US 2008/0288377 A1 Nov. 20, 2008

Related U.S. Application Data

(60) Provisional application No. 60/938,897, filed on May 18, 2007.

(51) Int. Cl.
*G07B 17/00* (2006.01)
*G07F 19/00* (2006.01)
(52) U.S. Cl. .......................................................... 705/30
(58) Field of Classification Search .................. 705/1.1, 705/30
See application file for complete search history.

(56) References Cited

U.S. PATENT DOCUMENTS

| | | | |
|---|---|---|---|
| 6,714,918 B2 | 3/2004 | Hillmer et al. | |
| 2002/0099649 A1 | 7/2002 | Lee et al. | |
| 2005/0108084 A1 | 5/2005 | Ramamoorti et al. | |
| 2005/0149759 A1 | 7/2005 | Vishwanath et al. | |
| 2005/0209876 A1* | 9/2005 | Kennis et al. ..................... 705/1 |
| 2008/0010166 A1* | 1/2008 | Yang et al. ....................... 705/26 |
| 2008/0086342 A1* | 4/2008 | Curry et al. ...................... 705/7 |
| 2008/0086409 A1 | 4/2008 | Moorman et al. | |
| 2008/0109272 A1* | 5/2008 | Sheopuri et al. ................. 705/7 |

OTHER PUBLICATIONS

Edward J. Kane, Can the European community afford to neglect the need for more accountable safety-net management? Atlantic Economic Journal, 34, 2, 127(18) Jun. 2006.*
PCT International Search Report for PCT/US2008/064081 dated Sep. 3, 2008.

* cited by examiner

*Primary Examiner* — Matthew Gart
*Assistant Examiner* — Seye Iwarere
(74) *Attorney, Agent, or Firm* — Kilpatrick Townsend & Stockton

(57) ABSTRACT

A system for providing industry-wide reference cost of fraud data related to financial presentation devices that are presentable to providers of goods and services is provided. A fraud assessment module executable by a processor of the system receives, from multiple business entities, sales data and operating cost data both related to financial presentation devices. The fraud assessment module determines, based on the received data, the reference cost of fraud data including a direct fraud loss, fraud operating cost and opportunity cost for use by individual entities as benchmark cost of fraud data.

24 Claims, 40 Drawing Sheets

FIG. 7A1

SUMMARY OF INPUTS (ISSUER)

| SALES UNITS | |
|---|---|
| Card Issuance | Do accounts share common card numbers? Number of Accounts (avg); Number of Cards (avg) [Purchases]; Value of Portfolio Net Sales Volume (avg); Value of Portfolio Net Cash Volume (avg); Annual Interest Rate Charged (avg); Interchange Fee Rate (avg); Value of Sales Transaction (avg); Value of Sales Transaction[Fraud Victim (avg)]; Value of Sales Transaction [Compromised Account (avg)]; Number of Transactions Per Cardholder (avg); Days to Balance Payoff (avg); Revolving Customers Rate (%) |
| Card Replacements | Days to Card Replacement (avg); Card Production Costs [Mag Stripe (per card)]; Magnetic Stripe Cards (%;) Card Production Costs [ICC (per card)]; ICC Cards (%;) Card Delivery Costs (per card) [Normal]; Fraud-related Card Delivery [Normal (%)]; Card Delivery Costs (per card)[Expedited]; Fraud-related Card Delivery [Expedited (%)]; Other Costs (per card) |
| PIN Delivery | Number of PINs Delivered; PIN Delivery Costs (per PIN) [Normal]; PINs Delivered [Normal (%)]; PIN Delivery Costs (per PIN)[Other]; PINs Delivered [Other (%)] |
| CUSTOMER SERVICE | |
| Inbound | Call Received Cost (avg unit cost); Number of Inquiries per Fraud Case (avg); Number of Inquiries per Compromised Account (avg) |
| Outbound | Call Cost - Cable (avg unit cost); Number of Calls per Fraud Case [Cable (avg)]; Number of Calls per Compromised Account [Cable (avg)]; Call Cost [Mobile (avg unit cost)]; Number of Calls per Fraud Case [Mobile (avg)]; Number of Calls per Compromised Account [Mobile (avg)] | to FIG. 7A2 from FIG. 7A1

| New Card Activation | Activation Cost [IVR (avg unit cost)]; Cards Activated [IVR Method (%)]; Activation Cost [ATM (avg unit cost)]; Cards Activated [ATM Method (%)]; Activation Cost [Letter (avg unit cost)]; Cards Activated [Letter Method (%)]; Activation Cost [Other (avg unit cost)]; Cards Activated [Other Method (%)] |
|---|---|
| FRAUD OPERATIONS | |
| Authorization | Number of Declines; Fraud-related Declines (%); Incorrect Fraud-related Declines (%); Number of Referrals; Fraud-related Referrals (%); Fraud-related Referrals Declined (%); Fraud-related Referrals Incorrectly Declined (%) |
| Recoveries & Chargeoffs | Value of Gross Fraud Chargeoffs; Cardholder Fraud Responsibility (% or amount); Cardholder Fraud Responsibility Unrecovered (avg); Value of Fraud-related Merchant Chargebacks; Value of Fraud-related Representments; Value of Fraud Insurance Recoveries (avg) |
| Exception Handling | Value of Fraud Case (avg); Number of Fraud Cases Reported; Number of Transactions per Fraud Case (avg); Number of Compromised Account Cases Reported; Number of Fraudulent Transactions per Compromised Account (avg); Number of Customer Disputes; Number of Fraud-related Customer Disputes; First Party Fraud Rate (%); Value of Net Credit Chargeoffs |
| Bankcard Processing | Authorization Fee per Transaction (avg); Settlement Fee per Transaction (avg); Value of Fraud-related Processing Fees |
| Other | Value of Fraud Insurance Premiums; Value of Fraud-related Legal Fees; Value of Other Fraud Losses | to FIG. 7B1

FIG. 7A2 from FIG. 7A2

| HUMAN RESOURCES | |
|---|---|
| Staff Costs | Are staff costs reported on a fully loaded/all-inclusive basis? Prevention Analysts Costs (avg); Other Prevention Analysts Costs (avg); Alert Staff Costs (avg); Other Alert Staff Costs (avg); Chargeback Staff Costs (avg) [Detection]; Other Chargeback Staff Costs (avg) [Detection]; Chargeback Staff Costs (avg) [Recovery]; Other Chargeback Staff Costs (avg) [Recovery]; Administrative Staff Costs (avg) [Detection]; Other Administrative Staff Costs (avg) [Detection]; Administrative Staff Costs (avg) [Recovery]; Other Administrative Staff Costs (avg) [Recovery]; Supervisory Staff Costs (avg) [Detection]; Other Supervisory Staff Costs (avg) [Detection]; Supervisory Staff Costs (avg) [Recovery]; Other Supervisory Staff Costs (avg) [Recovery]; Management Staff Costs (avg); Other Management Staff Costs (avg) |
| Prevention | Number of Prevention Analysts (FTE) |
| Detection | Number of Alert Staff (FTE); Number of Chargeback Specialists (FTE); Number of Administrative Assistants (FTE); Number of Supervisors (FTE); Number of Managers (FTE) |
| Investigation & Recovery | Number of Chargeback Specialists (FTE); Number of Administrative Assistants (FTE); Number of Supervisors (FTE) |
| OVERHEAD | |
| Overhead costs | Where are fraud Prevention/ Detection/ Recovery efforts conducted? Rent/Lease Costs; Computer Equipment Costs; Utilities Costs; Telephone Costs; Other Costs |
| Prevention | Prevention; Rent/Lease Costs; Computer Equipment Costs; Utilities Costs; Telephone Costs; Other Costs |
| Detection | Detection; Rent/Lease Costs; Computer Equipment Costs; Utilities Costs; Telephone Costs; Other Costs | to FIG. 7B2

FIG. 7B1 from FIG. 7B1

| | |
|---|---|
| Investigation & Recovery | Investigation & Recovery; Rent/Lease Costs; Computer Equipment Costs; Utilities Costs; Telephone Costs; Other Costs |
| SYSTEMS & SERVICES | |
| Authorization | What % of Authorization Systems Use is Attributable to Fraud? Depreciation Costs; Licensing Costs; Hardware Costs; Maintenance Costs; Staff Costs (FTE); Other Costs |
| Detection | Depreciation Costs; Licensing Costs; Hardware Costs; Maintenance Costs; Staff Costs (FTE); Other Costs |
| Analysis | Depreciation Costs; Licensing Costs; Hardware Costs; Maintenance Costs; Staff Costs (FTE); Other Costs |
| Chargeback Management | What % of Chargeback Management Systems Use is Attributable to Fraud? Depreciation Costs; Licensing Costs; Hardware Costs; Maintenance Costs; Staff Costs (FTE); Other Costs |
| PIN Management | Depreciation Costs; Licensing Costs; Hardware Costs; Maintenance Costs; Staff Costs (FTE); Other Costs |
| OPERATING EXPENSES | |
| Compliance | Value of Technology Investments; Compliance Audit Costs; Scan Costs; Value of Fines & Penalties; Other Compliance Costs |
| Training | Fraud-related Training Costs |
| Other Operating Expenses | Postal Costs; Copy/Fax/Print Costs; Office Supply Costs; Other Costs |

FIG. 7B2

| SUMMARY OF INPUTS (ACQUIRER) | |
|---|---|
| SALES UNITS | |
| Merchants | Number of Merchants (avg); Number of Transactions (avg); Merchant Discount Rate (%); Interchange Rate (avg); Merchant Sales Volume (avg) |
| CUSTOMER SERVICE | |
| Inbound | Call Received Cost (avg unit cost); Number of Inquiries per Fraud Case (avg) |
| Otbound | Call Cost - Cable (avg unit cost); Number of Calls per Fraud Case [Cable (avg)]; Call Cost [Mobile (avg unit cost)]; Number of Calls per Fraud Case [Mobile (avg)] |
| FRAUD OPERATIONS | |
| Authorization | Number of Incorrect Fraud-related Declines |
| Recoveries & Chargeoffs | Value of Chargebacks from Issuer; Value of Fraud-related Merchant Chargebacks; Value of Fraud-related Representments; Value of Fraud Insurance Recoveries (avg) |
| Exception Handling | Number of Fraud Cases Reported; Number of Merchant Disputes; Number of Fraud-related Merchant Disputes |
| Bankcard Processing | Authorization Fee per Transaction (avg); Settlement Fee per Transaction (avg); Value of Fraud-related Processing Fees |
| Other | Value of Fraud Insurance Premiums; Value of Fraud-related Legal Fees; Value of Fraud-related Opportunity Costs; Value of PIN-Based Security Upgrades & Enhancements; Value of Other Fraud Losses |

FIG. 7C1 to FIG. 7C2 from FIG. 7C1

| HUMAN RESOURCES | |
|---|---|
| Staff Costs | Are staff costs reported on a fully loaded/all-inclusive basis? Prevention Analysts Costs (avg); Other Prevention Analysts Costs (avg); Alert Staff Costs (avg); Other Alert Staff Costs (avg); Chargeback Staff Costs (avg) [Detection]; Other Chargeback Staff Costs (avg) [Detection]; Chargeback Staff Costs (avg) [Recovery]; Other Chargeback Staff Costs (avg) [Recovery]; Administrative Staff Costs (avg) [Detection]; Other Administrative Staff Costs (avg)[Detection]; Administrative Staff Costs (avg) [Recovery]; Other Administrative Staff Costs (avg)[Recovery]; Supervisory Staff Costs (avg) [Detection]; Other Supervisory Staff Costs (avg) [Detection]; Supervisory Staff Costs (avg) [Recovery]; Other Supervisory Staff Costs (avg) [Recovery]; Management Staff Costs (avg); Other Management Staff Costs (avg); |
| Prevention | Number of Prevention Analysts (FTE) |
| Detection | Number of Alert Staff (FTE); Number of Chargeback Specialists (FTE); Number of Administrative Assistants (FTE); Number of Supervisors (FTE); Number of Managers(FTE); |
| Investigation & Recovery | Number of Chargeback Specialists (FTE); Number of Administrative Assistants (FTE); Number of Supervisors (FTE) | to FIG. 7D

FIG. 7C2 from FIG. 7C2

| OVERHEAD | | |
|---|---|---|
| | Overhead costs | Where are fraud Prevention/ Detection/ Recovery efforts conducted? Rent/Lease Costs; Computer Equipment Costs; Utilities Costs; Telephone Costs; Other Costs |
| | Prevention | Prevention; Rent/Lease Costs; Computer Equipment Costs; Utilities Costs; Telephone Costs; Other Costs |
| | Detection | Detection; Rent/Lease Costs; Computer Equipment Costs; Utilities Costs; Telephone Costs; Other Costs |
| | Investigation & Recovery | Investigation & Recovery; Rent/Lease Costs; Computer Equipment Costs; Utilities Costs; Telephone Costs; Other Costs |
| SYSTEMS & SERVICES | | |
| | Detection | Depreciation Costs; Licensing Costs; Hardware Costs; Maintenance Costs; Staff Costs (FTE); Other Costs |
| | Analysis | Depreciation Costs; Licensing Costs; Hardware Costs; Maintenance Costs; Staff Costs (FTE); Other Costs |
| | Chargeback Management | What % of Chargeback Management Systems Use is Attributable to Fraud? Depreciation Costs; Licensing Costs; Hardware Costs; Maintenance Costs; Staff Costs (FTE); Other Costs |
| | PIN Management | Depreciation Costs; Licensing Costs; Hardware Costs; Maintenance Costs; Staff Costs (FTE); Other Costs |
| OPERATING EXPENSES | | |
| | Compliance | Value of Technology; Investments; Compliance Audit Costs; Scan Costs; Value of Fines & Penalties; Other Compliance Costs |
| | Training | Fraud-related Training Costs |
| | Other Operating Expenses | Postal Costs; Copy/Fax/Print Costs; Office Supply Costs; Other Costs | to FIG. 7E

FIG. 7D from FIG. 7D

SUMMARY OF INPUTS (MERCHANT)

| SALES UNITS | |
|---|---|
| Sales Transactions | |
| Card Present | Number of Points of Sale; Number of Transactions per Point of Sale (avg) |
| Card Not Present | Number of Transactions Recurring (%); E-Commerce (%); Mail Order/ Telephone Order (%); Other (%) |
| Credit | Credit Card Transaction (%); Value of Sales Transaction (avg); Value of Fraud-related Sales Transaction (avg) |
| Debit | Debit Card Transaction (%); Value of Sales Transaction (avg); Value of Fraud-related Sales Transaction (avg) |
| Other | Other Transaction (%); Value of Sales Transaction (avg); Value of Fraud-related Sales; Transaction (avg) |
| CUSTOMER SERVICE | |
| Inbound | Call Received Cost (avg unit cost); Number of Inquiries per Fraud-related Dispute (avg) |
| Outbound | Call Cost - Cable (avg unit cost); Number of Calls per Fraud-related Dispute [Cable (avg)]; Call Cost [Mobile (avg unit cost)]; Number of Calls per Fraud-related Dispute [Mobile (avg)] |
| FRAUD OPERATIONS | |
| What % of Loss Prevention is attributable to Fraud Operations? | |
| Authorization | Value of Incorrect Declines - Issuer; Value of Incorrect Declines [Merchant] |
| Recoveries & Chargeoffs | Number of Disputes; Fraud-related Disputes (%); Number of Fraud-related Chargebacks; Value of Fraud-related Chargeback (avg); Number of Fraud Claims Directly Credited; Value of Fraud Claims Directly Credited; Value of Fraud Insurance Recoveries (avg) | to FIG. 7E2

FIG. 7E1 from FIG. 7E1

| Other | Value of Fraud-related Legal Fees; Value of Fraud Insurance Premiums; Value of Fraud-related Opportunity Costs; Value of Other Fraud Losses |
|---|---|
| HUMAN RESOURCES | |
| Staff Costs | Are staff costs reported on a fully loaded/all-inclusive basis? Loss Prevention Analysis Staff Costs (avg); Other Loss Prevention Analysis Staff Costs (avg); Copy Request Analysis Staff Costs (avg); Other Copy Request Analysis Staff Costs (avg); Loss Prevention Management Staff Costs (avg); Other Loss Prevention Management; Staff Costs (avg); Copy Request Management Staff Costs (avg); Other Copy Request Management Staff Costs (avg) |
| Analysis | Number of Loss Prevention Analysts (FTE); Number of Copy Request Analysts (FTE) |
| Management | Number of Loss Prevention Managers (FTE); Number of Copy Request Managers (FTE) |
| OVERHEAD | |
| What % of Facilities is attributable to Loss Prevention? | |
| Facilities | Rent/Lease Costs; Computer Equipment Costs; Utilities Costs; Telephone Costs; Other Costs; Facility Size (square feet/meters) |
| Loss Prevention | Rent/Lease Costs; Computer Equipment Costs; Utilities Costs; Telephone Costs; Other Costs; Misc. Loss Prevention Costs |
| Fraud Operations | Rent/Lease Costs; Computer Equipment Costs; Utilities Costs; Telephone Costs; Other Costs; Misc. Fraud Management Costs |
| SYSTEMS & SERVICES | |
| In-House | |
| Payer Authorization | Depreciation Costs; Licensing Costs; Hardware Costs; Maintenance Costs; Staff Costs (FTE); Transaction Fees; Other Costs | to FIG. 7E3

FIG. 7E2 from FIG. 7E2

| | |
|---|---|
| Dispute Management | Depreciation Costs; Licensing Costs; Hardware Costs; Maintenance Costs; Staff Costs (FTE); Transaction Fees; Other Costs |
| Other | Depreciation Costs; Licensing Costs; Hardware Costs; Maintenance Costs; Staff Costs (FTE); Transaction Fees; Other Costs |
| Outsourced | |
| Address Verification | Licensing Costs; Hardware Costs; Maintenance Costs; Transaction Fees; Other Costs |
| Card Verification | Licensing Costs; Hardware Costs; Maintenance Costs; Transaction Fees; Other Costs; Value of Managed Fraud Prevention Services; Value of External Decision Models |
| OPERATING EXPENSES | |
| Compliance | Value of Technology Investments; Compliance Audit Costs; Scan Costs; Value of Fines & Penalties; Other Compliance Costs |
| Training | Fraud-related Training Costs; Value of General/Other Fraud-related Loss Prevention |
| Other Operating Expenses | Postal Costs; Fraud-related Postal Costs; Copy/Fax/Print Costs; Fraud-related Copy/Fax/Print Costs; Office Supply Costs; Fraud-related Office Supply Costs; Other Costs; Other Fraud-related Costs |

FIG. 7E3

| Total Cost of Fraud Report | | | |
|---|---|---|---|
| Reporting Period | | 12 - Jan - 07   To | 12 - Apr - 07 |
| Total Annual Cost of Fraud (USD) Summary - Card Issuer | | | |
| Issuer Fraud Losses | $ 89,000.00 | | 1.67% |
| Issuer Fraud Operating Cost | $ 4,889,244.68 | | 91.98% |
|    Fraud Prevention | | $ 464,768.05 | 8.74% |
|    Fraud Detection | | $ 915,724.00 | 17.23% |
|    Fraud Investigation & Recoveries | | $ 658,356.86 | 12.39% |
|    Other Operational Costs | | $ 2,850,395.77 | 53.63% |
| First Party "Friendly" Fraud | $ 132,000.00 | | 2.48% |
| Opportunity Costs | $ 205,020.61 | | 3.86% |
| Total | $ 5,315,265.28 | | 100.00% |

F I G. 9

| ISSUER DATA ALLOCATION | |
|---|---|
| FRAUD LOSSES | |
| Net Fraud Chargeoffs | Gross Fraud Chargeoffs; Value of Chargeback Recoveries (Cardholder); Value of Fraud Insurance Recoveries (Merchant) |
| FRAUD PREVENTION | |
| Staff | |
| Analysis | Analysis; Earning, benefits, & taxes; Other |
| Authorization System | Depreciation; Licensing; Hardware; Maintenance; IT Staff; Other |
| PIN Management System | Depreciation; Licensing; Hardware; Maintenance; IT Staff; Other |
| Overhead | Rent/Lease, Computer Equipment; Utilities; Telephone, Other |
| FRAUD DETECTION | |
| Staff | |
| Alert Management | Alert Management; Earnings, benefits and taxes; Other |
| Administrative, | Administrative; Earnings, benefits and taxes; Other |
| Chargeback | Chargeback; Earnings, benefits and taxes; Other |
| Supervisory, | Supervisory; Earnings, benefits and taxes; Other |
| Management | Management; Earnings, benefits and taxes; Other |
| Fraud Detection System | Depreciation; Licensing; Hardware; Maintenance; IT Staff; Other |
| Fraud Analysis System | Depreciation; Licensing; Hardware; Maintenance; IT Staff; Other |
| Overhead | Rent/Lease, Computer Equipment; Utilities; Telephone; Other |
| FRAUD INVESTIGATION & RECOVERIES | |
| Staff | |
| Administrative | Administrative; Earnings, benefits and taxes; Other |
| Chargeback | Chargeback; Earnings, benefits and taxes; Other | to FIG. 11A2

FIG. 11A1

| | |
|---|---|
| Supervisory | Supervisory; Earnings, benefits and taxes; Other |
| Chargeback Management System | Depreciation; Licensing; Hardware; Maintenance; IT Staff; Other |
| Overhead | Rent/Lease; Computer Equipment; Utilities; Telephone; Other |
| Rent/Lease, Computer Equipment, Utilities, Telephone, Other | Cost of facility's rent/lease, computer equipment, utilities, telephone, & other expense [per square foot/meter or per employee] * (Total size or Total # of staff), [If facility is shared, use % allocation] |
| Legal Fees | Fraud-Related Legal Fees |
| Fraud Insurance | Fraud Insurance Premiums |
| Other/Miscellaneous Fraud Expenses | Other Fraud Losses | from FIG. 11A1 to FIG. 11B

FIG. 11A2 from FIG. 11A2

| OTHER OPERATIONAL COSTS | |
|---|---|
| Customer Service | |
| Inbound | (Fraud-related, Compromised Account) |
| Outbound | (Cable/Mobile-based Calls to Support Fraud Cases/Compromised Accounts |
| PIN Delivery | PIN Delivery |
| Bankcard Processing | Authorization & Settlement, Other |
| Card Reissue/ Replacement-Fraud | Production, Delivery, Activation, Other |
| Card Reissue/ Replacement-Compromised Accounts | Production, Delivery, Activation, Other |
| Compliance | Information Security, Fines & Penalties, Other |
| Training | Fraud-Related Training |
| Operating Expenses | Postal, Copy, Fax/Print, Office Supplies, Other |
| FIRST PARTY ("Friendly") Fraud | |
| Cost of First Party Fraud | Cost of First Party Fraud |
| OPPORTUNITY COSTS | |
| Lost Profits | |
| Lost Profits | Lost Profits; Lost Revenue |
| Lost Revenue | Incorrect Declines; Customer Reluctance; Card Unavailable |

FIG. 11B

| ACQUIRER DATA ALLOCATION | |
|---|---|
| FRAUD LOSSES | |
| Acquirer Fraud Losses via Chargebacks | *Value of Chargebacks from Issuer; Value of Chargeback Recoveries - Merchant; Fraud Insurance Recoveries* |
| FRAUD PREVENTION | |
| Staff | |
| Analysis | *Analysis; Earning, benefits, & taxes; Other* |
| PIN Management System | *Depreciation; Licensing; Hardware; Maintenance; IT Staff; Other* |
| PIN Based Security | *Upgrades & Enhancements* |
| Overhead | *Rent/Lease, Computer Equipment, Utilities, Telephone, Other* |
| FRAUD DETECTION | |
| Staff | |
| Alert Management | *Alert Management; Earnings, benefits and taxes; Other* |
| Administrative | *Administrative; Earnings, benefits and taxes; Other* |
| Chargeback | *Chargeback; Earnings, benefits and taxes; Other* |
| Supervisory | *Supervisory; Earnings, benefits and taxes; Other* |
| Management | *Management; Earnings, benefits and taxes; Other* |
| Fraud Detection System | *Depreciation; Licensing; Hardware; Maintenance; IT Staff; Other* |
| Fraud Analysis System | *Depreciation; Licensing; Hardware; Maintenance; IT Staff; Other* |
| Overhead | *Rent/Lease; Computer Equipment; Utilities; Telephone; Other* |
| FRAUD INVESTIGATION & RECOVERIES | |
| Staff | |
| Administrative | *Alert Management; Earnings, benefits, and taxes; Other* |
| Chargeback | *Chargeback; Earnings, benefits and taxes; Other* | to FIG. 12A2

FIG. 12A1 from FIG. 12A1

| | |
|---|---|
| Supervisory | Supervisory; Earnings, benefits and taxes; Other |
| Chargeback Management System | Depreciation; Licensing; Hardware; Maintenance; IT Staff; Other |
| Overhead | Rent/Lease; Computer Equipment; Utilities; Telephone; Other |
| Legal Fees | Fraud-Related Legal Fees |
| Fraud Insurance | Fraud Insurance Premiums |
| Other/Miscellaneous Fraud Expenses | Other Fraud Losses |
| OTHER OPERATIONAL COSTS | |
| Customer Service | |
| Inbound | Fraud-related Customer Inquiries |
| Outbound | Cable-based Calls to Support Fraud Cases; Mobile-based Calls to Support Fraud Cases |
| Compliance | Information Security, Fines & Penalties, and Other |
| Training | Fraud-Related Training |
| Bankcard Processing | Authorization, Settlement, and Other |
| Operating Expenses | Postal, Copy, Fax/Print, Office Supplies, Other |
| OPPORTUNITY COSTS | |
| Lost Profits | |
| Lost Profits | Lost Profits; Lost Revenue |
| Lost Revenue | Incorrect Declines; Other Opportunity Costs |

FIG. 12A2

| MERCHANT DATA ALLOCATION | |
|---|---|
| FRAUD LOSSES | |
| Merchant Fraud Losses | Value of Chargebacks; Value of Fraud Claims Directly Credited; Value of Fraud Insurance Recoveries |
| FRAUD LOSS PREVENTION | |
| Staff | Analysis-Loss Prevention; Earnings, benefits, & taxes; Other |
| Analysis-Copy Request | Analysis-Copy Request; Earnings, benefits, & taxes; Other |
| Management-Loss Prevention | Management-Loss Prevention; Earnings, benefits, & taxes; Other |
| Management-Copy Request | Management-Copy Request; Earnings, benefits, & taxes; Other |
| Systems & Services | |
| In-House | Depreciation; Licensing; Hardware; Maintenance; IT Staff; Transaction Fees; Other |
| Outsourced | Licensing; Hardware; Maintenance; Transaction Fees; Managed Fraud Prevention; External Models; Other |
| Overhead | Rent/Lease; Computer Equipment; Utilities; Telephone; Other; Misc. Fraud Management |
| Legal Fees | Fraud-Related Legal Fees |
| Fraud Insurance | Fraud Insurance Premiums |
| Other/Miscellaneous Fraud Expenses | Other Fraud Losses | to FIG. 13A2

FIG. 13A1 from FIG. 13A1

| OTHER OPERATIONAL COSTS | |
|---|---|
| Customer Service | |
| Inbound | Fraud-related Customer Inquiries |
| Outbound | Cable-based Calls to Support Fraud Disputes; Mobile-based Calls to Support Fraud Disputes |
| Compliance | Information Security; Fines & Penalties; Other |
| Training | Fraud-Related Training |
| Operating Expenses | Postal; Copy/Fax/Print; Office Supplies; Other |
| OPPORTUNITY COSTS | |
| Lost Profits | Lost Profits; Lost Revenue |
| Lost Revenue | Incorrect Declines; Other Opportunity Costs |

FIG. 13A2

| PERFORMANCE MEASURES (ISSUER) | |
| --- | --- |
| Item | Calculation |
| Issuer Total Fraud Cost per Account | [(Net Fraud Losses + Fraud Management Expense + Opportunity Costs) ISSUER] / (Number of Accounts) |
| Issuer Total Fraud Cost to Total Volume | [(Net Fraud Losses + Fraud Management Expense + Opportunity Costs) ISSUER] / (Net Sales Volume + Net Cash Volume) |
| Issuer Opportunity Cost per Account | [(Opportunity Costs) ISSUER] / (Number of Accounts) |
| Total Fraud Expense per Account | [(Net Fraud Losses + Fraud Mgmt. Expense)] / (Number of Accounts) |
| Issuer Total Fraud Expense per Account | [(Net Fraud Losses + Fraud Management Expense) ISSUER] / (Number of Accounts) |
| Issuer Total Fraud Expense to Total Volume | [(Net Fraud Losses + Fraud Management Expense) ISSUER] / (Net Sales Volume + Net Cash Volume) |
| Issuer Total Fraud Expense per Fraud Case | [(Net Fraud Losses + Fraud Management Expense) ISSUER] / (Number of Fraud Cases) |
| Issuer Fraud Management Expense per Account | [(Fraud Management Expense) ISSUER] / (Number of Accounts) |
| Net Fraud Losses to Total Volume | [(Net Fraud Losses) ISSUER] / (Net Sales Volume + Net Cash Volume) |
| Issuer Fraud Management Expense to Net Fraud Losses | [(Fraud Management Expense) ISSUER] / (Net Fraud Losses) | to FIG. 14B

FIG. 14A

| | from FIG. 14A |
|---|---|
| Number of Accounts per Issuer Fraud Management FTE Employee | [(Number of Accounts) ISSUER] / (Number of Prevention Analysts (FTE) + Number of Detection Alert Staff (FTE) + Number of Detection Chargeback Specialists (FTE) + Number of Detection Administrative Assistants (FTE) + Number of Detection Supervisors (FTE) + Number of Detection Managers (FTE) + Number of Investigation & Recovery Chargeback Specialists (FTE) + Number of Investigation & Recovery Administrative Assistants (FTE) + Number of Investigation & Recovery Supervisors (FTE) |
| Total Volume per Issuer Fraud Management FTE Employee (per month) | [(Net Sales Volume + Net Cash Volume) ISSUER] / (Number of Prevention Analysts (FTE) + Number of Detection Alert Staff (FTE) + Number of Detection Chargeback Specialists (FTE) + Number of Detection Administrative Assistants (FTE) + Number of Detection Supervisors (FTE) + Number of Detection Managers (FTE) + Number of Investigation & Recovery Chargeback Specialists (FTE) + Number of Investigation & Recovery Administrative Assistants (FTE) + Number of Investigation & Recovery Supervisors (FTE) |
| Compensation per Issuer Fraud Management FTE Employee (per month) | [(Total Prevention Staff Costs + Total Detection Staff Costs + Total Investigation & Recovery Staff Costs) ISSUER] / (Number of Prevention Analysts (FTE) + Number of Detection Alert Staff (FTE) + Number of Detection Chargeback Specialists (FTE) + Number of Detection Administrative Assistants (FTE) + Number of Detection Supervisors (FTE) + Number of Detection Managers (FTE) + Number of Investigation & Recovery Chargeback Specialists (FTE) + Number of Investigation & Recovery Administrative Assistants (FTE) + Number of Investigation & Recovery Supervisors (FTE) Note: Compensation figures above reflect fully-loaded costs. |
| Issuer Fraud Management Expense to Total Volume | [(Fraud Management Expense) ISSUER] / (Net Sales Volume + Net Cash Volume) |
| Number of Fraud-related Disputes per Total Disputes | [(Number of Fraud-related Customer Disputes) ISSUER] / (Number of Customer Disputes) |

FIG. 14B

| PERFORMANCE MEASURES (ACQUIRER) | |
|---|---|
| Item | Calculation |
| Acquirer Total Fraud Cost per Merchant | [(Net Fraud Losses + Fraud Management Expense + Opportunity Costs) ACQUIRER] / (Number of Merchants) |
| Acquirer Total Fraud Cost to Total Volume | [(Net Fraud Losses + Fraud Management Expense + Opportunity Costs) ACQUIRER] / (Merchant Sales Volume) |
| Acquirer Opportunity Cost per Merchant | [(Opportunity Costs) ACQUIRER] / (Number of Merchants) |
| Acquirer Total Fraud Expense per Merchant | [(Net Fraud Losses + Fraud Management Expense) ACQUIRER] / (Number of Merchants) |
| Acquirer Total Fraud Expense to Total Volume | [(Net Fraud Losses + Fraud Management Expense) ACQUIRER] / (Merchant Sales Volume) |
| Issuer Total Fraud Expense to Total Volume | [(Net Fraud Losses + Fraud Management Expense) ACQUIRER] / (Merchant Sales Volume) |
| Acquirer Total Fraud Expense per Fraud Case | [(Net Fraud Losses + Fraud Management Expense) ACQUIRER] / (Number of Fraud Cases) |
| Acquirer Fraud Management Expense per Merchant | [(Fraud Management Expense) ACQUIRER] / (Number of Merchants) |
| Net Fraud Losses to Total Volume | [(Net Fraud Losses) ACQUIRER] / (Merchant Sales Volume) |
| Acquirer Fraud Management Expense to Net Fraud Losses | [(Fraud Management Expense) ACQUIRER] / (Net Fraud Losses) |

FIG. 14C to FIG. 14D

| | from FIG. 14C |
|---|---|
| Number of Merchants per Acquirer Fraud Management FTE Employee | [(Number of Merchants) ACQUIRER] / (Number of Prevention Analysts (FTE) + Number of Detection Alert Staff (FTE) + Number of Detection Chargeback Specialists (FTE) + Number of Detection Administrative Assistants (FTE) + Number of Detection Supervisors (FTE) + Number of Detection Managers (FTE) + Number of Investigation & Recovery Chargeback Specialists (FTE) + Number of Investigation & Recovery Administrative Assistants (FTE) + Number of Investigation & Recovery Supervisors (FTE) |
| Total Volume per Acquirer Fraud Management FTE Employee (per month) | [(Merchant Sales Volume) ACQUIRER] / (Number of Prevention Analysts (FTE) + Number of Detection Alert Staff (FTE) + Number of Detection Chargeback Specialists (FTE) + Number of Detection Administrative Assistants (FTE) + Number of Detection Supervisors (FTE) + Number of Detection Managers (FTE) + Number of Investigation & Recovery Chargeback Specialists (FTE) + Number of Investigation & Recovery Administrative Assistants (FTE) + Number of Investigation & Recovery Supervisors (FTE) |
| Compensation per Acquirer Fraud Management FTE Employee (per month) | [(Total Prevention Staff Costs + Total Detection Staff Costs + Total Investigation & Recovery Staff Costs) ACQUIRER] / (Number of Prevention Analysts (FTE) + Number of Detection Alert Staff (FTE) + Number of Detection Chargeback Specialists (FTE) + Number of Detection Administrative Assistants (FTE) + Number of Detection Supervisors (FTE) + Number of Detection Managers (FTE) + Number of Investigation & Recovery Chargeback Specialists (FTE) + Number of Investigation & Recovery Administrative Assistants (FTE) + Number of Investigation & Recovery Supervisors (FTE) Note: Compensation figures above reflect fully-loaded costs |
| Acquirer Fraud Management Expense to Total Volume | [(Fraud Management Expense) ACQUIRER] / (Merchant Sales Volume) |
| Number of Fraud-related Disputes per Total Disputes | [(Number of Fraud-related Merchant Disputes) ACQUIRER] / (Number of Merchant Disputes) |

FIG. 14D

PERFORMANCE MEASURES (MERCHANT)

| Item | Calculation |
|---|---|
| Merchant Total Fraud Cost per Transaction | [(Net Fraud Losses + Fraud Management Expense + Opportunity Costs) MERCHANT] / ((Number of Points of Sale * Number of Transactions per Point of Sale) + Number of Card Not Present Transactions) |
| Merchant Total Fraud Cost to Total Volume | [(Net Fraud Losses + Fraud Management Expense + Opportunity Costs) MERCHANT] / [((Value of Credit Card Sales Transaction * Credit Card Sales Transaction (%)) + (Value of Debit Card Sales Transaction * Debit Card Sales Transaction (%)) + (Value of Other Sales Transaction * Other Sales Transaction (%)) * ((Number of Points of Sale * Number of Transactions per Point of Sale) + Number of Card Not Present Transactions)] |
| Merchant Opportunity Cost to Total Volume | [(Opportunity Costs) MERCHANT] / [((Value of Credit Card Sales Transaction * Credit Card Sales Transaction (%)) + (Value of Debit Card Sales Transaction * Debit Card Sales Transaction (%)) + (Value of Other Sales Transaction * Other Sales Transaction (%)) * ((Number of Points of Sale * Number of Transactions per Point of Sale) + Number of Card Not Present Transactions)] |
| Merchant Total Fraud Expense per Transaction | [(Net Fraud Losses + Fraud Management Expense) MERCHANT] / ((Number of Points of Sale * Number of Transactions per Point of Sale) + Number of Card Not Present Transactions) |
| Merchant Total Fraud Expense to Total Volume | [(Net Fraud Losses + Fraud Management Expense) MERCHANT] / [(Value of Credit Card Sales Transaction * Credit Card Sales Transaction (%)) + (Value of Debit Card Sales Transaction * Debit Card Sales Transaction (%)) + (Value of Other Sales Transaction * Other Sales Transaction (%)) * ((Number of Points of Sale * Number of Transactions per Point of Sale) + Number of Card Not Present Transactions)] |
| Merchant Total Fraud Expense per Fraud Case | [(Net Fraud Losses + Fraud Management Expense) MERCHANT] / (Number of Fraud-related Chargebacks + Number of Fraud Claims Directly Credited) | to FIG. 14F

FIG. 14E from FIG. 14E

| | |
|---|---|
| Merchant Fraud Management Expense per Transaction | [((Fraud Management Expense) MERCHANT] / ((Number of Points of Sale * Number of Transactions per Point of Sale) + Number of Card Not Present Transactions) |
| Net Fraud Losses to Total Volume | [((Net Fraud Losses) MERCHANT] / [(Value of Credit Card Sales Transaction * Credit Card Sales Transaction (%)) + (Value of Debit Card Sales Transaction * Debit Card Sales Transaction (%)) + (Value of Other Sales Transaction * Other Sales Transaction (%)) * ((Number of Points of Sale * Number of Transactions per Point of Sale) + Number of Card Not Present Transactions)] |
| Merchant Fraud Management Expense to Net Fraud Losses | [((Fraud Management Expense) MERCHANT] / (Net Fraud Losses) |
| Number of Transactions per Merchant Fraud Management FTE Employee (per month) | [(((Number of Points of Sale * Number of Transactions per Point of Sale) + Number of Card Not Present Transactions) MERCHANT] / (((Number of Loss Prevention Analysts (FTE) + Number of Loss Prevention Managers (FTE)) * Percentage of Loss Prevention Accounted for Through Fraud Operations) + Number of Copy Request Analysts (FTE) + Number of Copy Request Managers (FTE)) | to FIG. 14F2

FIG. 14F1

| | from FIG. 14F1 |
|---|---|
| Total Volume per Merchant Fraud Management FTE Employee (per month) | [[(Value of Credit Card Sales Transaction * Credit Card Sales Transaction (%)) + (Value of Debit Card Sales Transaction * Debit Card Sales Transaction (%)) + (Value of Other Sales Transaction * Other Sales Transaction (%)) * ((Number of Points of Sale * Number of Transactions per Point of Sale) + Number of Card Not Present Transactions)] MERCHANT] / (((Number of Loss Prevention Analysts (FTE) + Number of Loss Prevention Managers (FTE)) * Percentage of Loss Prevention Accounted for Through Fraud Operations) + Number of Copy Request Analysts (FTE) + Number of Copy Request Managers (FTE)) |
| Compensation per Merchant Fraud Management FTE Employee (per month) | [(Total Fraud-related Staff Costs) MERCHANT] / (((Number of Loss Prevention Analysts (FTE) + Number of Loss Prevention Managers (FTE)) * Percentage of Loss Prevention Accounted for Through Fraud Operations) + Number of Copy Request Analysts (FTE) + Number of Copy Request Managers (FTE)) Note: Compensation figures above reflect fully-loaded costs |
| Merchant Fraud Management Expense to Total Volume | [(Fraud Management Expense) MERCHANT] / [(Value of Credit Card Sales Transaction * Credit Card Sales Transaction (%)) + (Value of Debit Card Sales Transaction * Debit Card Sales Transaction (%)) + (Value of Other Sales Transaction * Other Sales Transaction (%)) * ((Number of Points of Sale * Number of Transactions per Point of Sale) + Number of Card Not Present Transactions)] |
| Number of Fraud-related Disputes per Total Disputes | [(Number of Fraud-related Chargebacks + Number of Fraud Claims Directly Credited) MERCHANT] / (Number of Disputes) |

FIG. 14F2

| TOTAL COST OF FRAUD SUMMARY-CARD ISSUER | | |
|---|---|---|
| Issuer Fraud Losses | 1.67% | $89,000.00 |
| Issuer Fraud Management Expense | 91.98% | $4,889,244.68 |
| Fraud Prevention | 8.74% | $464,768.05 |
| Fraud Detection | 17.23% | $915,724.00 |
| Fraud Investigation & Recoveries | 12.39% | $658,356.86 |
| Other Operational Costs | 53.63% | $2,850,395.77 |
| First Party "Friendly" Fraud | 2.48% | $132,000.00 |
| Opportunity Costs | 3.86% | $205,020.61 |
| Total (Issuer) | 100.00% | $5,315,265.28 |

+

| TOTAL COST OF FRAUD SUMMARY-CARD ACQUIRER | | |
|---|---|---|
| Acquirer Fraud Losses | 21.61% | $1,201,333.33 |
| Acquirer Fraud Management Expense | 77.95% | $4,333,131.67 |
| Fraud Prevention | 2.27% | $126,373.33 |
| Fraud Detection | 4.82% | $267,786.67 |
| Fraud Investigation & Recoveries | 6.96% | $387,002.33 |
| Other Operational Costs | 63.90% | $3,551,969.33 |
| Opportunity Costs | 0.44% | $24,366.08 |
| Total (Acquirer) | 100.00% | $5,558,831.08 |

from FIG. 15(1)
+

| TOTAL COST OF FRAUD SUMMARY-MERCHANT | | |
|---|---|---|
| Merchant Fraud Losses | 3.16% | $38,720.00 |
| Merchant Fraud Management Expense | 96.28% | $1,178,057.60 |
| Fraud Loss Prevention | 88.12% | $1,078,205.60 |
| Other Operational Costs | 8.16% | $99,852.00 |
| Opportunity Costs | 0.55% | $6,750.00 |
| Total (Merchant) | 100.00% | $1,223,527.60 |

=

| TOTAL COST OF FRAUD DATA | | |
|---|---|---|
| Description | Percentage | Number |
| Opportunity Costs | 2.00% | $236,136.69 |
| Operating Costs | 86.00% | $10,400,433.94 |
| Credit Losses from First Party Losses | 1.10% | $132,000.00 |
| Merchant Fraud Losses | 0.30% | $38,720.00 |
| Acquirer Fraud Losses | 9.90% | $1,201,333.33 |
| Issuer Fraud Losses | 0.70% | $89,000.00 |
| Total Cost of Fraud (Issuer, Acquirer, & Merchant) | 100.00% | $12,097,623.96 |

FIG. 15(2)

| REFERENCE TOTAL COST OF FRAUD SUMMARY-CARD ISSUER (in mil.) | | |
|---|---|---|
| Issuer Fraud Losses | 1.59% | $84,000,000.00 |
| Issuer Fraud Management Expense | 92.24% | $4,884,244,000.68 |
| Fraud Prevention | 8.76% | $463,768,000.05 |
| Fraud Detection | 17.27% | $914,724,000.00 |
| Fraud Investigation & Recoveries | 12.41% | $657,356,000.86 |
| Other Operational Costs | 53.79% | $2,848,395,000.77 |
| First Party "Friendly" Fraud | 2.40% | $127,000,000.00 |
| Opportunity Costs | 3.78% | $200,019,000.61 |
| Total (Issuer) | 100.00% | $5,295,264,000.29 |

+

| REFERENCE TOTAL COST OF FRAUD SUMMARY-CARD ACQUIRER (in mil.) | | |
|---|---|---|
| Acquirer Fraud Losses | 21.58% | $1,196,333,000.33 |
| Acquirer Fraud Management Expense | 78.07% | $4,328,131,000.67 |
| Fraud Prevention | 0.00% | $125,373,000.33 |
| Fraud Detection | 0.00% | $266,786,000.67 |
| Fraud Investigation & Recoveries | 0.00% | $386,002,000.33 |
| Other Operational Costs | 0.00% | $3,549,969,000.33 |
| Opportunity Costs | 0.35% | $19,366,000.08 |
| Total (Acquirer) | 100.00% | $5,543,830,001.08 |

from FIG. 17(1) +

| REFERENCE TOTAL COST OF FRAUD SUMMARY-MERCHANT (in mil.) | | |
|---|---|---|
| Merchant Fraud Losses | 2.79% | $33,720,000.00 |
| Merchant Fraud Management Expense | 97.07% | $1,173,057,000.60 |
| Fraud Loss Prevention | 0.00% | $1,075,205,000.60 |
| Other Operational Costs | 0.00% | $97,852,000.00 |
| Opportunity Costs | 0.14% | $1,750,000.00 |
| Total (Merchant) | 100.00% | $1,208,527,000.60 |

=

| REFERENCE TOTAL COST OF FRAUD DATA (in mil.) | | |
|---|---|---|
| Description | Percentage | Number |
| Opportunity Costs | 1.84% | $221,136,000.69 |
| Fraud Operating Costs | 86.20% | $10,385,433,000.94 |
| Credit Losses from First Party Losses | 1.05% | $127,000,000.00 |
| Merchant Fraud Losses | 0.28% | $33,720,000.00 |
| Acquirer Fraud Losses | 9.93% | $1,196,333,000.33 |
| Issuer Fraud Losses | 0.70% | $84,000,000.00 |
| Total Cost of Fraud (Issuer, Acquirer, & Merchant) | 100.00% | $12,047,622,001.96 |

FIG. 17(2)

SYSTEM AND METHOD FOR PROVIDING REFERENCE COST OF FRAUD DATA RELATED TO FINANCIAL PRESENTATION DEVICES THAT ARE PRESENTABLE TO PROVIDERS OF GOODS OR SERVICES

CROSS REFERENCE TO RELATED APPLICATIONS

This application claims priority under 35 U.S.C. Section 119(e) to U.S. Provisional Application Ser. No. 60/938,897, filed May 18, 2007, which is incorporated herein by reference.

FIELD OF THE INVENTION

The present invention relates to a data processing system and more particularly to a system for determining reference cost of fraud data related to financial presentation devices.

BACKGROUND OF THE INVENTION

Currently, in a payment card transaction business involving merchants, acquirers and issuers, each processing entity may calculate the cost for fraudulent use of cards (some times known as cost of payments fraud) as simply the cost of fraud directly related to losses absorbed by the entity, i.e., net chargeoff absorbed by the entity. For example, an issuer calculates the cost of fraud as the amount of consumer fraud incurred and recorded as fraud losses by the issuers. An acquirer may calculate the cost of fraud as the fraud losses absorbed by the acquirer which have been charged back from an issuer.

However, because the "true" cost of fraud is not well understood by the processing members, the actual cost of fraud may be substantially higher than those being calculated by the stakeholders. For example, the costs associated with handling fraud related chargebacks, and risk management functions may be disregarded. Overall, the industry suffers opportunity costs related to lost card usage resulting from declined activity or customers using other payment channels to avoid real or perceived security concerns related to electronic payments fraud.

Additionally, accounting policy and expense classification differences exist among the processing entities for financial reporting. These differences among the processing entities make comparison of each entity's business performance with the industry standard difficult. Because of this lack of consistent comparison, many entities may not have the tools to make better investment decisions for improving parts of the business such as minimizing the cost for fraudulent use of cards.

Therefore, it would be desirable to provide a system and method for analyzing and determining all cost associated with fraudulent use of cards for each processing entity. Such a tool will enable informed fraud risk management business decisions. Risk and product managers can use the framework to develop and justify new business strategies, enhanced operating processes, and improved fraud control of solutions, products and services.

In addition, it would be desirable to provide a system and method for analyzing and determining a standard industry-wide benchmark/reference for cost of fraud associated with fraudulent use of cards for use by each participating entity. Such standard benchmark for cost of fraud can be used by the risk and product managers as a reference to evaluate their own costs for fraud to help optimize investment decisions.

SUMMARY OF THE DISCLOSURE

According to one aspect of the present invention, a system for providing a reference cost of fraud data related to financial presentation devices that are presentable to providers of goods or services is provided. The system includes a fraud assessment module that provides a commonly defined set of input requirements for a plurality of business entities. The fraud assessment module receives, from the plurality of business entities, sales data and operating cost data both related to financial presentation devices. The received data conforms to the commonly defined set of input requirements. The module determines, based on the received data, the reference cost of fraud data related to the financial presentation devices. The reference cost of fraud data includes direct fraud loss, fraud operating cost, and opportunity cost. The determined reference cost of fraud data are accessible by the plurality of business entities for use as benchmark data.

According to another aspect of the present invention, a method for providing reference cost of fraud data related to financial presentation devices that are presentable to providers of goods or services is provided. The method includes receiving from the plurality of business entities, sales data and operating cost data both related to financial presentation devices. The received data conforms to a commonly defined set of input requirements. The method also includes determining, based on the received data, the reference cost of fraud data including a direct fraud loss, fraud operating cost, and opportunity cost. The determined reference cost of fraud data are accessible by the plurality of business entities for use as benchmark data.

BRIEF DESCRIPTION OF THE DRAWINGS

FIG. 7A illustrates a top portion of a summary of inputs for the issuer to be entered into the assessment management system.

FIG. 7B illustrates a bottom portion of the summary of inputs for the issuer to be entered into the assessment management system as partly illustrated in FIG. 7A.

FIG. 7C illustrates a top portion of a summary of inputs for the acquirer to be entered into the assessment management system.

FIG. 7D illustrates a bottom portion of the summary of inputs for the acquirer to be entered into the assessment management system as partly illustrated in FIG. 7C.

FIG. 7E-7E3 illustrate a summary of inputs for the merchant to be entered into the assessment management system.

FIG. 7F illustrate a bottom portion of the summary of inputs for the merchant to be entered into the assessment management system as partly illustrated in FIG. 7E.

FIG. 9 illustrates an example fraud report showing the allocated costs for the various components of the total cost of fraud for an issuer.

FIG. 11A illustrates a top portion of an Issuer Data Allocation summary for the issuer inputs of FIG. 4.

FIG. 11B illustrates a bottom portion of the Issuer Data Allocation summary as partly illustrated in FIG. 11A.

FIG. 12A1-12A2 illustrate an Acquirer Data Allocation summary for the acquirer inputs of FIG. 5.

FIG. 12B illustrates a bottom portion of the Acquirer Data Allocation summary as partly illustrated in FIG. 12A.

FIG. 13 illustrates a Merchant Data Allocation summary for the merchant inputs of FIG. 6.

FIG. 14A illustrates a top portion of an example of performance measures list related to issuer with a respective formula for each performance measure.

FIG. 14B illustrates a bottom portion of the example of performance measures list as partly illustrated in FIG. 14A.

FIG. 14C illustrates a top portion of an example of performance measures list related to acquirer with a respective formula for each performance measure in relation to acquirer.

FIG. 14D illustrates a bottom portion of the example of performance measures list as partly illustrated in FIG. 14C.

FIG. 14E illustrates a top portion of an example of performance measures list related to merchant with a respective formula for each performance measure in relation to merchant.

FIG. 14F illustrates a bottom portion of the example of performance measures list as partly illustrated in FIG. 14E.

FIG. 15 illustrates an example total cost of fraud summary for the card issuer, acquirer, and merchant.

FIG. 17 illustrates a reference total cost of fraud summary for the card issuer, acquirer, and merchant for use as benchmark data.

DETAILED DESCRIPTION OF THE INVENTION

For purposes of illustration and clarity, the assessment management feature of the present invention will be discussed in the context of the cost of fraud related to credit or debit cards. However, persons of ordinary skill in the art will appreciate that the novel features disclosed herein apply to the cost of fraud related to any financial presentation device that can be presented to a seller of goods or services for payment, including but not limited to, credit cards, debit cards, prepaid cards, electronic benefit cards, charge cards, virtual cards, smart cards, key chain devices, personal digital assistants, cell phones, stored value devices. In addition, the features disclosed herein apply to the cost of fraud related to any channel of payment transactions, including but not limited to, face-to-face, card not present, Internet, electronic commerce, recurring, and mobile payment transaction.

Figure 1:
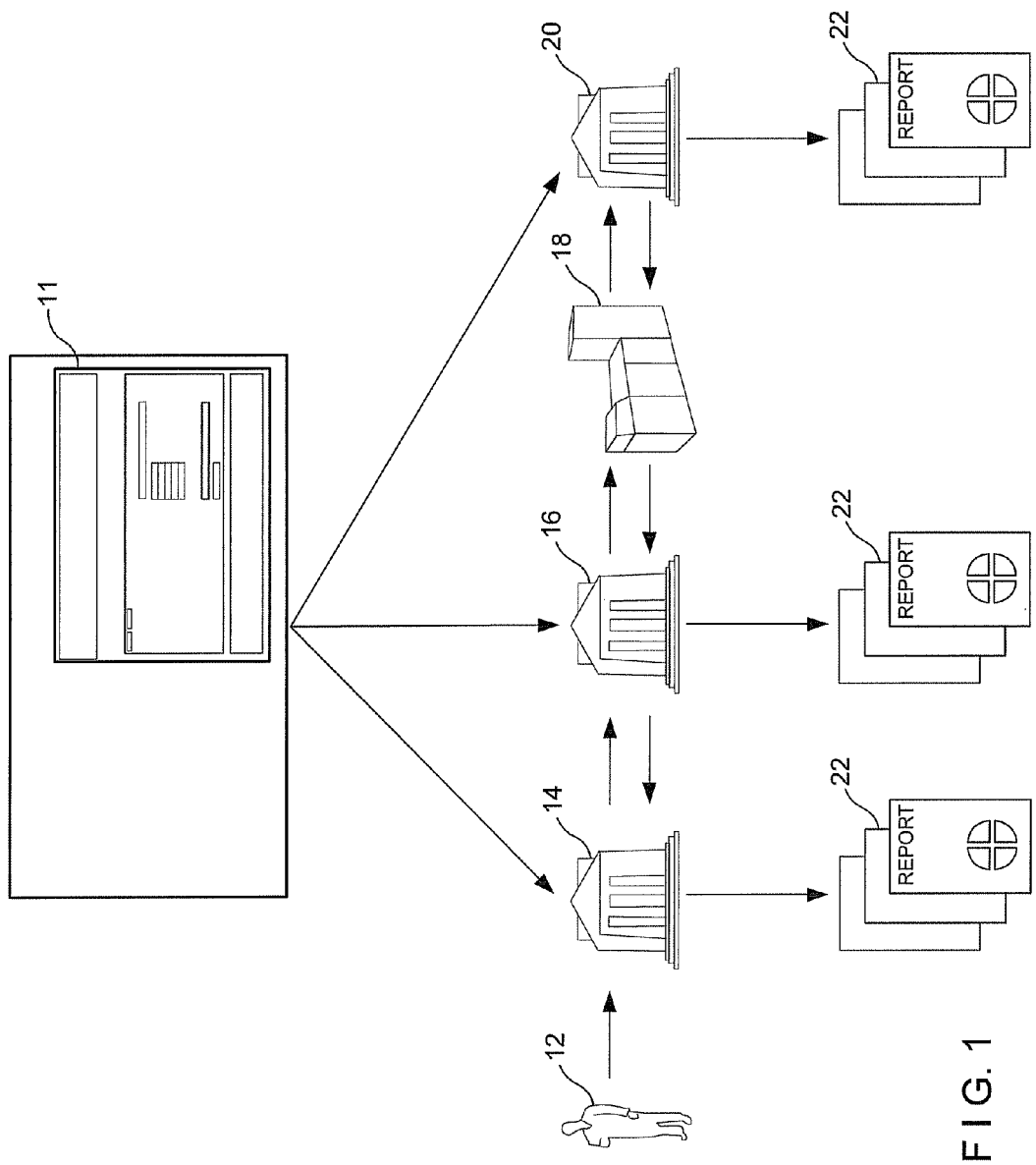
FIG. 1 illustrates a process flow for determining the cost of fraud related to card transactions.

FIG. 1 illustrates a process flow for determining the cost of fraud related to card transactions and shows all of the entities involved in a typical card transaction. A user 12 purchases an item at a merchant 14 using a credit card. The merchant 14 sends a transaction approval request to its acquirer 16. The acquirer forwards the request to a transaction facilitator 18 such as Visa. The facilitator 18 then sends the request to an issuer 20. The issuer 20 determines whether to approve the transaction request or not and returns a reply message to the facilitator 18. The facilitator 18 forwards the reply message to the merchant 14 through the acquirer 16.

According to the invention, an assessment module 34 (see FIG. 2) is accessed by or provided to merchants 14, acquirers 16, or issuers 20. Each entity, in turn, inputs the information required in the input screen 11 of the assessment module 34. In one embodiment, the assessment module includes an electronic spreadsheet, such as a Microsoft Excel spreadsheet, that contains all of the input prompts, assumptions, allocation calculations and reporting functions as will be described in more detail later herein.

The assessment module 34 then determines the total cost of fraud and other reports for each entity 14, 16, 20 that enters the input data.

In some cases, a business may have more than one perspective such as an acquirer and issuer. In that case, the business entity enters all of the required input data for both the acquirer and issuer portion. The assessment module 34 then generates a report as an acquirer, a report as an issuer and a combined report that contains total fraud cost allocations as a combined entity.

Figure 2:
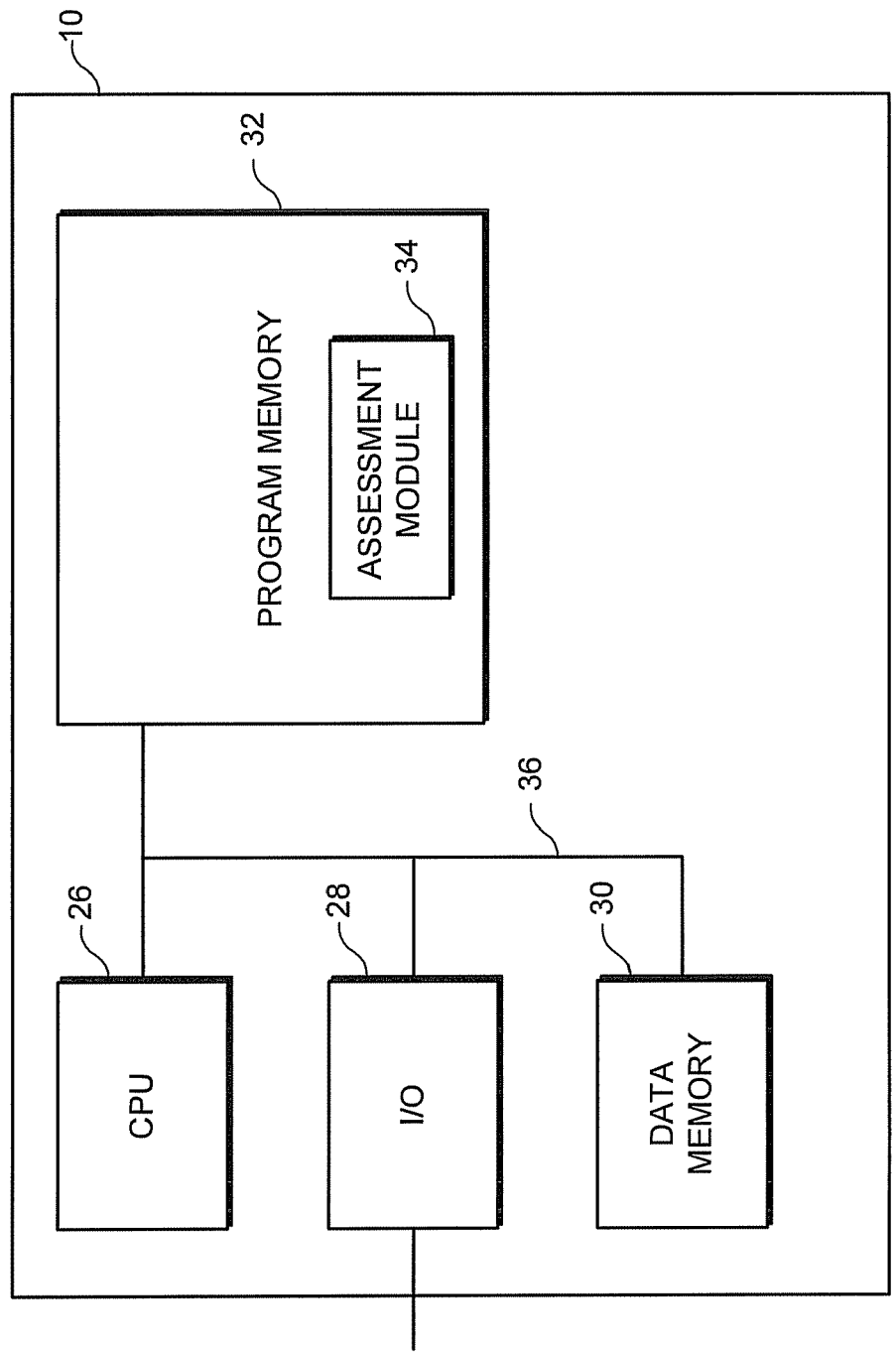
FIG. 2 illustrates a block diagram of a computer system that stores and executes an assessment management software module.

An exemplary fraud assessment management system 10 for assessing the total cost of fraud is shown in FIG. 2. The fraud assessment management system 10 of the present invention receives inputs relating to each entity described above and allocates the cost of fraud from the received inputs to generate the total fraud cost for each entity.

The assessment management system 10 is configured to receive inputs through an I/O interface 28. The assessment management system 10 of FIG. 2 includes data memory 30, processor (CPU) 26 and program memory 32, all commonly connected to each other through a bus 36. The program memory 32 stores, among others, an assessment module or program 34. The software program modules in the program memory 32 are transferred to the data memory 30 as needed and is executed by the CPU 26.

The assessment management system 10 can be any computer such as a personal computer, minicomputer workstation, a mainframe, or a combination thereof. The system 10 can be located at the transaction facilitator 18 with each entity accessing the system through a computer network such as the Internet. Alternatively, it can be located at the individual processing entity with the assessment module 34 being provided by the transaction facilitator 18 to be executed at each entity.

Figure 3:
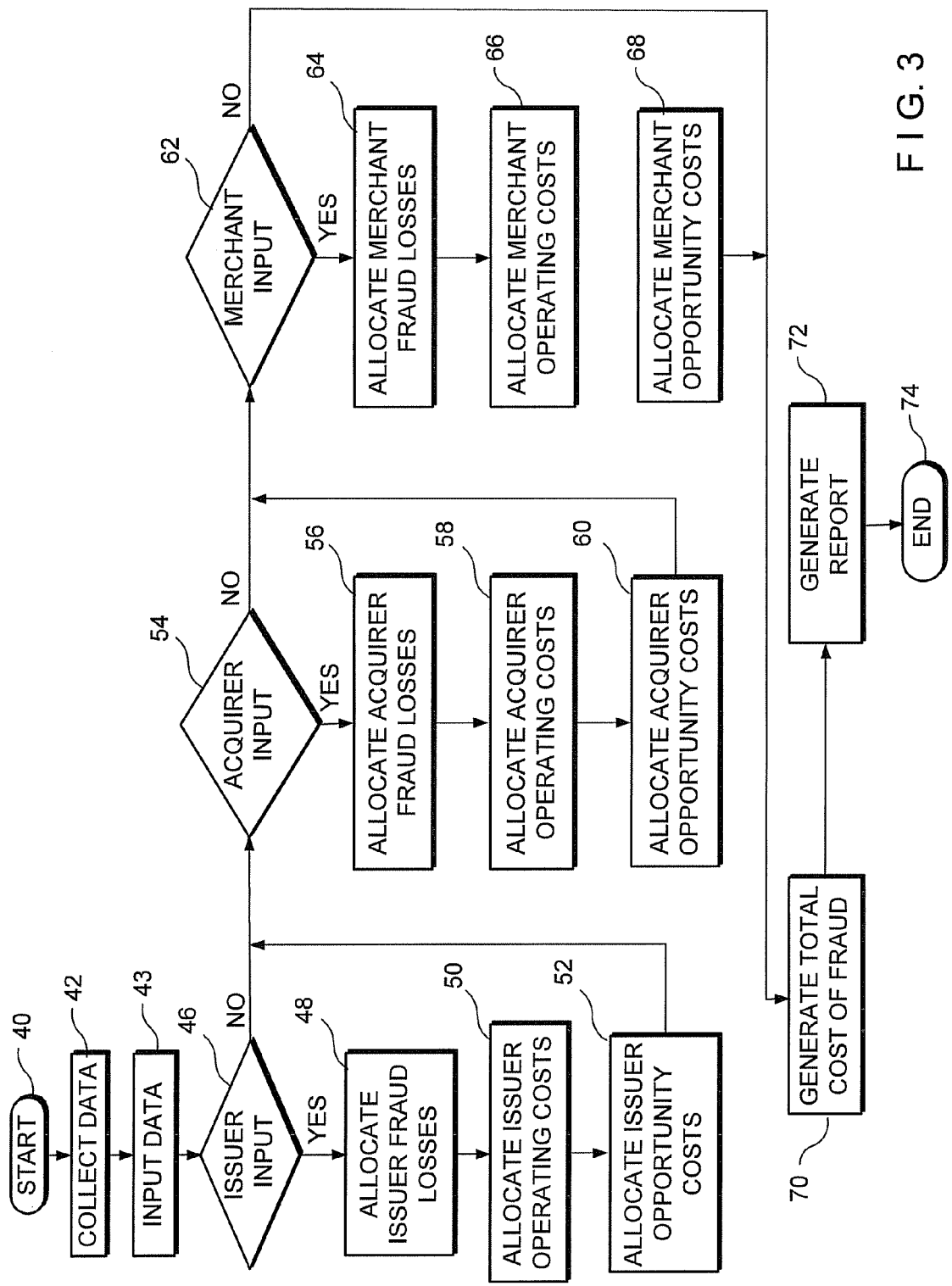
FIG. 3 illustrates a method of assessing total cost of fraud that includes an issuer portion, an acquirer portion, and a merchant portion.

A method of assessing a total cost of fraud will now be described with reference to FIG. 3.

An organization such as an issuer typically designates a project team to assess the total cost of fraud incurred by that organization. The project team collects the necessary data in step 42 that are used to arrive at the final result. The collected data is then entered into the assessment module 34 in step 43.

The assessment module 34 determines whether issuer inputs were received in decision 46. If so, then control passes to step 48 which allocates the issuer's direct fraud loss. The direct fraud loss includes the cost of fraud directly related to losses absorbed by the entity, i.e., net chargeoff absorbed by the entity. Further, the assessment module 34 allocates the issuer's fraud operating costs in step 50. The fraud operating cost includes operating expenses associated with activities of prevention, detection, investigation and recovery of fraud loss associated with the financial presentation devices. In step 52, the assessment module 34 also allocates the issuer's opportunity cost. The opportunity cost includes lost revenue opportunities as a result of fraud-related activities. By these steps, the assessment module has determined the total cost of fraud by including not only the direct fraud losses, but operating costs and opportunity costs for issuer, which were ignored in the past.

In decision 54, the assessment module 34 determines whether acquirer inputs were received. If so, then control passes to step 56 which allocates the acquirer's direct fraud losses. Further, the assessment module 34 allocates the acquirer's operating costs in step 58. In step 60, the assessment module 34 also allocates the acquirer's opportunity costs. By these steps, the assessment module has determined the total cost of fraud by including not only the direct fraud losses, but operating costs and opportunity costs for acquirer, which were ignored in the past.

In decision 62, the assessment module 34 determines whether merchant inputs were received. If so, then control passes to step 64 which allocates the merchant's direct fraud losses. Further, the assessment module 34 allocates the merchant's operating costs in step 66. In step 68, the assessment module 34 also allocates the merchant's opportunity costs. By these steps, the assessment module has determined the total cost of fraud by including not only the direct fraud losses, but operating costs and opportunity costs for merchant, which were ignored in the past.

After having allocated the fraud losses, operating costs, and the opportunity costs for each entity, the assessment module 34, in step 70, generates the total cost of fraud. In step 72, based on the allocation of fraud costs, the assessment module 34 is capable of generating various reports as will be discussed in more detail below.

Having described the method of assessing the total cost of fraud, the details of the inputs for each entity will now be described with reference to FIGS. 4 to 7E3.

Figure 4:
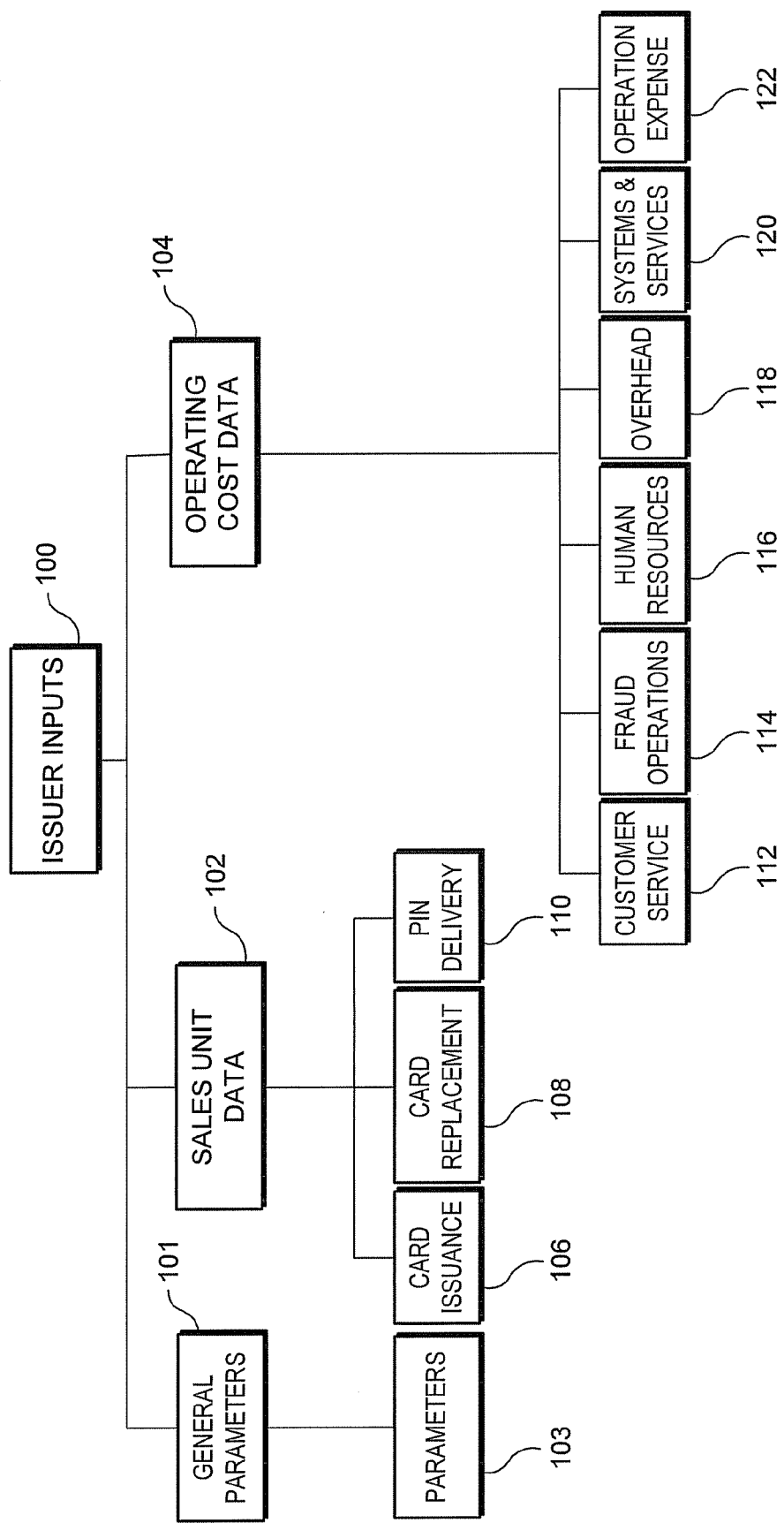
FIG. 4 is a block diagram illustrating the Issuer Inputs for the assessment management system.

As shown in FIG. 4, the Issuer Inputs 100 is comprised of three main components: General Parameters 101, Sales Unit Data 102 and Operating Cost Data 104. As shall be clear below herein, the input data of these components drive the allocation of direct financial costs, operating costs, and opportunity costs associated with fraud. The input category is organized in general as follows: (1) General Parameters 101 with its Parameters category 103, (2) Sales Unit Data 102 which includes Card Issuance category 106 (e.g., total number of cards in issue), Card Replacement category 108 and Pin Delivery category 110, and (3) Operating Cost Data 104 which includes operating costs associated with the following categories: Customer Service 112, Fraud Operations 114, Human Resources 116, Overhead 118, Systems and Services 120, and Operating Expense 122.

Figure 5:
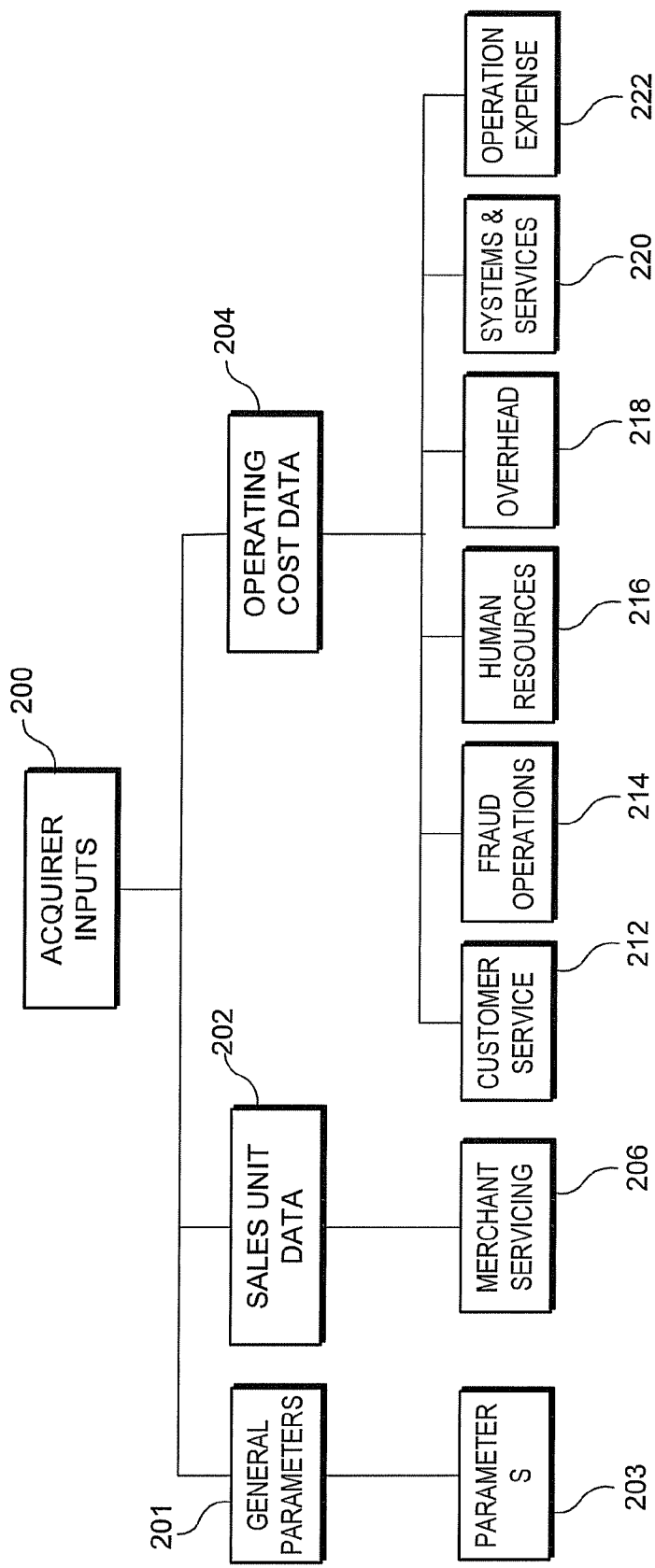
FIG. 5 is a block diagram showing Acquirer Inputs for the assessment management system.

Similarly, as shown in FIG. 5, Acquirer Inputs 200 is comprised of three main components, General Parameters 201, Sales Unit Data 202 and Operating Cost Data 204. The General Parameters 201 component includes Parameters category 203. The Sales Unit Data 202 component for the Acquirer Inputs 200 includes Merchant Servicing 206 category. The Operating Cost Data 204 component includes the following categories: Customer Service 212, Fraud Operations 214, Human Resources 216, Overhead 218, Systems and Services 220, and Operation Expense 222.

Figure 6:
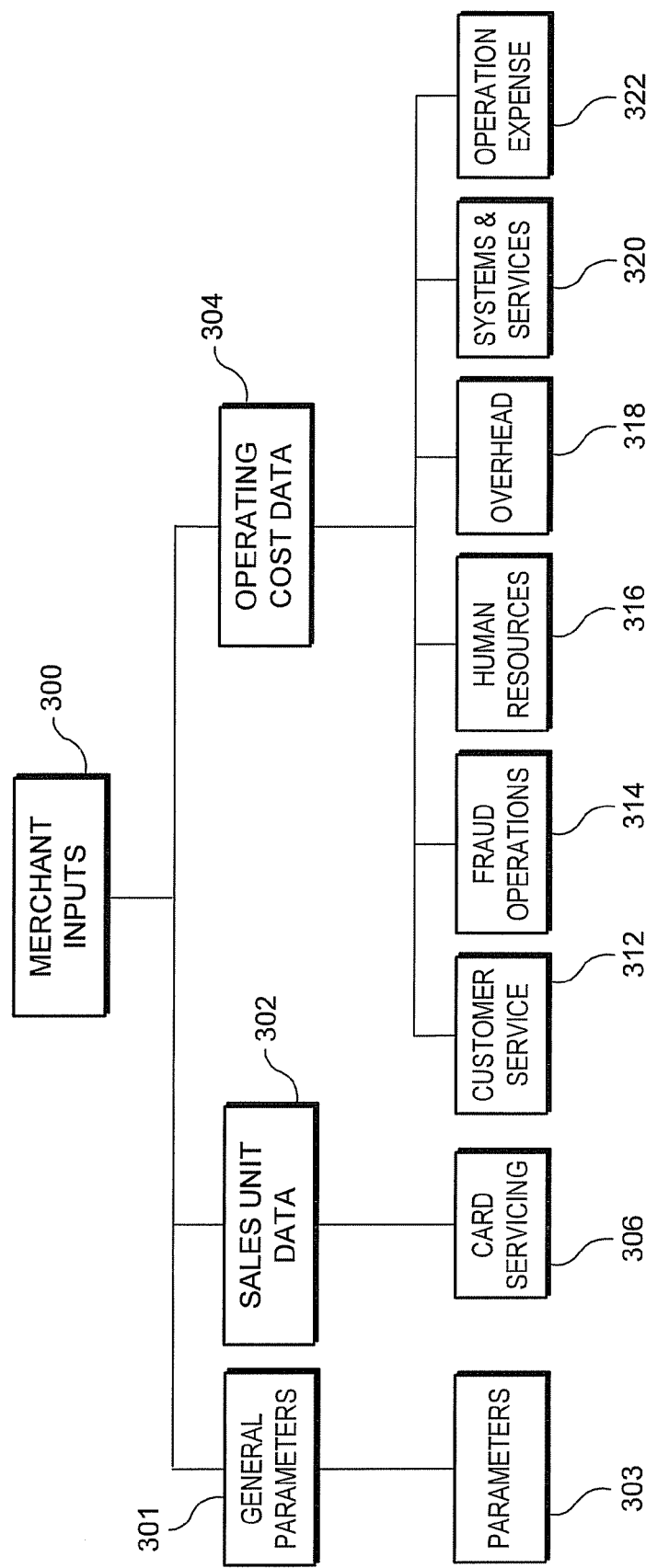
FIG. 6 is a block diagram showing the Merchant Inputs for the assessment management system.

Similarly, as shown in FIG. 6, the Merchant Inputs 300 is also comprised of three main components, General Parameters 301, the Sales Unit Data 302 and the Operating Cost Data 304. The General Parameters 301 component includes a Parameters 303 category. The Sales Unit Data 302 component includes Card Servicing 306 category. The Operating Cost Data 304 component includes the following categories: Customer Service 312, Fraud Operations 314, Human Resources 316, Overhead 318, Systems and Services 320, and Operation Expense 322.

The issuer perspective inputs of FIG. 4 will now be described in more detail with reference to FIGS. 7A-7E3. In one embodiment, the inputs are entered into an electronic spreadsheet which is part of the assessment module 34.

Under the General Parameters 101 component, a user enters/inputs such general data as Label (to be used as a title of reports), period of financial data, currency format of input, number of hours of a normal workday, the number of days of a normal work week (typically 5 days), the number of weeks in a normal work year, and net pre-tax profit margin rate, e.g., (total revenue minus total expenses) divided by (total sales volume plus cash volume).

As shown in FIGS. 7A and 7B, inputs related to the Sales Unit Data 102 component are entered into the spreadsheet of the assessment module 34. Specifically, the user enters each data item in the input categories of Card Issuance 106, Card Replacement 108 and Pin Delivery 110. For example, under the PIN Delivery category 110, the data items to be entered are: "Number of PINS Delivered", "PIN Delivery Costs (per PIN)—Normal", "PINs Delivered—Normal (%)", "PIN Delivery Costs (per PIN)—Other" with "PINs Delivered—Other (%)" being calculated automatically. The definition for each data item to be entered into the Sales Unit Data 102 component is listed below in Table 1.

TABLE 1

| Input Item | Definition |
|---|---|
| Card Issuance | |
| Do accounts share common card numbers? | Select whether the same card numbers are shared in accounts having more than one card. |
| Number of Cards (avg) | Enter the average total cards in issue. This includes both primary and secondary cards. |
| Number of Accounts (avg) | Enter the average total accounts with cards in issue. This only includes the number of primary card accounts. |
| Value of Portfolio Net Sales Volume (avg) - Purchases | Enter the currency value of the average net sales generated by the cards portfolio for purchase transactions. |
| Value of Portfolio Net Cash Volume (avg) | Enter the currency value of the average net cash disbursements generated by the cards portfolio for cash advance transactions. |
| Annual Interest Rate Charged (avg) | Enter the average interest rate charged/applied to user's organization's revolving credit card accounts. |
| Interchange Fee Rate (avg) | Enter the average interchange fee (as a percent) collected for purchase transactions. |
| Value of Sales Transaction (avg) | Enter the currency value of the average amount of a purchase transaction. |
| Value of Sales Transaction - Fraud Victim (avg) | Enter the currency value of the average amount of a purchase transaction by cardholders after being victimized by fraud. If this figure is not known, enter the same number as "Value of Sales Transaction." |
| Value of Sales Transaction -- Compromised Account (avg) | Enter the currency value of the average amount of a purchase transaction by cardholders after being victims of compromised accounts. If this figure is not known, enter the same number as "Value of Sales Transaction." |
| Number of Transactions Per Cardholder (avg) | Enter the average number of transactions (per month, quarter, or year) carried out by cardholders. |
| Days to Balance Payoff (avg) | Enter the average number of days it takes for revolving customers to pay off their credit balances. If no data is available, enter the maximum number of months allowed for repayment. |
| Revolving Customers Rate (%) | Enter the percentage of cardholders with revolving credit balances on their accounts. |
| Card Replacements | |
| Days to Card Replacement (avg) | Enter the average number of days it takes for replacement cards to be delivered to cardholders once fraud is reported or compromised accounts are identified. |

TABLE 1-continued

| Input Item | Definition |
|---|---|
| Card Production Costs - Mag Stripe (per card) | Enter the currency value of the per-card embossing costs for magnetic stripe cards. This includes the cost of plastic, stationary, card carrier, overhead of the embossing unit, etc. |
| Magnetic Stripe Cards (%) | Enter the percentage of magnetic stripe-based cards produced. |
| Card Production Costs - ICC (per card) | Enter the currency value of the per-card embossing costs for ICC/Chip-based cards. This includes the cost of plastic, stationary, card carrier, overhead of the embossing unit, etc. |
| ICC Cards (%) | Calculated automatically based on percentage of magnetic stripe cards produced. |
| Card Delivery Costs (per card) - Normal | Enter the currency value of the normal per-card shipping/mailing costs associated with delivering new cards to customers. This is usually what is paid to a third party for delivery. |
| Fraud-related Card Delivery - Normal (%) | Enter the percentage of fraud-related card replacements mailed using the normal delivery method. If all fraud-related card replacements are mailed using a special delivery method, enter 0. |
| Card Delivery Costs (per card)- Expedited | If special delivery methods are used to mail card replacements for fraud cases, enter the currency value of the special/higher per-card delivery costs. |
| Fraud-related Card Delivery - Expedited (%) | Calculated automatically based on percentage of cards mailed using the normal delivery method. |
| Other Costs (per card) | Enter the currency value of any other known costs, aside from embossing and deliver costs, associated with user's organization's card replacement operations. |

PIN Delivery

| Number of PINs Delivered | Enter the total number of PINs delivered to cardholders |
| PIN Delivery Costs (per PIN) - Normal | Enter the currency value of the normal per-PIN costs associated with delivering new PINs to customers. If user's organization's normal PIN delivery method is through mail/courier, this is usually what is paid to a third-party for delivery. |
| PINs Delivered - Normal (%) | Enter the percentage of PINs delivered using the normal delivery method. |
| PIN Delivery Costs (per PIN) - Other | Enter the currency value of the per-PIN costs associated with delivering new PINs to customers through special/other methods. |
| PINs Delivered - Other (%) | Calculated automatically based on percentage of PINs mailed using normal delivery method. |

Similarly, under the Operating Cost Data 104 component, the definition for each data item to be entered into the categories of Customer Service 112, Fraud Operations 114, Human Resources 116, Overhead 118, Systems and Services 120, and Operating Expense 122 is listed below in Tables 2-7.

TABLE 2

Customer Service

| Input Item | Definition |
|---|---|

Inbound

| Call Received Cost (avg unit cost) | Enter the currency value of the average per-unit cost of receiving and processing a Customer Service inquiry, including calls for Lost/Stolen, dispute handling (chargebacks), and account activity monitoring. |
| Number of Inquiries per Fraud Case (avg) | Enter the average number of inquiries made by cardholders to Customer Service for a typical fraud case, including inquiries in support of dispute handling. |
| Number of Inquiries per Compromised Account (avg) | Enter the average number of inquiries made by cardholders to Customer Service for a typical compromised account, including inquiries in support of dispute handling. |

TABLE 2-continued

Customer Service

| Input Item | Definition |
|---|---|

Outbound

| Call Cost - Cable (avg unit cost) | Enter the currency value of the average per-unit cost of placing an outbound call to cardholders through cable/land based phone lines. |
| Number of Calls per Fraud Case - Cable (avg) | Enter the average number of cable/land-line outbound calls placed to cardholders per fraud case reported, including calls in support of fraud investigations. |
| Number of Calls per Compromised Account - Cable (avg) | Enter the average number of cable/land-line outbound calls placed to cardholders per compromised account, including calls in support of fraud investigations. |
| Call Cost - Mobile (avg unit cost) | Enter the currency value of the average per-unit cost of placing an outbound mobile call to cardholders |
| Number of Calls per Fraud Case - Mobile (avg) | Enter the average number of mobile outbound calls placed to cardholders per fraud case reported, including calls in support of fraud investigations. |
| Number of Calls per Compromised Account - Mobile (avg) | Enter the average number of mobile outbound calls placed to cardholders per compromised account, including calls in support of fraud investigations. |

New Card Activation

| Activation Cost - IVR (avg unit cost) | Enter the average per-unit cost of receiving and processing a cardholder request to activate a new card through Interactive Voice Response (IVR) systems. |
| Cards Activated - IVR Method (%) | Enter the percentage of new card activation requests received through Interactive Voice Response (IVR) systems. |
| Activation Cost - ATM (avg unit cost) | Enter the average per-unit cost of receiving and processing a cardholder request to activate a new card through automated teller machines (ATMs). |
| Cards Activated - ATM Method (%) | Enter the percentage of new card activation requests received through automated teller machines (ATMs). |
| Activation Cost - Letter (avg unit cost) | Enter the average per-unit cost of receiving and processing a cardholder request to activate a new card through physical/mail correspondence. |
| Cards Activated - Letter Method (%) | Enter the percentage of new card activation requests received through physical/mail correspondence. |
| Activation Cost - Other (avg unit cost) | Enter the average per-unit cost of receiving and processing a cardholder request to activate a new card through other/alternative method. |
| Cards Activated - Other Method (%) | Automatically calculated based on percentage values entered for IVR, ATM, and Letter card activation methods. |

TABLE 3

Fraud Operations

| Input Item | Definition |
|---|---|

Authorization

| Number of Declines | Enter the total number of direct authorization declines (per month, quarter, or year) received. |
| Fraud-related Declines (%) | Enter the percentage of direct authorization declines generated by established parameters for fraud-based policies or referrals. |
| Incorrect Fraud-related Declines (%) | Enter the percentage of fraud-related direct authorization declines considered to be incorrectly declined. |
| Number of Referrals | Enter the total number of credit referrals (per month, quarter, or year) received. |
| Fraud-related Referrals (%) | Enter the percentage of credit referrals generated by established parameters for fraud-based policies or referrals. |

TABLE 3-continued

Fraud Operations

| Input Item | Definition |
| --- | --- |
| Fraud-related Referrals Declined (%) | Enter the percentage of fraud-related credit referrals declined. |
| Fraud-related Referrals Incorrectly Declined (%) | Enter the percentage of fraud-related referral declines considered to be incorrectly declined. |

Recoveries & Chargeoffs

| Input Item | Definition |
| --- | --- |
| Value of Gross Fraud Chargeoffs | Enter the total currency value of charges resulting from fraudulent or unauthorized user activity (per month, quarter, or year). |
| Cardholder Fraud Responsibility (% or amount) | If user's organization holds cardholders partly accountable for fraud charges, select whether the accountability is assigned as a percentage of total fraudulent charges incurred, or as a fixed currency amount per fraud case reported. Then enter the appropriate percent or currency amount for which cardholders are responsible. If user's organization does not hold cardholders partly accountable for fraud charges, select either a percentage or a fixed currency amount, then enter 0. |
| Cardholder Fraud Responsibility Unrecovered (avg) | If user's organization holds cardholders partly accountable for fraud charges, enter the average uncollectible/unrecoverable portion of cardholder responsibility. This amount (or percentage) should always be entered as a smaller figure than the Cardholder Fraud Responsibility itself. |
| Value of Fraud-related Merchant Chargebacks | Enter the total currency value of fraud chargebacks presented to Merchants (per month, quarter, or year). |
| Value of Fraud-related Representments | Enter the total currency value of Merchant fraud chargebacks represented and accepted (per month, quarter, or year). |
| Value of Fraud Insurance Recoveries (avg) | Enter the average total currency value of insurance recoveries resulting from fraudulent or unauthorized user activity (per month, quarter, or year). |

Exception Handling

| Input Item | Definition |
| --- | --- |
| Value of Fraud Case (avg) | Enter the currency value of the average total fraudulent charges incurred per fraud case reported. Fraud cases should be measured at the account (not card) level and may constitute one or more transactions. |
| Number of Fraud Cases Reported | Enter the total number of fraud cases reported (per month, quarter, or year) among cardholders. Fraud cases should be measured at the account (not card) level and may constitute one or more transactions. |
| Number of Transactions per Fraud Case (avg) | Enter the average number of transactions carried out by fraudsters per fraud case reported. |
| Number of Compromised Account Cases Reported | Enter the total number of compromised accounts (per month, quarter, or year). |
| Number of Fraudulent Transactions per Compromised Account (avg) | Enter the average number of transactions carried out by fraudsters per compromised account reported. |
| Number of Customer Disputes | Enter the total number of customer disputes (per month, quarter, or year). Disputes should be defined on a per transaction basis. |
| Number of Fraud-related Customer Disputes | Enter the total number of customer disputes (per month, quarter, or year) attributable to fraudulent activity. Disputes should be defined on a per-transaction basis. |
| First Party Fraud Rate (%) | Enter the percentage of credit losses attributable to cardholder or accountholder-perpetrated fraud. |
| Value of Net Credit Chargeoffs | Enter the currency value of total credit losses - gross losses less recoveries (per month, quarter, or year). |

Bankcard Processing

| Input Item | Definition |
| --- | --- |
| Authorization Fee per Transaction (avg) | Enter the currency value of the average per-transaction authorization (e.g., BASE I) fees incurred by user's organization. |
| Settlement Fee per Transaction (avg) | Enter the currency value of the average per-transaction settlement (e.g., BASE II fraud-related chargebacks) fees incurred by user's organization. |
| Value of Fraud-related Processing Fees | Enter the currency value of the total fraud-related transaction processing fees (TC40, SAFE, chargeback reporting, representments, etc.) incurred by user's organization. |

Other

| Input Item | Definition |
| --- | --- |
| Value of Fraud Insurance Premiums | Enter the currency value of the cost of fraud insurance premiums (per month, quarter, or year). |
| Value of Fraud-related Legal Fees | Enter the currency value of the total cost of legal fees (per month, quarter, or year), including counsel and prosecution, resulting from fraudulent or unauthorized activity. |
| Value of Other Fraud Losses | Enter the currency value of the total amount of any other known costs associated with user's organization's direct fraud operations (per month, quarter, or year). |

TABLE 4

Human Resources

| Input Item | Definition |
| --- | --- |
| Are staff costs reported on a fully loaded/all-inclusive basis? | Select "Yes" to report all fraud staff costs on a fully-loaded (single line) basis. Select "No" to report staff salaries, benefits, and taxes separately from any other known costs. |
| Prevention Analysts Costs (avg) | If reporting staff costs on a fully-loaded basis, enter the currency value of total average cost per Prevention Analyst (per hour, day, week, month, or year). If not reporting staff costs on a fully-loaded basis, enter the currency value of the average sum of salary, benefit, and tax costs per Prevention Analyst (per hour, day, week, month, or year). |
| Other Prevention Analysts Costs (avg) | If reporting staff costs on a fully-loaded basis, this input field is not available. If not reporting staff costs on a fully-loaded basis, enter the currency value of the average sum of all other known costs per Prevention Analyst (per hour, day, week, month, or year). |
| Alert Staff Costs (avg) | If reporting staff costs on a fully-loaded basis, enter the currency value of total average cost per Detection Alert Staff (per hour, day, week, month, or year). If not reporting staff costs on a fully-loaded basis, enter the currency value of the average sum of salary, benefit, and tax costs per Alert Staff (per hour, day, week, month, or year). |
| Other Alert Staff Costs (avg) | If reporting staff costs on a fully-loaded basis, this input field is not available. If not reporting staff costs on a fully-loaded basis, enter the currency value of the average sum of all other known costs per Alert Staff (per hour, day, week, month, or year). |
| Chargeback Staff Costs (avg) - Detection | If reporting staff costs on a fully-loaded basis, enter the currency value of total average cost Detection Specialist (per hour, day, week, month, or year). If not reporting staff costs on a fully-loaded basis, enter the currency value of the average sum of salary, benefit, and tax costs per Detection Specialist (per hour, day, week, month, or year). |
| Other Chargeback Staff Costs (avg) - Detection | If reporting staff costs on a fully-loaded basis, this input field is not available. If not reporting staff costs on a fully-loaded basis, enter the currency value of the average sum of all other known costs per Detection Specialist (per hour, day, week, month, or year). |

TABLE 4-continued

Human Resources

| Input Item | Definition |
|---|---|
| Chargeback Staff Costs (avg) - Recovery | If reporting staff costs on a fully-loaded basis, enter the currency value of total average cost per Recovery Specialist (per hour, day, week, month, or year). If not reporting staff costs on a fully-loaded basis, enter the currency value of the average sum of salary, benefit, and tax costs per Recovery Specialist (per hour, day, week, month, or year). |
| Other Chargeback Staff Costs (avg) - Recovery | If reporting staff costs on a fully-loaded basis, this input field is not available. If not reporting staff costs on a fully-loaded basis, enter the currency value of the average sum of all other known costs per Recovery Specialist (per hour, day, week, month, or year). |
| Administrative Staff Costs (avg) - Detection | If reporting staff costs on a fully-loaded basis, enter the currency value of total average cost per Detection Administrative Assistant (per hour, day, week, month, or year). If not reporting staff costs on a fully-loaded basis, enter the currency value of the average sum of salary, benefit, and tax costs per Detection Administrative Assistant (per hour, day, week, month, or year). |
| Other Administrative Staff Costs (avg) - Detection | If reporting staff costs on a fully-loaded basis, this input field is not available. If not reporting staff costs on a fully-loaded basis, enter the currency value of the average sum of all other known costs per Detection Administrative Assistant (per hour, day, week, month, or year). |
| Administrative Staff Costs (avg) - Recovery | If reporting staff costs on a fully-loaded basis, enter the currency value of total average cost per Recovery Support Assistant (per hour, day, week, month, or year). If not reporting staff costs on a fully-loaded basis, enter the currency value of the average sum of salary, benefit, and tax costs per Recovery Administrative Assistant (per hour, day, week, month, or year). |
| Other Administrative Staff Costs (avg) - Recovery | If reporting staff costs on a fully-loaded basis, this input field is not available. If not reporting staff costs on a fully-loaded basis, enter the currency value of the average sum of all other known costs per Recovery Administrative Assistant (per hour, day, week, month, or year). |
| Supervisory Staff Costs (avg) - Detection | If reporting staff costs on a fully-loaded basis, enter the currency value of total average cost per Detection Supervisor (per hour, day, week, month, or year). If not reporting staff costs on a fully-loaded basis, enter the currency value of the average sum of salary, benefit, and tax costs per Detection Supervisor (per hour, day, week, month, or year). |
| Other Supervisory Staff Costs (avg) - Detection | If reporting staff costs on a fully-loaded basis, this input field is not available. If not reporting staff costs on a fully-loaded basis, enter the currency value of the average sum of all other known costs per Detection Supervisor (per hour, day, week, month, or year). |
| Supervisory Staff Costs (avg) - Recovery | If reporting staff costs on a fully-loaded basis, enter the currency value of total average cost per Recovery Supervisor (per hour, day, week, month, or year). If not reporting staff costs on a fully-loaded basis, enter the currency value of the average sum of salary, benefit, and tax costs per Recovery Supervisor (per hour, day, week, month, or year). |
| Other Supervisory Staff Costs (avg) - Recovery | If reporting staff costs on a fully-loaded basis, this input field is not available. If not reporting staff costs on a fully-loaded basis, enter the currency value of the average sum of all other known costs per Recovery Supervisor (per hour, day, week, month, or year). |
| Management Staff Costs (avg) | If reporting staff costs on a fully-loaded basis, enter the currency value of total average cost per Fraud Manager (per hour, day, week, month, or year). |
| Other Management Staff Costs (avg) | If not reporting staff costs on a fully-loaded basis, enter the currency value of the average sum of salary, benefit, and tax costs per Fraud Manager (per hour, day, week, month, or year). If reporting staff costs on a fully-loaded basis, this input field is not available. If not reporting staff costs on a fully-loaded basis, enter the currency value of the average sum of all other known costs per Fraud Manager (per hour, day, week, month, or year). |

Prevention

| Input Item | Definition |
|---|---|
| Number of Prevention Analysts (FTE) | Enter the total number of full-time equivalent Prevention Analysts employed (to the nearest tenth of an employee). |

Detection

| Input Item | Definition |
|---|---|
| Number of Alert Staff (FTE) | Enter the total full-time equivalent Detection Alert Staff employed (to the nearest tenth of an employee). |
| Number of Chargeback Specialists (FTE) | Enter the total full-time equivalent Detection Specialists employed (to the nearest tenth of an employee). |
| Number of Administrative Assistants (FTE) | Enter the total full-time equivalent Detection Administrative Assistants employed (to the nearest tenth of an employee). |
| Number of Supervisors (FTE) | Enter the total full-time equivalent Detection Supervisors employed (to the nearest tenth of an employee). |
| Number of Managers (FTE) | Enter the total full-time equivalent Fraud Managers employed (to the nearest tenth of an employee). |

Investigation & Recovery

| Input Item | Definition |
|---|---|
| Number of Chargeback Specialists (FTE) | Enter the total full-time equivalent Recovery Specialists employed (to the nearest tenth of an employee). |
| Number of Administrative Assistants (FTE) | Enter the total full-time equivalent Recovery Administrative Assistants employed (to the nearest tenth of an employee). |
| Number of Supervisors (FTE) | Enter the total full-time equivalent Recovery Supervisors employed (to the nearest tenth of an employee). |

TABLE 5

Overhead

| Input Item | | Definition |
|---|---|---|
| Where are fraud Prevention/Detection/Recovery efforts conducted? | | Select whether Prevention, Detection, and Recovery operations are carried out in a common facility or in separate facilities. |
| Options for Common Facility | Rent/Lease Costs | If Prevention, Detection, and Recovery operations are carried out in a common facility, enter the currency value of the Rent/Lease costs of the facility (per month, quarter, year, square foot/meter, or employee). |
| | Computer Equipment Costs | If Prevention, Detection, and Recovery operations are carried out in a common facility, enter the currency value of the Computer Equipment costs of the facility (per month, quarter, year, square foot/meter, or employee). |
| | Utilities Costs | If Prevention, Detection, and Recovery operations are carried out in a common facility, enter the currency value of the Utilities costs of the facility (per month, quarter, year, square foot/meter, or employee). |
| | Telephone Costs | If Prevention, Detection, and Recovery operations are carried out in a common facility, enter the currency value of the Telephone costs of the facility (per month, quarter, year, square foot/meter, or employee). |

TABLE 5-continued

Overhead

| Input Item | Definition |
|---|---|
| Other Costs | If Prevention, Detection, and Recovery operations are carried out in a common facility, enter the currency value of the total of any other costs of the facility (per month, quarter, year, square foot/meter, or employee). |
| Prevention | If Prevention, Detection, and Recovery operations are carried out in a common facility, enter the percentage allocation of the facility's usage to Prevention activities. |
| Rent/Lease Costs | If Prevention, Detection, and Recovery operations are carried out in a common facility, the currency value of this field is calculated automatically based on Rent/Lease costs of the common facility and the allocation of that facility to Prevention activities.<br>If Prevention, Detection, and Recovery operations are carried out in separate facilities, enter the currency value of the Rent/Lease costs of the Prevention facility (per month, quarter, year, square foot/meter, or employee). |
| Computer Equipment Costs | If Prevention, Detection, and Recovery operations are carried out in a common facility, the currency value of this field is calculated automatically based on Computer Equipment costs of the common facility and the allocation of that facility to Prevention activities.<br>If Prevention, Detection, and Recovery operations are carried out in separate facilities, enter the currency value of the Computer Equipment costs of the Prevention facility (per month, quarter, year, square foot/meter, or employee). |
| Utilities Costs | If Prevention, Detection, and Recovery operations are carried out in a common facility, the currency value of this field is calculated automatically based on Utilities costs of the common facility and the allocation of that facility to Prevention activities.<br>If Prevention, Detection, and Recovery operations are carried out in separate facilities, enter the currency value of the Utilities costs of the Prevention facility (per month, quarter, year, square foot/meter, or employee). |
| Telephone Costs | If Prevention, Detection, and Recovery operations are carried out in a common facility, the currency value of this field is calculated automatically based on Telephone costs of the common facility and the allocation of that facility to Prevention activities.<br>If Prevention, Detection, and Recovery operations are carried out in separate facilities, enter the currency value of the Telephone costs of the Prevention facility (per month, quarter, year, square foot/meter, or employee). |
| Other Costs | If Prevention, Detection, and Recovery operations are carried out in a common facility, the currency value of this field is calculated automatically based on Other costs of the common facility and the allocation of that facility to Prevention activities.<br>If Prevention, Detection, and Recovery operations are carried out in separate facilities, enter the currency value of the Other costs of the Prevention facility (per month, quarter, year, square foot/meter, or employee). |
| Detection | If Prevention, Detection, and Recovery operations are carried out in a common facility, enter the percentage allocation of the facility's usage to Detection activities. |
| Rent/Lease Costs | If Prevention, Detection, and Recovery operations are carried out in a common facility, the currency value of this field is calculated automatically based on Rent/Lease costs of the common facility and the allocation of that facility to Detection activities.<br>If Prevention, Detection, and Recovery operations are carried out in separate facilities, enter the currency value of the Rent/Lease costs of the Detection facility (per month, quarter, year, square foot/meter, or employee). |
| Computer Equipment Costs | If Prevention, Detection, and Recovery operations are carried out in a common facility, the currency value of this field is calculated automatically based on Computer Equipment costs of the common facility and the allocation of that facility to Detection activities.<br>If Prevention, Detection, and Recovery operations are carried out in separate facilities, enter the currency value of the Computer Equipment costs of the Detection facility (per month, quarter, year, square foot/meter, or employee). |
| Utilities Costs | If Prevention, Detection, and Recovery operations are carried out in a common facility, the currency value of this field is calculated automatically based on Utilities costs of the common facility and the allocation of that facility to Detection activities.<br>If Prevention, Detection, and Recovery operations are carried out in separate facilities, enter the currency value of the Utilities costs of the Detection facility (per month, quarter, year, square foot/meter, or employee). |
| Telephone Costs | If Prevention, Detection, and Recovery operations are carried out in a common facility, the currency value of this field is calculated automatically based on Telephone costs of the common facility and the allocation of that facility to Detection activities.<br>If Prevention, Detection, and Recovery operations are carried out in separate facilities, enter the currency value of the Telephone costs of the Detection facility (per month, quarter, year, square foot/meter, or employee). |
| Other Costs | If Prevention, Detection, and Recovery operations are carried out in a common facility, the currency value of this field is calculated automatically based on Other costs of the common facility and the allocation of that facility to Detection activities.<br>If Prevention, Detection, and Recovery operations are carried out in separate facilities, enter the currency value of the Other costs of the Detection facility (per month, quarter, year, square foot/meter, or employee). |
| Investigation & Recovery | If Prevention, Detection, and Recovery operations are carried out in a common facility, enter the percentage allocation of the facility's usage to Investigation & Recovery activities. |
| Rent/Lease Costs | If Prevention, Detection, and Recovery operations are carried out in a common facility, the currency value of this field is calculated automatically based on Rent/Lease costs of the common facility and the allocation of that facility to Investigation & Recovery activities.<br>If Prevention, Detection, and Recovery operations are carried out in separate facilities, enter the currency value of the Rent/Lease costs of the Investigation & Recovery facility (per month, quarter, year, square foot/meter, or employee). |
| Computer Equipment Costs | If Prevention, Detection, and Recovery operations are carried out in a common facility, the currency value of this field is calculated automatically based on Computer Equipment costs of the common facility and the allocation of that facility to Investigation & Recovery activities.<br>If Prevention, Detection, and Recovery operations are carried out in separate facilities, enter the currency value of the Computer |

TABLE 5-continued

Overhead

| Input Item | Definition |
|---|---|
| | Equipment costs of the Investigation & Recovery facility (per month, quarter, year, square foot/meter, or employee). |
| Utilities Costs | If Prevention, Detection, and Recovery operations are carried out in a common facility, the currency value of this field is calculated automatically based on Utilities costs of the common facility and the allocation of that facility to Investigation & Recovery activities. If Prevention, Detection, and Recovery operations are carried out in separate facilities, enter the currency value of the Utilities costs of the Investigation & Recovery facility (per month, quarter, year, square foot/meter, or employee). |
| Telephone Costs | If Prevention, Detection, and Recovery operations are carried out in a common facility, the currency value of this field is calculated automatically based on Telephone costs of the common facility and the allocation of that facility to Investigation & Recovery activities. If Prevention, Detection, and Recovery operations are carried out in separate facilities, enter the currency value of the Telephone costs of the Investigation & Recovery facility (per month, quarter, year, square foot/meter, or employee). |
| Other Costs | If Prevention, Detection, and Recovery operations are carried out in a common facility, the currency value of this field is calculated automatically based on Other costs of the common facility and the allocation of that facility to Investigation & Recovery activities. If Prevention, Detection, and Recovery operations are carried out in separate facilities, enter the currency value of the Other costs of the Investigation & Recovery facility (per month, quarter, year, square foot/meter, or employee). |

TABLE 6

Systems

| Input Item | Definition |
|---|---|
| Authorization | |
| What % of Authorization Systems Use is Attributable to Fraud? | Select "Enter Manually" and enter the percentage allocation of user's organization's authorization systems to fraud operations. If the allocation is unknown, select "Calculate Automatically" and the allocation will be determined based on the percentage of fraud (and compromised account) referrals relative to total credit referrals. The formula used to automatically calculate this allocation is based on weighted average use of authorization systems to generate fraud-related referrals and declines as follows: [Fraud-related Declines (%) * (number of declines/(number of declines + number of referrals))] + [fraud-related referrals (%) * (number of referrals/(number of declines + number of referrals))] |
| Depreciation Costs | Enter the currency value of total depreciation costs (per month, quarter, or year) associated with user's organization's authorization systems. |
| Licensing Costs | Enter the currency value of total licensing costs (per month, quarter, or year) associated with user's organization's authorization systems. |
| Hardware Costs | Enter the currency value of total hardware costs (per month, quarter, or year) associated with user's organization's authorization systems. |
| Maintenance Costs | Enter the currency value of total maintenance costs (per month, quarter, or year) associated with user's organization's authorization systems. |
| Staff Costs (FTE) | Enter the currency value of total equivalent IT staff costs (per month, quarter, or year) associated with user's organization's authorization systems. |
| Other Costs | Enter the currency value of total of any other costs (per month, quarter, or year) associated with user's organization's authorization systems. |
| Detection | |
| Depreciation Costs | Enter the currency value of total depreciation costs (per month, quarter, or year) associated with user's organization's fraud detection systems. |
| Licensing Costs | Enter the currency value of total licensing costs (per month, quarter, or year) associated with user's organization's fraud detection systems. |
| Hardware Costs | Enter the currency value of total hardware costs (per month, quarter, or year) associated with user's organization's fraud detection systems. |
| Maintenance Costs | Enter the currency value of total maintenance costs (per month, quarter, or year) associated with user's organization's fraud detection systems. |
| Staff Costs (FTE) | Enter the currency value of total equivalent IT staff costs (per month, quarter, or year) associated with user's organization's fraud detection systems. |
| Other Costs | Enter the currency value of total of any other costs (per month, quarter, or year) associated with user's organization's fraud detection systems. |
| Analysis | |
| Depreciation Costs | Enter the currency value of total depreciation costs (per month, quarter, or year) associated with user's organization's fraud analysis systems. |
| Licensing Costs | Enter the currency value of total licensing costs (per month, quarter, or year) associated with user's organization's fraud analysis systems. |
| Hardware Costs | Enter the currency value of total hardware costs (per month, quarter, or year) associated with user's organization's fraud analysis systems. |
| Maintenance Costs | Enter the currency value of total maintenance costs (per month, quarter, or year) associated with user's organization's fraud analysis systems. |
| Staff Costs (FTE) | Enter the currency value of total equivalent IT staff costs (per month, quarter, or year) associated with user's organization's fraud analysis systems. |
| Other Costs | Enter the currency value of total of any other costs (per month, quarter, or year) associated with user's organization's fraud analysis systems. |
| Chargeback Management | |
| What % of Chargeback Management Systems Use is Attributable to Fraud? | Select "Enter Manually" and enter the percentage allocation of user's organization's chargeback management systems to fraud operations. If the allocation is unknown, select "Calculate Automatically" and the allocation will be determined based on the annualized ratio of fraud-related customer disputes relative to total customer disputes. The formula used to automatically calculate this allocation is based on fraud-related customer disputes relative to total customer disputes as follows: Number of fraud-related customer disputes (annualized)/number of customer disputes (annualized) |
| Depreciation Costs | Enter the currency value of total depreciation costs (per month, quarter, or year) associated with user's organization's chargeback management systems. |
| Licensing Costs | Enter the currency value of total licensing costs (per month, quarter, or year) associated with user's organization's chargeback management systems. |
| Hardware Costs | Enter the currency value of total hardware costs (per month, quarter, or year) associated with user's organization's chargeback management systems. |
| Maintenance Costs | Enter the currency value of total maintenance costs (per month, quarter, or year) associated with user's organization's chargeback management systems. |

TABLE 6-continued

Systems

| Input Item | Definition |
| --- | --- |
| Staff Costs (FTE) | Enter the currency value of total equivalent IT staff costs (per month, quarter, or year) associated with user's organization's chargeback management systems. |
| Other Costs | Enter the currency value of total of any other costs (per month, quarter, or year) associated with user's organization's chargeback management systems. |
| PIN Management | |
| Depreciation Costs | Enter the currency value of total depreciation costs (per month, quarter, or year) associated with user's organization's PIN Management systems. |
| Licensing Costs | Enter the currency value of total licensing costs (per month, quarter, or year) associated with user's organization's PIN Management systems. |
| Hardware Costs | Enter the currency value of total hardware costs (per month, quarter, or year) associated with user's organization's PIN Management systems. |
| Maintenance Costs | Enter the currency value of total maintenance costs (per month, quarter, or year) associated with user's organization's PIN Management systems. |
| Staff Costs (FTE) | Enter the currency value of total equivalent IT staff costs (per month, quarter, or year) associated with user's organization's PIN Management systems. |
| Other Costs | Enter the currency value of total of any other costs (per month, quarter, or year) associated with user's organization's fraud PIN Management systems. |

TABLE 7

Operating Expenses

| Input Item | | Definition |
| --- | --- | --- |
| Compliance | | |
| Information Security | Value of Technology Investments | Enter the currency value of compliance-related investments made in software, hardware, and general technologies to improve information security (per month, quarter, or year). |
| | Compliance Audit Costs | Enter the currency value of the costs of compliance-related audits performed (per month, quarter, or year). |
| | Scan Costs | Enter the currency value of the costs of compliance-related scans performed (per month, quarter, or year). |
| Value of Fines & Penalties | | Enter the currency value of total card association fines and penalties incurred as a result of partial or non-compliance to established information security standards (per month, quarter, or year). |
| Other Compliance Costs | | Enter the currency value of any other known compliance-related expenses incurred associated with user's organization's fraud operations (per month, quarter, or year). |
| Training | | |
| Fraud-related Training Costs | | Enter the currency value of total fraud-related training costs incurred by user's organization (per month, quarter, or year). |
| Other Operating Expenses | | |
| Postal Costs | | Enter the currency value of the total postal costs, except for those associated with card replacements, associated with user's organization's fraud operations (per month, quarter, or year). |
| Copy/Fax/Print Costs | | Enter the currency value of the total copying/faxing/printing costs associated with user's organization's fraud operations (per month, quarter, or year). |
| Office Supply Costs | | Enter the currency value of the total office supply costs associated with user's organization's fraud operations (per month, quarter, or year). |

TABLE 7-continued

Operating Expenses

| Input Item | Definition |
| --- | --- |
| Other Costs | Enter the currency value of any other known operating expenses associated with user's organization's fraud operations (per month, quarter, or year). |

Similar to the issuer inputs in FIGS. 7A and 7B, the inputs (FIG. 5) for an acquirer perspective are entered into the electronic spreadsheet of the assessment module 34 according to the embodiment as shown in FIGS. 7C and 7D. Under the General Parameters 201 component, a user enters/inputs general data such as Label, period of financial data, currency format of input, number of hours of a normal workday, the number of days of a normal work week (typically 5 days), the number of weeks in a normal work year, and net pre-tax profit margin rate, e.g., (total revenue minus total expenses) divided by (total sales volume plus cash volume).

Under the Sales Unit Data 202 component (Merchant Servicing 206 category) for acquirer, the user enters inputs into electronic spreadsheet of the assessment module 34. The Merchant Servicing 206 category is derived from the transactions generated by the merchants under the acquirer's portfolio. Specifically, the user enters each data item in the input categories of "Number of Merchants (avg)", "Number of Transactions (avg)", "Merchant Discount Rate (%)", "Interchange Rate (avg), and "Merchant Sales Volume (avg)". The definition for each data item to be entered into the Sales Unit Data 202 component is listed below in Table 8.

TABLE 8

Merchants

| Input Item | Definition |
| --- | --- |
| Number of Merchants (avg) | Enter the average number of Merchants in user's organization's Acquiring portfolio. |
| Number of Transactions (avg) | Enter the average number of transactions generated by the merchant portfolio. |
| Merchant Discount Rate (%) | Enter the average Merchant Discount Rate (MDR) |
| Interchange Rate (avg) | Enter the average interchange rate charged |
| Merchant Sales Volume (avg) | Enter the currency value of the average net sales generated by the merchant portfolio for purchase transactions. |

Similarly, the definition for each data item to be entered into the categories of Customer Service 212, Fraud Operations 214, Human Resources 216, Overhead 218, Systems and Services 220, and Operation Expense 222 is listed below in Tables 9-14.

TABLE 9

Customer Service

| Input Item | Definition |
| --- | --- |
| Inbound | |
| Call Received Cost (avg unit cost) | Enter the currency value of the average per-unit cost of receiving and processing a Customer Service inquiry, including calls for dispute handling (chargebacks), and account activity monitoring. |
| Number of Inquiries per Fraud Case(avg) | Enter the average number of inquiries made to Customer Service for a typical fraud case, including inquiries in support of dispute handling. |

TABLE 9-continued

Customer Service

| Input Item | Definition |
|---|---|
| Outbound | |
| Call Cost - Cable (avg unit cost) | Enter the currency value of the average per-unit cost of placing an outbound call to merchants through cable/land based phone lines. |
| Number of Calls per Fraud Case - Cable (avg) | Enter the average number of cable/land-line outbound calls placed to merchants per fraud case reported, including calls in support of fraud investigations. |
| Call Cost - Mobile (avg unit cost) | Enter the currency value of the average per-unit cost of placing an outbound mobile call to merchants |
| Number of Calls per Fraud Case - Mobile (avg) | Enter the average number of mobile outbound calls placed to merchants per fraud case reported, including calls in support of fraud investigations. |

TABLE 10

Fraud Operations

| Input Item | Definition |
|---|---|
| Authorization | |
| Number of Incorrect Fraud-related Declines | Enter the number of authorization declines due to established parameters that incorrectly decline for fraud-based policies or referrals. |
| Recoveries & Chargeoffs | |
| Value of Chargebacks from Issuer | Enter the gross currency value of fraud losses resulting from Issuer chargebacks. |
| Value of Fraud-related Merchant Chargebacks | Enter the total currency value of fraud chargebacks presented to merchants (per month, quarter, or year). |
| Value of Fraud-related Representments | Enter the total currency value of merchant fraud chargebacks represented and accepted (per month, quarter, or year). |
| Value of Fraud Insurance Recoveries (avg) | Enter the average total currency value of insurance recoveries resulting from fraudulent or unauthorized user activity (per month, quarter, or year). |
| Exception Handling | |
| Number of Fraud Cases Reported | Enter the total number of fraud cases reported (per month, quarter, or year) among merchants. Fraud cases should be measured at the account (not card) level and may constitute one or more transactions. |
| Number of Merchant Disputes | Enter the total number of merchant disputes (per month, quarter, or year). Disputes should be defined on a per transaction basis. |
| Number of Fraud-related Merchant Disputes | Enter the total number of merchant disputes (per month, quarter, or year) attributable to fraudulent activity. Disputes should be defined on a per-transaction basis. |
| Bankcard Processing | |
| Authorization Fee per Transaction (avg) | Enter the currency value of the average per-transaction authorization (e.g., BASE I) fees incurred by user's organization. |
| Settlement Fee per Transaction (avg) | Enter the currency value of the average per-transaction settlement (e.g., BASE II) fees incurred by user's organization. |
| Value of Fraud-related Processing Fees | Enter the currency value of the total fraud-related transaction processing fees (TC40, SAFE, chargeback reporting, representments, etc.) incurred by user's organization. |
| Other | |
| Value of Fraud Insurance Premiums | Enter the currency value of the cost of fraud insurance premiums (per month, quarter, or year). |
| Value of Fraud-related Legal Fees | Enter the currency value of the total cost of legal fees (per month, quarter, or year), including counsel and prosecution, resulting from fraudulent or unauthorized activity. |

TABLE 10-continued

Fraud Operations

| Input Item | Definition |
|---|---|
| Value of Fraud-related Opportunity Costs | If any specific Opportunity Costs are known to be incurred by user's organization resulting from fraudulent or unauthorized activity, enter the gross currency amount. Example: As an Acquirer decide to cancel merchants with excessive fraud or unauthorized activity. Some of these merchants also utilize user's organization's payroll services, but understandably choose to bank elsewhere upon being cancelled. In this example, the opportunity cost to enter would be the payroll services revenues forgone by canceling these merchants. |
| Value of PIN-Based Security Upgrades & Enhancements | Enter the currency value of investments made in security cameras, encryption software, protective equipment, tamper proofing, and any other tools or paraphernalia used to improve the overall security and integrity of PIN-based transactions (per month, quarter, or year). |
| Value of Other Fraud Losses | Enter the currency value of the total amount of any other known costs associated with user's organization's direct fraud operations (per month, quarter, or year). |

TABLE 11

Human Resources

| Input Item | Definition |
|---|---|
| Are staff costs reported on a fully loaded/all-inclusive basis? | Select "Yes" to report all fraud staff costs on a fully-loaded (single line) basis. Select "No" to report staff salaries, benefits, and taxes separately from any other known costs. |
| Prevention Analysts Costs (avg) | If reporting staff costs on a fully-loaded basis, enter the currency value of total average cost per Prevention Analyst (per hour, day, week, month, or year). If not reporting staff costs on a fully-loaded basis, enter the currency value of the average sum of salary, benefit, and tax costs per Prevention Analyst (per hour, day, week, month, or year). |
| Other Prevention Analysts Costs (avg) | If reporting staff costs on a fully-loaded basis, this input field is not available. If not reporting staff costs on a fully-loaded basis, enter the currency value of the average sum of all other known costs per Prevention Analyst (per hour, day, week, month, or year). |
| Alert Staff Costs (avg) | If reporting staff costs on a fully-loaded basis, enter the currency value of total average cost per Detection Alert Staff (per hour, day, week, month, or year). If not reporting staff costs on a fully-loaded basis, enter the currency value of the average sum of salary, benefit, and tax costs per Alert Staff (per hour, day, week, month, or year). |
| Other Alert Staff Costs (avg) | If reporting staff costs on a fully-loaded basis, this input field is not available. If not reporting staff costs on a fully-loaded basis, enter the currency value of the average sum of all other known costs per Alert Staff (per hour, day, week, month, or year). |
| Chargeback Staff Costs (avg) - Detection | If reporting staff costs on a fully-loaded basis, enter the currency value of total average cost Detection Specialist (per hour, day, week, month, or year). If not reporting staff costs on a fully-loaded basis, enter the currency value of the average sum of salary, benefit, and tax costs per Detection Specialist (per hour, day, week, month, or year). |

TABLE 11-continued

Human Resources

| Input Item | Definition |
|---|---|
| Other Chargeback Staff Costs (avg) - Detection | If reporting staff costs on a fully-loaded basis, this input field is not available. If not reporting staff costs on a fully-loaded basis, enter the currency value of the average sum of all other known costs per Detection Specialist (per hour, day, week, month, or year). |
| Chargeback Staff Costs (avg) - Recovery | If reporting staff costs on a fully-loaded basis, enter the currency value of total average cost per Recovery Specialist (per hour, day, week, month, or year). If not reporting staff costs on a fully-loaded basis, enter the currency value of the average sum of salary, benefit, and tax costs per Recovery Specialist (per hour, day, week, month, or year). |
| Other Chargeback Staff Costs (avg) - Recovery | If reporting staff costs on a fully-loaded basis, this input field is not available. If not reporting staff costs on a fully-loaded basis, enter the currency value of the average sum of all other known costs per Recovery Specialist (per hour, day, week, month, or year). |
| Administrative Staff Costs (avg) - Detection | If reporting staff costs on a fully-loaded basis, enter the currency value of total average cost per Detection Administrative Assistant (per hour, day, week, month, or year). If not reporting staff costs on a fully-loaded basis, enter the currency value of the average sum of salary, benefit, and tax costs per Detection Administrative Assistant (per hour, day, week, month, or year). |
| Other Administrative Staff Costs (avg) - Detection | If reporting staff costs on a fully-loaded basis, this input field is not available. If not reporting staff costs on a fully-loaded basis, enter the currency value of the average sum of all other known costs per Detection Administrative Assistant (per hour, day, week, month, or year). |
| Administrative Staff Costs (avg) - Recovery | If reporting staff costs on a fully-loaded basis, enter the currency value of total average cost per Recovery Support Assistant (per hour, day, week, month, or year). If not reporting staff costs on a fully-loaded basis, enter the currency value of the average sum of salary, benefit, and tax costs per Recovery Administrative Assistant (per hour, day, week, month, or year). |
| Other Administrative Staff Costs (avg) - Recovery | If reporting staff costs on a fully-loaded basis, this input field is not available. If not reporting staff costs on a fully-loaded basis, enter the currency value of the average sum of all other known costs per Recovery Administrative Assistant (per hour, day, week, month, or year). |
| Supervisory Staff Costs (avg) - Detection | If reporting staff costs on a fully-loaded basis, enter the currency value of total average cost per Detection Supervisor (per hour, day, week, month, or year). If not reporting staff costs on a fully-loaded basis, enter the currency value of the average sum of salary, benefit, and tax costs per Detection Supervisor (per hour, day, week, month, or year). |
| Other Supervisory Staff Costs (avg) - Detection | If reporting staff costs on a fully-loaded basis, this input field is not available. If not reporting staff costs on a fully-loaded basis, enter the currency value of the average sum of all other known costs per Detection Supervisor (per hour, day, week, month, or year). |
| Supervisory Staff Costs (avg) - Recovery | If reporting staff costs on a fully-loaded basis, enter the currency value of total average cost per Recovery Supervisor (per hour, day, week, month, or year). If not reporting staff costs on a fully-loaded basis, enter the currency value of the average sum of salary, benefit, and tax costs per Recovery Supervisor (per hour, day, week, month, or year). |
| Other Supervisory Staff Costs (avg) - Recovery | If reporting staff costs on a fully-loaded basis, this input field is not available. If not reporting staff costs on a fully-loaded basis, enter the currency value of the average sum of all other known costs per Recovery Supervisor (per hour, day, week, month, or year). |
| Management Staff Costs (avg) | If reporting staff costs on a fully-loaded basis, enter the currency value of total average cost per Fraud Manager (per hour, day, week, month, or year). If not reporting staff costs on a fully-loaded basis, enter the currency value of the average sum of salary, benefit, and tax costs per Fraud Manager (per hour, day, week, month, or year). |
| Other Management Staff Costs (avg) | If reporting staff costs on a fully-loaded basis, this input field is not available. If not reporting staff costs on a fully-loaded basis, enter the currency value of the average sum of all other known costs per Fraud Manager (per hour, day, week, month, or year). |
| Prevention | |
| Number of Prevention Analysts (FTE) | Enter the total full-time equivalent Prevention Analysts employed (to the nearest tenth of an employee). |
| Detection | |
| Number of Alert Staff (FTE) | Enter the total full-time equivalent Detection Alert Staff employed (to the nearest tenth of an employee). |
| Number of Chargeback Specialists (FTE) | Enter the total full-time equivalent Detection Specialists employed (to the nearest tenth of an employee). |
| Number of Administrative Assistants (FTE) | Enter the total full-time equivalent Detection Administrative Assistants employed (to the nearest tenth of an employee). |
| Number of Supervisors (FTE) | Enter the total full-time equivalent Detection Supervisors employed (to the nearest tenth of an employee). |
| Number of Managers (FTE) | Enter the total full-time equivalent Fraud Managers employed (to the nearest tenth of an employee). |
| Investigation & Recovery | |
| Number of Chargeback Specialists (FTE) | Enter the total full-time equivalent Recovery Specialists employed (to the nearest tenth of an employee). |
| Number of Administrative Assistants (FTE) | Enter the total full-time equivalent Recovery Administrative Assistants employed (to the nearest tenth of an employee). |
| Number of Supervisors (FTE) | Enter the total full-time equivalent Recovery Supervisors employed (to the nearest tenth of an employee). |

TABLE 12

Overhead

| Input Item | | Definition |
|---|---|---|
| Where are fraud Prevention/Detection/ Recovery efforts conducted? | | Select whether Prevention, Detection, and Recovery operations are carried out in a common facility or in separate facilities. |
| Options for Common Facility | Rent/Lease Costs | If Prevention, Detection, and Recovery operations are carried out in a common facility, enter the currency value of the Rent/Lease costs of the facility (per month, quarter, year, square foot/meter, or employee). |
| | Computer Equipment Costs | If Prevention, Detection, and Recovery operations are carried out in a common facility, enter the currency value of the Computer Equipment costs of the facility (per month, quarter, year, square foot/meter, or employee). |

TABLE 12-continued

Overhead

| Input Item | Definition |
|---|---|
| Utilities Costs | If Prevention, Detection, and Recovery operations are carried out in a common facility, enter the currency value of the Utilities costs of the facility (per month, quarter, year, square foot/meter, or employee). |
| Telephone Costs | If Prevention, Detection, and Recovery operations are carried out in a common facility, enter the currency value of the Telephone costs of the facility (per month, quarter, year, square foot/meter, or employee). |
| Other Costs | If Prevention, Detection, and Recovery operations are carried out in a common facility, enter the currency value of the total of any other costs of the facility (per month, quarter, year, square foot/meter, or employee). |
| Prevention | If Prevention, Detection, and Recovery operations are carried out in a common facility, enter the percentage allocation of the facility's usage to Prevention activities. |
| Rent/Lease Costs | If Prevention, Detection, and Recovery operations are carried out in a common facility, the currency value of this field is calculated automatically based on Rent/Lease costs of the common facility and the allocation of that facility to Prevention activities. If Prevention, Detection, and Recovery operations are carried out in separate facilities, enter the currency value of the Rent/Lease costs of the Prevention facility (per month, quarter, year, square foot/meter, or employee). |
| Computer Equipment Costs | If Prevention, Detection, and Recovery operations are carried out in a common facility, the currency value of this field is calculated automatically based on Computer Equipment costs of the common facility and the allocation of that facility to Prevention activities. If Prevention, Detection, and Recovery operations are carried out in separate facilities, enter the currency value of the Computer Equipment costs of the Prevention facility (per month, quarter, year, square foot/meter, or employee). |
| Utilities Costs | If Prevention, Detection, and Recovery operations are carried out in a common facility, the currency value of this field is calculated automatically based on Utilities costs of the common facility and the allocation of that facility to Prevention activities. If Prevention, Detection, and Recovery operations are carried out in separate facilities, enter the currency value of the Utilities costs of the Prevention facility (per month, quarter, year, square foot/meter, or employee). |
| Telephone Costs | If Prevention, Detection, and Recovery operations are carried out in a common facility, the currency value of this field is calculated automatically based on Telephone costs of the common facility and the allocation of that facility to Prevention activities. If Prevention, Detection, and Recovery operations are carried out in separate facilities, enter the currency value of the Telephone costs of the Prevention facility (per month, quarter, year, square foot/meter, or employee). |
| Other Costs | If Prevention, Detection, and Recovery operations are carried out in a common facility, the currency value of this field is calculated automatically based on Other costs of the common facility and the allocation of that facility to Prevention activities. If Prevention, Detection, and Recovery operations are carried out in separate facilities, enter the currency value of the Other costs of the Prevention facility (per month, quarter, year, square foot/meter, or employee). |
| Detection | If Prevention, Detection, and Recovery operations are carried out in a common facility, enter the percentage allocation of the facility's usage to Detection activities. |
| Rent/Lease Costs | If Prevention, Detection, and Recovery operations are carried out in a common facility, the currency value of this field is calculated automatically based on Rent/Lease costs of the common facility and the allocation of that facility to Detection activities. If Prevention, Detection, and Recovery operations are carried out in separate facilities, enter the currency value of the Rent/Lease costs of the Detection facility (per month, quarter, year, square foot/meter, or employee). |
| Computer Equipment Costs | If Prevention, Detection, and Recovery operations are carried out in a common facility, the currency value of this field is calculated automatically based on Computer Equipment costs of the common facility and the allocation of that facility to Detection activities. If Prevention, Detection, and Recovery operations are carried out in separate facilities, enter the currency value of the Computer Equipment costs of the Detection facility (per month, quarter, year, square foot/meter, or employee). |
| Utilities Costs | If Prevention, Detection, and Recovery operations are carried out in a common facility, the currency value of this field is calculated automatically based on Utilities costs of the common facility and the allocation of that facility to Detection activities. If Prevention, Detection, and Recovery operations are carried out in separate facilities, enter the currency value of the Utilities costs of the Detection facility (per month, quarter, year, square foot/meter, or employee). |
| Telephone Costs | If Prevention, Detection, and Recovery operations are carried out in a common facility, the currency value of this field is calculated automatically based on Telephone costs of the common facility and the allocation of that facility to Detection activities. If Prevention, Detection, and Recovery operations are carried out in separate facilities, enter the currency value of the Telephone costs of the Detection facility (per month, quarter, year, square foot/meter, or employee). |
| Other Costs | If Prevention, Detection, and Recovery operations are carried out in a common facility, the currency value of this field is calculated automatically based on Other costs of the common facility and the allocation of that facility to Detection activities. If Prevention, Detection, and Recovery operations are carried out in separate facilities, enter the currency value of the Other costs of the Detection facility (per month, quarter, year, square foot/meter, or employee). |
| Investigation & Recovery | If Prevention, Detection, and Recovery operations are carried out in a common facility, enter the percentage allocation of the facility's usage to Investigation & Recovery activities. |
| Rent/Lease Costs | If Prevention, Detection, and Recovery operations are carried out in a common facility, the currency value of this field is calculated automatically based on Rent/Lease costs of the common facility and the allocation of that facility to Investigation & Recovery activities. If Prevention, Detection, and Recovery operations are carried out in separate facilities, enter the currency value of the Rent/Lease costs of the Investigation & Recovery facility (per month, quarter, year, square foot/meter, or employee). |
| Computer Equipment Costs | If Prevention, Detection, and Recovery operations are carried out in a common facility, the currency value of this field is calculated automatically based on Computer Equipment costs of the common facility and the allocation of that facility to Investigation & Recovery activities. If Prevention, Detection, and Recovery operations are carried out in separate facilities, enter the |

TABLE 12-continued

Overhead

| Input Item | Definition |
| --- | --- |
| | currency value of the Computer Equipment costs of the Investigation & Recovery facility (per month, quarter, year, square foot/meter, or employee). |
| Utilities Costs | If Prevention, Detection, and Recovery operations are carried out in a common facility, the currency value of this field is calculated automatically based on Utilities costs of the common facility and the allocation of that facility to Investigation & Recovery activities. If Prevention, Detection, and Recovery operations are carried out in separate facilities, enter the currency value of the Utilities costs of the Investigation & Recovery facility (per month, quarter, year, square foot/meter, or employee). |
| Telephone Costs | If Prevention, Detection, and Recovery operations are carried out in a common facility, the currency value of this field is calculated automatically based on Telephone costs of the common facility and the allocation of that facility to Investigation & Recovery activities. If Prevention, Detection, and Recovery operations are carried out in separate facilities, enter the currency value of the Telephone costs of the Investigation & Recovery facility (per month, quarter, year, square foot/meter, or employee). |
| Other Costs | If Prevention, Detection, and Recovery operations are carried out in a common facility, the currency value of this field is calculated automatically based on Other costs of the common facility and the allocation of that facility to Investigation & Recovery activities. If Prevention, Detection, and Recovery operations are carried out in separate facilities, enter the currency value of the Other costs of the Investigation & Recovery facility (per month, quarter, year, square foot/meter, or employee). |

TABLE 13

Systems

| Input Item | Definition |
| --- | --- |
| Detection | |
| Depreciation Costs | Enter the currency value of total depreciation costs (per month, quarter, or year) associated with user's organization's fraud detection systems. |
| Licensing Costs | Enter the currency value of total licensing costs (per month, quarter, or year) associated with user's organization's fraud detection systems. |
| Hardware Costs | Enter the currency value of total hardware costs (per month, quarter, or year) associated with user's organization's fraud detection systems. |
| Maintenance Costs | Enter the currency value of total maintenance costs (per month, quarter, or year) associated with user's organization's fraud detection systems. |
| Staff Costs (FTE) | Enter the currency value of total equivalent IT staff costs (per month, quarter, or year) associated with user's organization's fraud detection systems. |
| Other Costs | Enter the currency value of total of any other costs (per month, quarter, or year) associated with user's organization's fraud detection systems. |
| Analysis | |
| Depreciation Costs | Enter the currency value of total depreciation costs (per month, quarter, or year) associated with user's organization's fraud analysis systems. |
| Licensing Costs | Enter the currency value of total licensing costs (per month, quarter, or year) associated with user's organization's fraud analysis systems. |
| Hardware Costs | Enter the currency value of total hardware costs (per month, quarter, or year) associated with user's organization's fraud analysis systems. |
| Maintenance Costs | Enter the currency value of total maintenance costs (per month, quarter, or year) associated with user's organization's fraud analysis systems. |
| Staff Costs (FTE) | Enter the currency value of total equivalent IT staff costs (per month, quarter, or year) associated with user's organization's fraud analysis systems. |
| Other Costs | Enter the currency value of total of any other costs (per month, quarter, or year) associated with user's organization's fraud analysis systems. |
| Chargeback Management | |
| What % of Chargeback Management Systems Use is Attributable to Fraud? | Select "Enter Manually" and enter the percentage allocation of user's organization's chargeback management systems to fraud operations. If the allocation is unknown, select "Calculate Automatically" and the allocation will be determined based on the annualized ratio of fraud-related merchant disputes relative to total merchant disputes. The formula used to automatically calculate this allocation is based on fraud-related merchant disputes relative to total merchant disputes as follows: Number of fraud-related merchant disputes (annualized)/number of merchant disputes (annualized) |
| Depreciation Costs | Enter the currency value of total depreciation costs (per month, quarter, or year) associated with user's organization's chargeback management systems. |
| Licensing Costs | Enter the currency value of total licensing costs (per month, quarter, or year) associated with user's organization's chargeback management systems. |
| Hardware Costs | Enter the currency value of total hardware costs (per month, quarter, or year) associated with user's organization's chargeback management systems. |
| Maintenance Costs | Enter the currency value of total maintenance costs (per month, quarter, or year) associated with user's organization's chargeback management systems. |
| Staff Costs (FTE) | Enter the currency value of total equivalent IT staff costs (per month, quarter, or year) associated with user's organization's chargeback management systems. |
| Other Costs | Enter the currency value of total of any other costs (per month, quarter, or year) associated with user's organization's chargeback management systems. |
| PIN Management | |
| Depreciation Costs | Enter the currency value of total depreciation costs (per month, quarter, or year) associated with user's organization's PIN Management systems. |
| Licensing Costs | Enter the currency value of total licensing costs (per month, quarter, or year) associated with user's organization's PIN Management systems. |
| Hardware Costs | Enter the currency value of total hardware costs (per month, quarter, or year) associated with user's organization's PIN Management systems. |
| Maintenance Costs | Enter the currency value of total maintenance costs (per month, quarter, or year) associated with user's organization's PIN Management systems. |
| Staff Costs (FTE) | Enter the currency value of total equivalent IT staff costs (per month, quarter, or year) associated with user's organization's PIN Management systems. |
| Other Costs | Enter the currency value of total of any other costs (per month, quarter, or year) associated with user's organization's fraud PIN Management systems. |

TABLE 14

Operating Expenses

| Input Item | | Definition |
|---|---|---|
| Compliance | | |
| Information Security | Value of Technology Investments | Enter the currency value of compliance-related investments made in software, hardware, and general technologies to improve information security (per month, quarter, or year). |
| | Compliance Audit Costs | Enter the currency value of the costs of compliance-related audits performed (per month, quarter, or year). |
| | Scan Costs | Enter the currency value of the costs of compliance-related scans performed (per month, quarter, or year). |
| Value of Fines & Penalties | | Enter the currency value of total card association fines and penalties incurred as a result of partial or non-compliance to established information security standards (per month, quarter, or year). |
| Other Compliance Costs | | Enter the currency value of any other known compliance-related expenses incurred associated with user's organization's fraud operations (per month, quarter, or year). |
| Training | | |
| Fraud-related Training Costs | | Enter the currency value of total fraud-related training costs incurred by user's organization (per month, quarter, or year). |
| Other Operating Expenses | | |
| Postal Costs | | Enter the currency value of the total postal costs, except for those associated with card replacements, associated with user's organization's fraud operations (per month, quarter, or year). |
| Copy/Fax/Print Costs | | Enter the currency value of the total copying/faxing/printing costs associated with user's organization's fraud operations (per month, quarter, or year). |
| Office Supply Costs | | Enter the currency value of the total office supply costs associated with user's organization's fraud operations (per month, quarter, or year). |
| Other Costs | | Enter the currency value of any other known operating expenses associated with user's organization's fraud operations (per month, quarter, or year). |

For merchant perspective, merchant inputs (FIGS. 7E1-7E3) analogous to the issuer inputs (FIGS. 7A and 7B) and the acquirer inputs (FIGS. 7C and 7D), are entered into the electronic spreadsheet of the assessment module 34 according to the embodiment. Under the General Parameters 301 component, as shown in FIG. 6, a user enters/inputs general data such as Label, period of financial data, currency format of input, number of hours of a normal workday, the number of days of a normal work week (typically 5 days), the number of weeks in a normal work year, and net pre-tax profit margin rate, e.g., (total revenue minus total expenses) divided by (total sales volume plus cash volume).

Then, the user enters the Sales Unit Data 302 component for merchant into the electronic spreadsheet of the assessment module 34. Categorically, the user inputs the Card Servicing 306 category under the Sales Units Data 302 component. Specifically, the user enters each data item in the input categories of "Card Present", "Card Not Present", "Credit", "Debit", and "Other". The definition for each data item to be entered into the Sales Unit Data 302 component is listed below in Table 15.

TABLE 15

Sales Transactions

| Input Item | Definition |
|---|---|
| Card Present | |
| Number of Points of Sale | Enter the total number of card-accepting physical points of sale (POS devices and electronic cash registers) in use by user's organization. |
| Number of Transactions per Point of Sale (avg) | Enter the average number of card-based transactions received at each card-accepting physical point of sale (per month, quarter, or year). |
| Card Not Present | |
| Number of Transactions | Enter the total number of card-based transactions received by user's organization through non-physical channels (per month, quarter, or year). |
| Recurring (%) | Enter the percentage of card-based transactions received by user's organization through non-physical channels that are accounted for by recurring charge transactions. |
| E-Commerce (%) | Enter the percentage of card-based transactions received by user's organization through non-physical channels that are accounted for by E-Commerce transactions. |
| Mail Order/Telephone Order (%) | Enter the percentage of card-based transactions received by user's organization through non-physical channels that are accounted for by mail order/telephone order (MOTO) transactions. |
| Other (%) | This field represents percentage of card-based transactions received by user's organization through non-physical channels that are accounted for other methods of payment acceptance. It is calculated automatically based on the percentage of card based transactions received by user's organization through nonphysical channels that are accounted for by recurring charge, E-Commerce, and MOTO transactions. |
| Credit | |
| Credit Card Transaction (%) | Enter the percentage of all transactions received by user's organization that are paid with a credit card. |
| Value of Sales Transaction (avg) | Enter the currency value of the average amount of a legitimate purchase transaction paid with a credit card. |
| Value of Fraud-related Sales Transaction (avg) | Enter the currency value of the average amount of a fraudulent purchase transaction paid with a credit card. |
| Debit | |
| Debit Card Transaction (%) | Enter the percentage of all transactions received by user's organization that are paid with a debit card. |
| Value of Sales Transaction (avg) | Enter the currency value of the average amount of a legitimate purchase transaction paid with a debit card. |
| Value of Fraud-related Sales Transaction (avg) | Enter the currency value of the average amount of a fraudulent purchase transaction paid with a debit card. |
| Other | |
| Other Transaction (%) | This field represents the percentage of all transactions received by user's organization that are paid using any other form of payment. It is calculated automatically based on the percentages of all transactions received by user's organization that are paid using either a credit or debit card. |
| Value of Sales Transaction (avg) | Enter the currency value of the average amount of a legitimate purchase transaction paid using any other form of payment. |
| Value of Fraud-related Sales Transaction (avg) | Enter the currency value of the average amount of a fraudulent purchase transaction paid using any other form of payment. |

Similarly, under the Operating Cost Data 304 component, the definition for each data item to be entered into the categories of Customer Service 312, Fraud Operations 314, Human Resources 316, Overhead 318, Systems and Services 320, and Operation Expense 322 is listed below in Tables 16-21.

TABLE 16

Customer Service

| Input Item | Definition |
|---|---|
| Inbound | |
| Call Received Cost (avg unit cost) | Enter the currency value of the average per-unit cost of receiving and processing a Customer Service inquiry, including calls for handling fraudulent transaction disputes |
| Number of Inquiries per Fraud-related Dispute (avg) | Enter the average number of inquiries made to Customer Service for a typical dispute related to a fraudulent transaction |
| Outbound | |
| Call Cost - Cable (avg unit cost) | Enter the currency value of the average per-unit cost of placing an outbound call to customers through cable/land based phone lines. |
| Number of Calls per Fraud-related Dispute - Cable (avg) | Enter the average number of cable/land-line outbound calls placed to customers for a typical dispute related to a fraudulent transaction |
| Call Cost - Mobile (avg unit cost) | Enter the currency value of the average per-unit cost of placing an outbound mobile call to customers |
| Number of Calls per Fraud-related Dispute - Mobile (avg) | Enter the average number of mobile outbound calls placed to customers for a typical dispute related to a fraudulent transaction |

TABLE 17

Fraud Operations

| Input Item | Definition |
|---|---|
| What % of Loss Prevention is attributable to Fraud Operations? | Enter the percentage of user's Loss Prevention activities accounted for by operations carried out to specifically support fraud prevention/detection concerns. |
| Authorization | |
| Value of Incorrect Declines - Issuer | Enter the currency value of transactions declined by the Issuer for known blocking (direct authorization declines as well as referral declines) considered by user's organization to be incorrectly declined (per month, quarter, or year). |
| Value of Incorrect Declines - Merchant | Enter the currency value of transactions declined by the Merchant directly for failing the Order Screening process considered by user's organization to be incorrectly declined (per month, quarter, or year). |
| Recoveries & Chargeoffs | |
| Number of Disputes | Enter the total number of customer disputes received (per month, quarter, or year). |
| Fraud-related Disputes (%) | Enter the percentage of all customer disputes initiated by fraudulent transactions |
| Number of Fraud-related Chargebacks | Enter the total number of chargebacks received (per month, quarter, or year) for fraudulent/unauthorized card use. |
| Value of Fraud-related Chargeback (avg) | Enter the currency value of the average amount of a chargeback received for fraudulent/unauthorized card use. |
| Number of Fraud Claims Directly Credited | Enter the total number of claims received (per month, quarter, or year) for fraudulent/unauthorized transactions that are not disputed through the bankcard process (i.e., are directly credited back to the claimant). |
| Value of Fraud Claims Directly Credited | Enter the total currency value of claims received (per month, quarter, or year) for fraudulent/unauthorized transactions that are not disputed through the bankcard process (i.e., are directly credited back to the claimant). |

TABLE 17-continued

Fraud Operations

| Input Item | Definition |
|---|---|
| Value of Fraud Insurance Recoveries (avg) | Enter the average total currency value of insurance recoveries resulting from fraudulent or unauthorized user activity (per month, quarter, or year). |
| Other | |
| Value of Fraud-related Legal Fees | Enter the currency value of the total cost of legal fees (per month, quarter, or year), including counsel and prosecution, resulting from fraudulent/unauthorized activity or compromised accounts. |
| Value of Fraud Insurance Premiums | Enter the currency value of the cost of fraud insurance premiums (per month, quarter, or year). |
| Value of Fraud-related Opportunity Costs | If any specific Opportunity Costs are known to be incurred by user's organization resulting from fraudulent or unauthorized activity, enter the gross currency amount.<br>Example: As a Merchant recognize that a simple referral may lead a certain percentage of customers to abandon their transactions altogether, as opposed to either switching payment methods or completing the referral process. The user also recognizes that, while a majority of these customers are likely fraudsters to begin with, a small percentage of them are indeed legitimate. Hence the user has devised a method of approximating the value of user's lost sales resulting from referrals for legitimate customers. The user would enter that value (per month, quarter, or year) in this field. |
| Value of Other Fraud Losses | Enter the currency value of the total amount of any other known costs associated with user's organization's direct fraud operations (per month, quarter, or year). |

TABLE 18

Human Resources

| Input Item | Definition |
|---|---|
| Are staff costs reported on a fully loaded/all-inclusive basis? | Select "Yes" to report all fraud staff costs on a fully-loaded (single line) basis.<br>Select "No" to report staff salaries, benefits, and taxes separately from any other known costs. |
| Loss Prevention Analysis Staff Costs (avg) | If reporting staff costs on a fully-loaded basis, enter the currency value of total average cost per Loss Prevention Analysis Staff (per hour, day, week, month, or year).<br>If not reporting staff costs on a fully-loaded basis, enter the currency value of the average sum of salary, benefit, and tax costs per Loss Prevention Analysis Staff (per hour, day, week, month, or year). |
| Other Loss Prevention Analysis Staff Costs (avg) | If reporting staff costs on a fully-loaded basis, this input field is not available.<br>If not reporting staff costs on a fully-loaded basis, enter the currency value of the average sum of all other known costs per Loss Prevention Analysis Staff (per hour, day, week, month, or year). |
| Copy Request Analysis Staff Costs (avg) | If reporting staff costs on a fully-loaded basis, enter the currency value of total average cost per Copy Request Analysis Staff (per hour, day, week, month, or year).<br>If not reporting staff costs on a fully-loaded basis, enter the currency value of the average sum of salary, benefit, and tax costs per Copy Requests Analysis Staff (per hour, day, week, month, or year). |
| Other Copy Request Analysis Staff Costs (avg) | If reporting staff costs on a fully-loaded basis, this input field is not available.<br>If not reporting staff costs on a fully-loaded basis, enter the currency value of the average sum of all other known costs per Copy Request Analysis Staff (per hour, day, week, month, or year). |

TABLE 18-continued

Human Resources

| Input Item | Definition |
| --- | --- |
| Loss Prevention Management Staff Costs (avg) | If reporting staff costs on a fully-loaded basis, enter the currency value of total average cost per Loss Prevention Management Staff (per hour, day, week, month, or year). If not reporting staff costs on a fully-loaded basis, enter the currency value of the average sum of salary, benefit, and tax costs per Loss Prevention Management Staff (per hour, day, week, month, or year). |
| Other Loss Prevention Management Staff Costs (avg) | If reporting staff costs on a fully-loaded basis, this input field is not available. If not reporting staff costs on a fully-loaded basis, enter the currency value of the average sum of all other known costs per Loss Prevention Management Staff (per hour, day, week, month, or year). |
| Copy Request Management Staff Costs (avg) | If reporting staff costs on a fully-loaded basis, enter the currency value of total average cost per Copy Request Management Staff (per hour, day, week, month, or year). If not reporting staff costs on a fully-loaded basis, enter the currency value of the average sum of salary, benefit, and tax costs per Copy Request Management Staff (per hour, day, week, month, or year). |
| Other Copy Request Management Staff Costs (avg) | If reporting staff costs on a fully-loaded basis, this input field is not available. If not reporting staff costs on a fully-loaded basis, enter the currency value of the average sum of all other known costs per Copy Request Management Staff (per hour, day, week, month, or year). |
| Analysis | |
| Number of Loss Prevention Analysts (FTE) | Enter the total number of full-time equivalent Loss Prevention Analysts employed (to the nearest tenth of an employee). |
| Number of Copy Request Analysts (FTE) | Enter the total number of full-time equivalent Copy Request Analysts employed (to the nearest tenth of an employee). |
| Management | |
| Number of Loss Prevention Managers (FTE) | Enter the total number of full-time equivalent Loss Prevention Managers employed (to the nearest tenth of an employee). |
| Number of Copy Request Managers (FTE) | Enter the total number of full-time equivalent Copy Request Managers employed (to the nearest tenth of an employee). |

TABLE 19

Overhead

| Input Item | Definition |
| --- | --- |
| What % of Facilities is attributable to Loss Prevention? | Enter the percentage allocation of user's facilities space reserved for Loss Prevention activities. |
| Facilities | |
| Rent/Lease Costs | Enter the currency value of the Rent/Lease costs of user's organization's facilities (per month, quarter, year, square foot/meter, or employee). |
| Computer Equipment Costs | Enter the currency value of user's organization's general Computer Equipment costs (per month, quarter, year, square foot/meter, or employee). |
| Utilities Costs | Enter the currency value of the Utilities costs of user's organization's facilities (per month, quarter, year, square foot/meter, or employee). |
| Telephone Costs | Enter the currency value of user's organization's Telephone costs (per month, quarter, year, square foot/meter, or employee). |
| Other Costs | Enter the currency value of user's organization's other Overhead costs (per month, quarter, year, square foot/meter, or employee). |

TABLE 19-continued

Overhead

| Input Item | Definition |
| --- | --- |
| Facility Size (square feet/meters) | Enter the total size of user's organization's facilities in square feet/meters. If none of user's organization's overhead expenses are measured on a per square foot/meter basis, the user may leave this field blank. |
| Loss Prevention | |
| Rent/Lease Costs | The currency value of this field is calculated automatically based on user's facilities' Rent/Lease costs, facilities allocation towards Loss Prevention activities, number of FTE Loss Prevention staff (if applicable), and facility size (if applicable). |
| Computer Equipment Costs | The currency value of this field is calculated automatically based on user's facilities' general Computer Equipment costs, facilities allocation towards Loss Prevention activities, number of FTE Loss Prevention staff (if applicable), and facility size (if applicable). |
| Utilities Costs | The currency value of this field is calculated automatically based on user's facilities' Utilities costs, facilities allocation towards Loss Prevention activities, number of FTE Loss Prevention staff (if applicable), and facility size (if applicable). |
| Telephone Costs | The currency value of this field is calculated automatically based on user's facilities' Telephone costs, facilities allocation towards Loss Prevention activities, number of FTE Loss Prevention staff (if applicable), and facility size (if applicable). |
| Other Costs | The currency value of this field is calculated automatically based on user's facilities' Other overhead costs, facilities allocation towards Loss Prevention activities, number of FTE Loss Prevention staff (if applicable), and facility size (if applicable). |
| Misc. Loss Prevention Costs | Enter the currency value of any other known general Loss Prevention tools, systems, services, subscriptions, or other expenses incurred by user's organization (per month, quarter, or year). |
| Fraud Operations | |
| Rent/Lease Costs | The currency value of this field is calculated automatically based on Loss Prevention equivalent Rent/Lease costs and Loss Prevention allocation towards Fraud Operations. |
| Computer Equipment Costs | The currency value of this field is calculated automatically based on Loss Prevention equivalent general Computer Equipment costs and Loss Prevention allocation towards Fraud Operations. |
| Utilities Costs | The currency value of this field is calculated automatically based on Loss Prevention equivalent Utilities costs and Loss Prevention allocation towards Fraud Operations. |
| Telephone Costs | The currency value of this field is calculated automatically based on Loss Prevention equivalent Telephone costs and Loss Prevention allocation towards Fraud Operations. |
| Other Costs | The currency value of this field is calculated automatically based on Loss Prevention equivalent Other overhead costs and Loss Prevention allocation towards Fraud Operations. |
| Misc. Fraud Management Costs | The currency value of this field is calculated automatically based on Miscellaneous Loss Prevention costs and Loss Prevention allocation towards Fraud Operations. |

TABLE 20

Systems & Services

| Input Item | Definition |
|---|---|
| In-House Payer Authentication | |
| Depreciation Costs | Enter the currency value of total depreciation costs (per month, quarter, or year) associated with user's organization's Payer Authentication system, such as Verified by Visa (VbV). |
| Licensing Costs | Enter the currency value of total licensing costs (per month, quarter, or year) associated with user's organization's Payer Authentication system, such as Verified by Visa (VbV). |
| Hardware Costs | Enter the currency value of total hardware costs (per month, quarter, or year) associated with user's organization's Payer Authentication system, such as Verified by Visa (VbV). |
| Maintenance Costs | Enter the currency value of total maintenance costs (per month, quarter, or year) associated with user's organization's Payer Authentication system, such as Verified by Visa (VbV). |
| Staff Costs (FTE) | Enter the currency value of total equivalent IT staff costs (per month, quarter, or year) associated with user's organization's Payer Authentication system, such as Verified by Visa (VbV). |
| Transaction Fees | Enter the currency value of the total transaction fees (per month, quarter, or year) associated with user's organization's Payer Authentication system, such as Verified by Visa (VbV). |
| Other Costs | Enter the currency value of total of any other costs (per month, quarter, or year) associated with user's organization's Payer Authentication system, such as Verified by Visa (VbV). |
| Dispute Management | |
| Depreciation Costs | Enter the currency value of total depreciation costs (per month, quarter, or year) associated with user's organization's Dispute/Copy Request Management system. |
| Licensing Costs | Enter the currency value of total licensing costs (per month, quarter, or year) associated with user's organization's Dispute/Copy Request Management system. |
| Hardware Costs | Enter the currency value of total hardware costs (per month, quarter, or year) associated with user's organization's Dispute/Copy Request Management system. |
| Maintenance Costs | Enter the currency value of total maintenance costs (per month, quarter, or year) associated with user's organization's Dispute/Copy Request Management system. |
| Staff Costs (FTE) | Enter the currency value of total equivalent IT staff costs (per month, quarter, or year) associated with user's organization's Dispute/Copy Request Management system. |
| Transaction Fees | Enter the currency value of the total transaction fees (per month, quarter, or year) associated with user's organization's Dispute/Copy Request Management system. |
| Other Costs | Enter the currency value of total of any other costs (per month, quarter, or year) associated with user's organization's Dispute/Copy Request Management system. |
| Other | |
| Depreciation Costs | Enter the currency value of total depreciation costs (per month, quarter, or year) associated with user's organization's other fraud prevention/detection system(s), such as IP Geolocation, Velocity Monitoring, and custom decision models. |
| Licensing Costs | Enter the currency value of total licensing costs (per month, quarter, or year) associated with user's organization's other fraud prevention/detection system(s), such as IP Geolocation, Velocity Monitoring, and custom decision models. |
| Hardware Costs | Enter the currency value of total hardware costs (per month, quarter, or year) associated with user's organization's other fraud prevention/detection system(s), such as IP Geolocation, Velocity Monitoring, and custom decision models. |
| Maintenance Costs | Enter the currency value of total maintenance costs (per month, quarter, or year) associated with user's organization's other fraud prevention/detection system(s), such as IP Geolocation, Velocity Monitoring, and custom decision models. |
| Staff Costs (FTE) | Enter the currency value of total equivalent IT staff costs (per month, quarter, or year) associated with user's organization's other fraud prevention/detection system(s), such as IP Geolocation, Velocity Monitoring, and custom decision models. |
| Transaction Fees | Enter the currency value of the total transaction fees (per month, quarter, or year) associated with user's organization's other fraud prevention/detection system(s), such as IP Geolocation, Velocity Monitoring, and custom decision models. |
| Other Costs | Enter the currency value of total of any other costs (per month, quarter, or year) associated with user's organization's other fraud prevention/detection system(s), such as IP Geolocation, Velocity Monitoring, and custom decision models. |
| Outsourced Address Verification | |
| Licensing Costs | Enter the currency value of total licensing costs (per month, quarter, or year) associated with user's organization's use of external Address Verification system(s). |
| Hardware Costs | Enter the currency value of total hardware costs (per month, quarter, or year) associated with user's organization's use of external Address Verification system(s), including required inhouse networking equipment, servers, and other hardware required for efficient use of the external system(s). |
| Maintenance Costs | Enter the currency value of total maintenance costs (per month, quarter, or year) associated with user's organization's use of external Address Verification system(s). |
| Transaction Fees | Enter the currency value of the total transaction fees (per month, quarter, or year) associated with user's organization's use of external Address Verification system(s). |
| Other Costs | Enter the currency value of total of any other costs (per month, quarter, or year) associated with user's organization's use of external Address Verification system(s). |
| Card Verification | |
| Licensing Costs | Enter the currency value of total licensing costs (per month, quarter, or year) associated with user's organization's use of external Card Verification system(s). |
| Hardware Costs | Enter the currency value of total hardware costs (per month, quarter, or year) associated with user's organization's use of external Card Verification system(s), including required in-house networking equipment, servers, and other hardware required for efficient use of the external system(s). |
| Maintenance Costs | Enter the currency value of total maintenance costs (per month, quarter, or year) associated with user's organization's use of external Card Verification system(s). |
| Transaction Fees | Enter the currency value of the total transaction fees (per month, quarter, or year) associated with user's organization's use of external Card Verification system(s). |
| Other Costs | Enter the currency value of total of any other costs (per month, quarter, or year) associated with user's organization's use of external Card Verification system(s). |
| Value of Managed Fraud Prevention Services | Enter the currency value of any externally managed fraud screens, negative lists, or other prevention/detection services utilized by user's organization (per month, quarter, or year). |

TABLE 20-continued

Systems & Services

| Input Item | Definition |
|---|---|
| Value of External Decision Models | Enter the currency value of any externally managed behavioral/decision models utilized by user's organization (per month, quarter, or year). |

TABLE 21

Operating Expenses

| Input Item | | Definition |
|---|---|---|
| Compliance | | |
| Information Security | Value of Technology Investments | Enter the currency value of compliance-related investments made in software, hardware, and general technologies to improve information security (per month, quarter, or year). |
| | Compliance Audit Costs | Enter the currency value of the costs of compliance-related audits performed (per month, quarter, or year). |
| | Scan Costs | Enter the currency value of the costs of compliance-related scans performed (per month, quarter, or year). |
| Value of Fines & Penalties | | Enter the currency value of total card association fines and penalties incurred as a result of partial or non-compliance to established information security standards (per month, quarter, or year). |
| Other Compliance Costs | | Enter the currency value of any other known compliance related expenses incurred associated with user's organization's fraud operations (per month, quarter, or year). |
| Training | | |
| Fraud-related Training Costs | | Enter the currency value of total fraud-related training costs incurred by user's organization (per month, quarter, or year). |
| Value of General/Other Fraud-related Loss Prevention | | The currency value of this field is calculated automatically based on other general Loss Prevention systems/services costs and Loss Prevention allocation towards Fraud Operations. |
| Other Operating Expenses | | |
| Postal Costs | | Enter the currency value of the total postal costs associated with user's organization's Loss Prevention activities (per month, quarter, or year). |
| Fraud-related Postal Costs | | The currency value of this field is calculated automatically based on Loss Prevention postal costs and Loss Prevention allocation towards Fraud Operations. |
| Copy/Fax/Print Costs | | Enter the currency value of the total copying/faxing/printing costs associated with user's organization's Loss Prevention activities (per month, quarter, or year). |
| Fraud-related Copy/Fax/Print Costs | | The currency value of this field is calculated automatically based on Loss Prevention copy/fax/print costs and Loss Prevention allocation towards Fraud Operations. |
| Office Supply Costs | | Enter the currency value of the total office supply costs associated with user's organization's Loss Prevention activities (per month, quarter, or year). |
| Fraud-related Office Supply Costs | | The currency value of this field is calculated automatically based on Loss Prevention office supply costs and Loss Prevention allocation towards Fraud Operations. |
| Other Costs | | Enter the currency value of any other known operating expenses associated with user's organization's Loss Prevention activities (per month, quarter, or year). |

TABLE 21-continued

Operating Expenses

| Input Item | Definition |
|---|---|
| Other Fraud-related Costs | The currency value of this field is calculated automatically based on other Loss Prevention costs and Loss Prevention allocation towards Fraud Operations. |

Figure 8A:
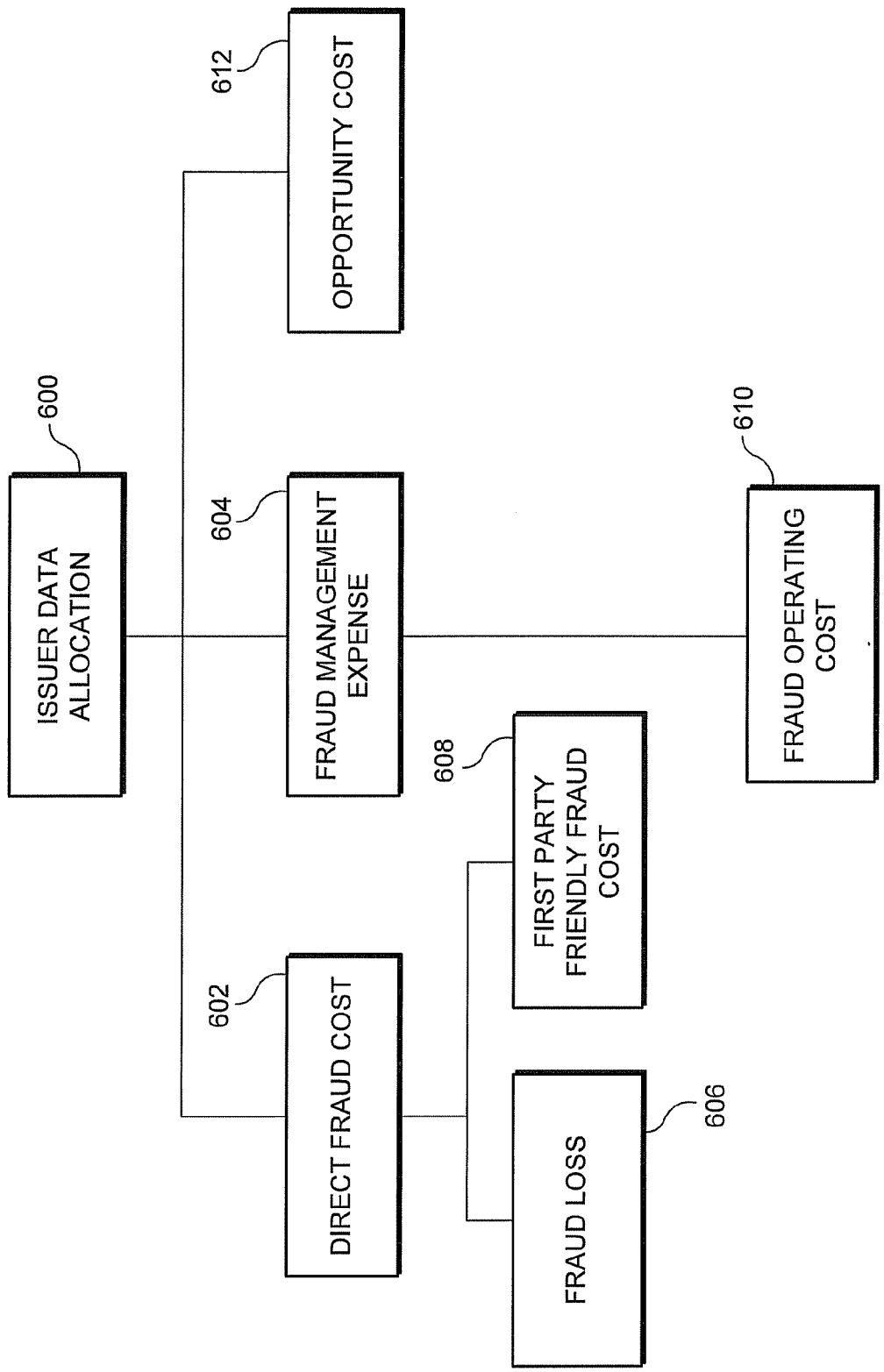
FIG. 8A is a block diagram showing the breakdown of various components of the total cost of fraud for an issuer.

As shown in FIG. 8A, based on the input data items related to an issuer that have been entered, the assessment module 34 allocates portions of the same into the following components: Direct Fraud Cost 602 and Fraud Management Expense 604 and Opportunity Cost 612. The Direct Fraud Cost 602 component includes Fraud Loss 606, and the First Party Friendly Fraud Cost 608 categories.

Fraud Loss 606 category (cost of payments fraud) relates to the cost for fraudulent use of cards by parties which is directly related to losses (net fraud chargeoffs) absorbed by a corresponding entity (issuer in this case). An acquirer may calculate the Fraud Loss 606 as fraud losses absorbed by the acquirer which have been charged back from an issuer. A merchant may calculate the Fraud Loss 606 as fraud losses absorbed from its acquirer and the issuance of a reimbursement in response to direct contact from a cardholder, exclusive of credits against card accounts.

First Party Friendly Fraud Cost 608 relates to losses (net credit chargeoffs) directly attributable to an issuer's account holders' misrepresentation of usage (e.g., an unauthorized use of card by a cardholder's family member) which have been absorbed by a corresponding issuer.

Aside from the Direct Fraud Cost 602, the assessment module 34 also allocates portions of the entered data items into the Fraud Management Expense 604 and the Opportunity Cost 612 component.

From an issuer perspective or an acquirer's perspective, Fraud Management Expense 604 relates to Cost of Fraud Prevention, Fraud Detection, Fraud Investigation & Recoveries, and Other Operating Costs. From a merchant's perspective, Fraud Management Expense 804 relates to the Cost of Fraud Prevention and Other Operational Costs.

Opportunity Cost 612 relates to activities associated with lost revenue opportunities as a result of fraud related activity or actions to prevent fraud, specifically the lost profit from reduction in sales including incorrect fraud-based declines, reduced acceptance, and reduced card usage.

Figure 8B:
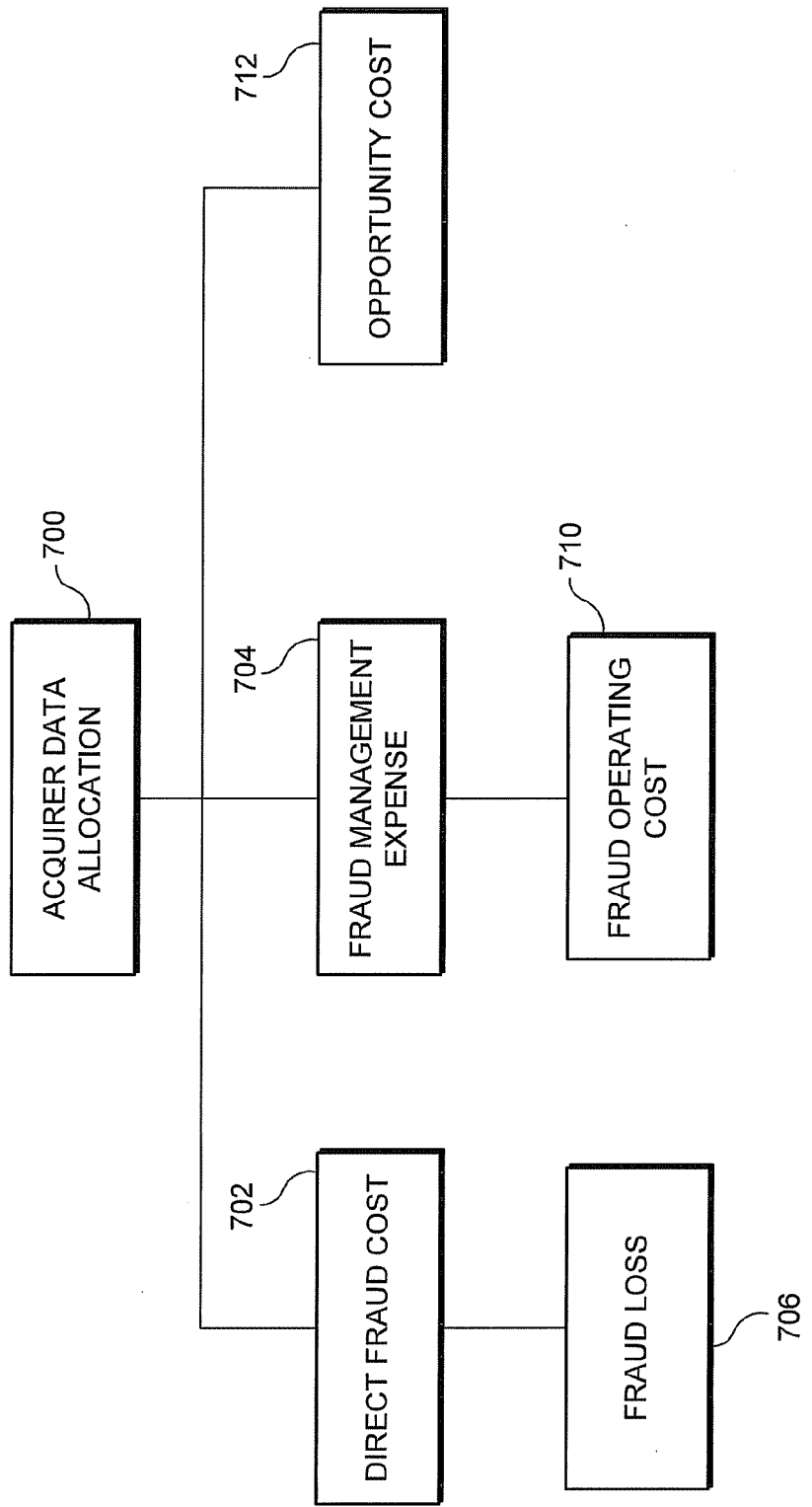
FIG. 8B is a block diagram showing the breakdown of various components of the total cost of fraud for an acquirer.

Similarly, as illustrated in FIG. 8B, based on the input data items related to an acquirer that have been entered, the assessment module 34 allocates portions of the same into the following components: Direct Fraud Cost 702, Fraud Management Expense 704, and Opportunity Cost 712. The Direct Fraud Cost 702 component includes Fraud Loss 706 category. The Fraud Management Expense 704 component includes the Fraud Operating Cost 710 category.

Figure 8C:
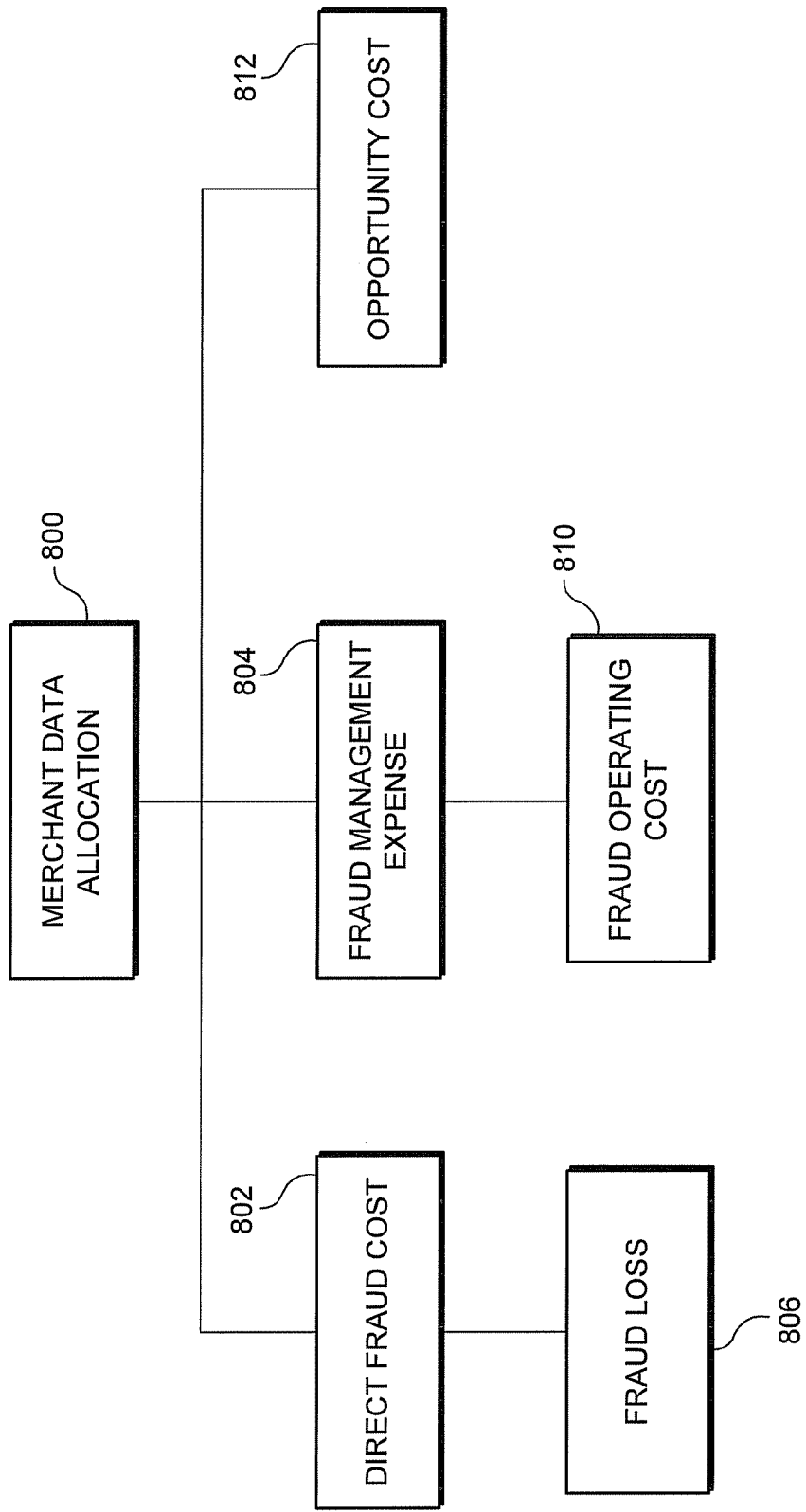
FIG. 8C is a block diagram showing the breakdown of various components of the total cost of fraud for a merchant.

FIG. 8C illustrates merchant data allocation based on the input data items that have been entered. The assessment module 34 allocates portions of the same into the following components: Direct Fraud Cost 802, Fraud Management Expense 804, and Opportunity Cost 812. The Direct Fraud Cost 802 component includes Fraud Loss 806 category. The Fraud Management Expense 804 component includes the Fraud Operating 812 category.

FIG. 9 illustrates an example fraud report showing the allocated costs for the various components of the total cost of fraud for an issuer. The summary report shows actual allocated dollar values of various fraud costs as described in FIG.

8 as well as the total cost of fraud ($5,315,265.28). The report also shows each cost component as a percentage of the total fraud cost. For example, the report shows that the issuer's fraud operating cost of $4,889,244.68 is 91.98% of the total while the direct fraud loss from the net chargeoff (total defrauded amount) of $89,000 is only 1.67% of the total. As can be appreciated by persons of ordinary skill in the art, the direct fraud loss from the net chargeoff (total defrauded amount) is only a few percentage of the total cost of fraud. Thus, the present invention illustrates that analyzing fraud in terms of only the actual defrauded amount drastically underestimates the true cost of fraud. The allocation calculations will be described in detail later herein.

Figure 10:
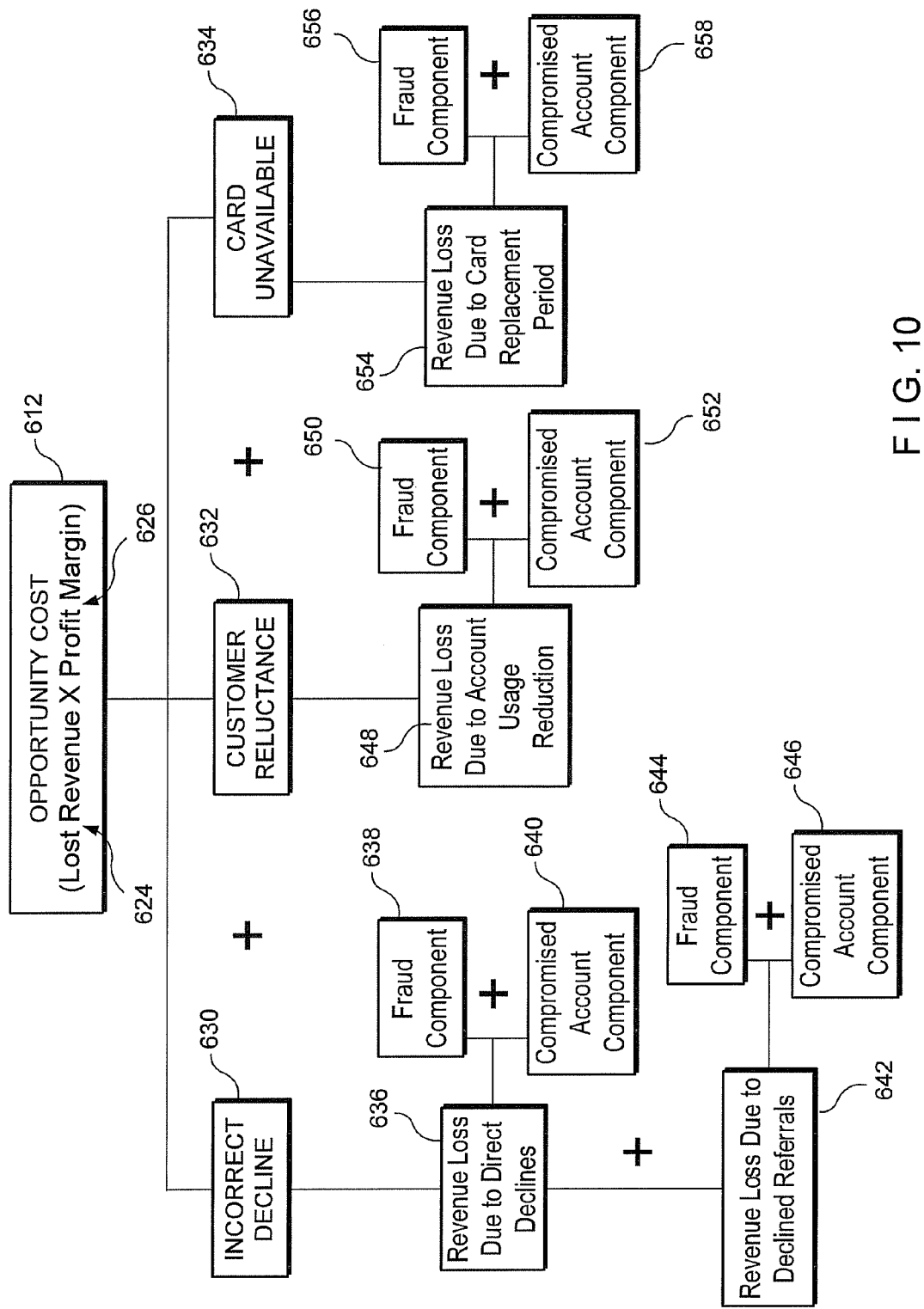
FIG. 10 is a block diagram of the opportunity cost attributed to card issuer.

FIG. 10 depicts the allocation of data items into Opportunity Cost 612 in more detail. Specifically, the Opportunity Cost 612 is defined as Lost Revenue 624 multiplied by Profit Margin 626. Lost Revenue 624 in turn is organized into three parts: Incorrect Decline 630, Customer Reluctance 632, and Card Unavailable 634.

Incorrect Decline 630 is revenues lost from incorrect authorization declines for fraud-based policies or referrals, including transactions declined directly and transactions declined following a referral. Customer Reluctance 632 is revenues lost from account usage reduction due to decreased customer confidence as a result of cardholder fraud experience, including fraud and compromised accounts. Card Unavailable 634 is revenues lost due to card replacement period, including fraud and compromised accounts.

Drilling down further, Incorrect Decline 630 is a sum of Revenue Loss Due to Direct Declines 636 (sum of Fraud Component 638 and Compromised Account Component 640) and Revenue Loss Due to Declined Referrals 642 (sum of Fraud Component 644 and Compromised Account Component 646).

Customer Reluctance 632 includes Revenue Loss Due to Account Usage Reduction 648 (sum of Fraud Component 650 and Compromised Account Component 652). Similarly, Card Unavailable 634 which is defined as Revenue Loss Due to Card Replacement Period 654 is a sum of Fraud Component 656 and Compromised Account Component 658.

Having described the assessment management system's allocation in general, outputs of the Issuer Data Allocation will now be described with respect to FIGS. 11A and 11B. In this particular embodiment, all outputs are calculated using annualized numbers where applicable. Each calculation performed is further tailored in the following two ways: First, each calculation is adjusted to reflect desired reporting period (if other than annual). Second, each calculation is converted to US Dollar equivalent (if originally reported in other currency). Following is a summary of how each output/result field is calculated.

As noted above in FIGS. 8A and 9, the Issuer Data Allocation 600 is organized into the following categories: Fraud Losses 606, and First Party ("Friendly") Fraud 608 which are Direct Fraud Cost 602, Fraud Operating Cost 610 which is Fraud Management Expense 604, and Opportunity Costs 612. The Fraud Operating Cost 610 category is further broken down to Fraud Prevention, Fraud Detection, Fraud Investigation & Recoveries and Other Operational Costs sub-categories.

For each category and sub-category, FIGS. 11A and 11B list all of the output items that are generated. The definition and formula for each output item is listed in Tables 22-28 below.

TABLE 22

Fraud Losses

Net Fraud Chargeoffs

| | |
|---|---|
| Gross Fraud Chargeoffs | Gross fraud chargeoffs (annualized) |
| Value of Chargeback Recoveries - Cardholder | If cardholder fraud responsibility is reported as an amount: number of fraud cases reported (annualized) * [(cardholder fraud responsibility − amount of cardholder fraud responsibility unrecovered)]<br>If cardholder fraud responsibility is reported as a percentage:<br>[(number of fraud cases reported (annualized)) * (value of fraud case)] − [(number of fraud cases reported (annualized)) * (value of fraud case) * percentage of cardholder fraud responsibility unrecovered]<br>Multiplied by −1 to display as a negative figure. |
| Value of Chargeback Recoveries - Merchant | Value of Fraud-related Merchant Chargebacks (annualized) − Value of Fraud-related Representments (annualized)<br>Multiplied by −1 to display as a negative figure. |
| Value of Fraud Insurance Recoveries | Value of Fraud Insurance Recoveries (annualized)<br>Multiplied by −1 to display as a negative figure. |

TABLE 23

Fraud Prevention

| | |
|---|---|
| Staff Analysis | |
| Analysis | A corresponding value is displayed on this line number only if input option to report fully-loaded staff costs is selected.<br>Average cost of Prevention Analysts (annualized) * number of Prevention Analysts |
| Earnings, benefits, and taxes | A corresponding value is displayed on this line number only if input option to report fully-loaded staff costs is not selected.<br>Average cost of earnings, benefits, and taxes for Prevention Analysts (annualized) * number of Prevention Analysts |
| Other | A corresponding value is displayed on this line number only if input option to report fully-loaded staff costs is not selected.<br>Average other costs for Prevention Analysts (annualized) * number of Prevention Analysts |
| Authorization System | |
| Depreciation | % of Authorization Systems use attributable to Fraud * Depreciation expense of Authorization Systems (annualized) |
| Licensing | % of Authorization Systems use attributable to Fraud * Licensing expense of Authorization Systems (annualized) |
| Hardware | % of Authorization Systems use attributable to Fraud * Hardware expense of Authorization Systems (annualized) |
| Maintenance | % of Authorization Systems use attributable to Fraud * Maintenance expense of Authorization Systems (annualized) |
| IT Staff | % of Authorization Systems use attributable to Fraud * Staff (FTE) expense of Authorization Systems (annualized) |
| Other | % of Authorization Systems use attributable to Fraud * Other expenses of Authorization Systems (annualized) |
| PIN Management System | |
| Depreciation | Depreciation expense of PIN Management Systems (annualized) |
| Licensing | Licensing expense of PIN Management Systems (annualized) |

TABLE 23-continued

| Fraud Prevention | |
|---|---|
| Hardware | Hardware expense of PIN Management Systems (annualized) |
| Maintenance | Maintenance expense of PIN Management Systems (annualized) |
| IT Staff | Staff (FTE) expense of PIN Management Systems (annualized) |
| Other | Other expenses of PIN Management Systems (annualized) |
| Overhead | |
| Rent/Lease | If Prevention/Detection/Recovery efforts are conducted in a common facility:<br>% allocation of the facility's usage to Prevention activities * Common facility's rent/lease expense (annualized)<br>If common facility's rent/lease expense is reported on a per square foot/meter basis:<br>Cost of facility's rent/lease expense per square foot/meter * size of Prevention facilities in square feet/meters<br>If common facility's rent/lease expense is reported on a per-employee basis:<br>Cost of facility's rent/lease expense per employee * total number of staff/employees in Prevention function<br>If Prevention/Detection/Recovery efforts are conducted in separate facilities:<br>Rent/lease expense of Prevention facilities (annualized)<br>If Prevention facility's rent/lease expense is reported on a per square foot/meter basis:<br>Cost of facility's rent/lease expense per square foot/meter * size of Prevention facility in square feet/meters<br>If Prevention facility's rent/lease expense is reported on a per employee basis:<br>Cost of facility's rent/lease expense per employee * total number of staff/employees in Prevention function |
| Computer Equipment | If Prevention/Detection/Recovery efforts are conducted in a common facility:<br>% allocation of the facility's usage to Prevention activities * Common facility's computer equipment expense (annualized)<br>If common facility's computer equipment expense is reported on a per square foot/meter basis:<br>Cost of facility's computer equipment expense per square foot/meter * size of Prevention facilities in square feet/meters<br>If common facility's computer equipment expense is reported on a per employee basis:<br>Cost of facility's computer equipment expense per employee * total number of staff/employees in Prevention function<br>If Prevention/Detection/Recovery efforts are conducted in separate facilities:<br>Computer equipment expense of Prevention facilities (annualized)<br>If Prevention facility's computer equipment expense is reported on a per square foot/meter basis:<br>Cost of facility's computer equipment expense per square foot/meter * size of Prevention facility in square feet/meters<br>If Prevention facility's computer equipment expense is reported on a per-employee basis:<br>Cost of facility's computer equipment expense per employee * total number of staff/employees in Prevention function |
| Utilities | If Prevention/Detection/Recovery efforts are conducted in a common facility:<br>% allocation of the facility's usage to Prevention activities * Common facility's utilities expense (annualized)<br>If common facility's utilities expense is reported on a per square foot/meter basis:<br>Cost of facility's utilities expense per square foot/meter * size of Prevention facilities in square feet/meters<br>If common facility's utilities expense is reported on a per-employee basis:<br>Cost of facility's utilities expense per employee * total number of staff/employees in Prevention function<br>If Prevention/Detection/Recovery efforts are conducted in separate facilities:<br>Utilities expense of Prevention facilities (annualized)<br>If Prevention facility's utilities expense is reported on a per square foot/meter basis:<br>Cost of facility's utilities expense per square foot/meter * size of Prevention facility in square feet/meters<br>If Prevention facility's utilities expense is reported on a per-employee basis:<br>Cost of facility's utilities expense per employee * total number of staff/employees in Prevention function |
| Telephone | If Prevention/Detection/Recovery efforts are conducted in a common facility:<br>% allocation of the facility's usage to Prevention activities * Common facility's telephone expenses (annualized)<br>If common facility's telephone expenses are reported on a per square foot/meter basis:<br>Cost of facility's telephone expenses per square foot/meter * size of Prevention facilities in square feet/meters<br>If common facility's telephone expenses are reported on a per employee basis:<br>Cost of facility's telephone expenses per employee * total number of staff/employees in Prevention function<br>If Prevention/Detection/Recovery efforts are conducted in separate facilities:<br>Telephone expenses of Prevention facilities (annualized)<br>If Prevention facility's telephone expenses are reported on a per square foot/meter basis:<br>Cost of facility's telephone expenses per square foot/meter * size of Prevention facility in square feet/meters<br>If Prevention facility's telephone expenses are reported on a per employee basis:<br>Cost of facility's telephone expenses per employee * total number of staff/employees in Prevention function |
| Other | If Prevention/Detection/Recovery efforts are conducted in a common facility:<br>% allocation of the facility's usage to Prevention activities * Common facility's other expenses (annualized)<br>If common facility's other expenses are reported on a per square foot/meter basis:<br>Cost of facility's other expenses per square foot/meter * size of Prevention facilities in square feet/meters<br>If common facility's other expenses are reported on a per-employee basis:<br>Cost of facility's other expenses per employee * total number of staff/employees in Prevention function<br>If Prevention/Detection/Recovery efforts are conducted in separate facilities:<br>Other expenses of Prevention facilities (annualized)<br>If Prevention facility's other expenses are reported on a per square foot/meter basis:<br>Cost of facility's other expenses per square foot/meter * size of Prevention facility in square feet/meters<br>If Prevention facility's other expenses are reported on a per-employee basis:<br>Cost of facility's other expenses per employee * total number of staff/employees in Prevention function |

TABLE 24

| | Fraud Detection |
|---|---|
| Staff | |
| Alert Management | |
| Alert Management | A corresponding value is displayed on this line number only if input option to report fully-loaded staff costs is selected. Average cost of Alert Staff (annualized) * number of Alert Staff |
| Earnings, benefits, and taxes | A corresponding value is displayed on this line number only if input option to report fully-loaded staff costs is not selected. Average cost of earnings, benefits, and taxes for Alert Staff (annualized) * number of Alert Staff |
| Other | A corresponding value is displayed on this line number only if input option to report fully-loaded staff costs is not selected. Average other costs for Alert Staff (annualized) * number of Alert Staff |
| Administrative | |
| Administrative | A corresponding value is displayed on this line number only if input option to report fully-loaded staff costs is selected. Average cost of Administrative Assistants (annualized) * number of Administrative Assistants |
| Earnings, benefits, and taxes | A corresponding value is displayed on this line number only if input option to report fully-loaded staff costs is not selected. Average cost of earnings, benefits, and taxes for Administrative Assistants (annualized) * number of Administrative Assistants |
| Other | A corresponding value is displayed on this line number only if input option to report fully-loaded staff costs is not selected. Average other costs for Administrative Assistants (annualized) * number of Administrative Assistants |
| Chargeback | |
| Chargeback | A corresponding value is displayed on this line number only if input option to report fully-loaded staff costs is selected. Average cost of Detection Specialists (annualized) * number of Detection Specialists |
| Earnings, benefits, and taxes | A corresponding value is displayed on this line number only if input option to report fully-loaded staff costs is not selected. Average cost of earnings, benefits, and taxes for Detection Specialists (annualized) * number of Detection Specialists |
| Other | A corresponding value is displayed on this line number only if input option to report fully-loaded staff costs is not selected. Average other costs for Detection Specialists (annualized) * number of Detection Specialists |
| Supervisory | |
| Supervisory | A corresponding value is displayed on this line number only if input option to report fully-loaded staff costs is selected. Average cost of Detection Supervisors (annualized) * number of Detection Supervisors |
| Earnings, benefits, and taxes | A corresponding value is displayed on this line number only if input option to report fully-loaded staff costs is not selected. Average cost of earnings, benefits, and taxes for Detection Supervisors (annualized) * number of Detection Supervisors |
| Other | A corresponding value is displayed on this line number only if input option to report fully-loaded staff costs is not selected. Average other costs for Detection Supervisors (annualized) * number of Detection Supervisors |
| Management | |
| Management | A corresponding value is displayed on this line number only if input option to report fully-loaded staff costs is selected. Average cost of Fraud Managers (annualized) * number of Fraud Managers |
| Earnings, benefits, and taxes | A corresponding value is displayed on this line number only if input option to report fully-loaded staff costs is not selected. Average cost of earnings, benefits, and taxes for Fraud Managers (annualized) * number of Fraud Managers |
| Other | A corresponding value is displayed on this line number only if input option to report fully-loaded staff costs is not selected. Average other costs for Fraud Managers (annualized) * number of Fraud Managers |
| Fraud Detection System | |
| Depreciation | Depreciation expense of Fraud Detection Systems (annualized) |
| Licensing | Licensing expense of Fraud Detection Systems (annualized) |
| Hardware | Hardware expense of Fraud Detection Systems (annualized) |
| Maintenance | Maintenance expense of Fraud Detection Systems (annualized) |
| IT Staff | Staff (FTE) expense of Fraud Detection Systems (annualized) |
| Other | Other expenses of Fraud Detection Systems (annualized) |
| Fraud Analysis System | |
| Depreciation | Depreciation expense of Fraud Analysis Systems (annualized) |
| Licensing | Licensing expense of Fraud Analysis Systems (annualized) |
| Hardware | Hardware expense of Fraud Analysis Systems (annualized) |
| Maintenance | Maintenance expense of Fraud Analysis Systems (annualized) |
| IT Staff | Staff (FTE) expense of Fraud Analysis Systems (annualized) |
| Other | Other expenses of Fraud Analysis Systems (annualized) |
| Overhead | |
| Rent/Lease | If Prevention/Detection/Recovery efforts are conducted in a common facility: % allocation of the facility's usage to Detection activities * Common facility's rent/lease expense (annualized) If common facility's rent/lease expense is reported on a per square foot/meter basis: Cost of facility's rent/lease expense per square foot/meter * size of Detection facilities in square feet/meters If common facility's rent/lease expense is reported on a per-employee basis: Cost of facility's rent/lease expense per employee * total number of staff/employees in Detection function If Prevention/Detection/Recovery efforts are conducted in separate facilities: Rent/lease expense of Detection facilities (annualized) If Prevention facility's rent/lease expense is reported on a per square foot/meter basis: Cost of facility's rent/lease expense per square foot/meter * size of Detection facility in square feet/meters If Detection facility's rent/lease expense is reported on a per-employee basis: Cost of facility's rent/lease expense per employee * total number of staff/employees in Detection function |
| Computer Equipment | If Prevention/Detection/Recovery efforts are conducted in a common facility: % allocation of the facility's usage to Detection activities * Common facility's computer equipment expense (annualized) |

TABLE 24-continued

Fraud Detection

| | |
|---|---|
| | If common facility's computer equipment expense is reported on a per square foot/meter basis: |
| | Cost of facility's computer equipment expense per square foot/meter * size of Detection facilities in square feet/meters |
| | If common facility's computer equipment expense is reported on a per employee basis: |
| | Cost of facility's computer equipment expense per employee * total number of staff/employees in Detection function |
| | If Prevention/Detection/Recovery efforts are conducted in separate facilities: |
| | Computer equipment expense of Detection facilities (annualized) |
| | If Detection facility's computer equipment expense is reported on a per square foot/meter basis: |
| | Cost of facility's computer equipment expense per square foot/meter * size of Detection facility in square feet/meters |
| | If Detection facility's computer equipment expense is reported on a per-employee basis: |
| | Cost of facility's computer equipment expense per employee * total number of staff/employees in Detection function |
| Utilities | If Prevention/Detection/Recovery efforts are conducted in a common facility: |
| | % allocation of the facility's usage to Detection activities * Common facility's utilities expense (annualized) |
| | If common facility's utilities expense is reported on a per square foot/meter basis: |
| | Cost of facility's utilities expense per square foot/meter * size of Detection facilities in square feet/meters |
| | If common facility's utilities expense is reported on a per-employee basis: |
| | Cost of facility's utilities expense per employee * total number of staff/employees in Detection function |
| | If Prevention/Detection/Recovery efforts are conducted in separate facilities: |
| | Utilities expense of Detection facilities (annualized) |
| | If Detection facility's utilities expense is reported on a per square foot/meter basis: |
| | Cost of facility's utilities expense per square foot/meter * size of Detection facility in square feet/meters |
| | If Detection facility's utilities expense is reported on a per-employee basis: |
| | Cost of facility's utilities expense per employee * total number of staff/employees in Detection function |
| Telephone | If Prevention/Detection/Recovery efforts are conducted in a common facility: |
| | % allocation of the facility's usage to Detection activities * Common facility's telephone expenses (annualized) |
| | If common facility's telephone expenses are reported on a per square foot/meter basis: |
| | Cost of facility's telephone expenses per square foot/meter * size of Detection facilities in square feet/meters |
| | If common facility's telephone expenses are reported on a per Total employee basis: |
| | Cost of facility's telephone expenses per employee * total number of staff/employees in Detection function |
| | If Prevention/Detection/Recovery efforts are conducted in separate facilities: |
| | Telephone expenses of Detection facilities (annualized) |
| | If Detection facility's telephone expenses are reported on a per square foot/meter basis: |
| | Cost of facility's telephone expenses per square foot/meter * size of Detection facility in square feet/meters |
| | If Detection facility's telephone expenses are reported on a per employee basis: |
| | Cost of facility's telephone expenses per employee * total number of staff/employees in Detection function |
| Other | If Prevention/Detection/Recovery efforts are conducted in a common facility: |
| | % allocation of the facility's usage to Detection activities * Common facility's other expenses (annualized) |
| | If common facility's other expenses are reported on a per square foot/meter basis: |
| | Cost of facility's other expenses per square foot/meter * size of Detection facilities in square feet/meters |
| | If common facility's other expenses are reported on a per-employee basis: |
| | Cost of facility's other expenses per employee * total number of staff/employees in Detection function |
| | If Prevention/Detection/Recovery efforts are conducted in separate facilities: |
| | Other expenses of Detection facilities (annualized) |
| | If Detection facility's other expenses are reported on a per square foot/meter basis: |
| | Cost of facility's other expenses per square foot/meter * size of Detection facility in square feet/meters |
| | If Detection facility's other expenses are reported on a per-employee basis: |
| | Cost of facility's other expenses per employee * total number of staff/employees in Detection function |

TABLE 25

Fraud Investigation & Recoveries

| Staff Administrative | | |
|---|---|---|
| | Administrative | A corresponding value is displayed on this line number only if input option to report fully-loaded staff costs is selected. Average cost of Administrative Assistants (annualized) * number of Administrative Assistants |
| | Earnings, benefits, and taxes | A corresponding value is displayed on this line number only if input option to report fully-loaded staff costs is not selected. Average cost of earnings, benefits, and taxes for Administrative Assistants (annualized) * number of Administrative Assistants |
| | Other | A corresponding value is displayed on this line number only if input option to report fully-loaded staff costs is not selected. Average other costs for Administrative Assistants (annualized) * number of Administrative Assistants |
| Chargeback | | |
| | Chargeback | A corresponding value is displayed on this line number only if input option to report fully-loaded staff costs is selected. Average cost of Recovery Specialists (annualized) * number of Recovery Specialists |
| | Earnings, benefits, and taxes | A corresponding value is displayed on this line number only if input option to report fully-loaded staff costs is not selected. Average cost of earnings, benefits, and taxes for Recovery Specialists (annualized) * number of Recovery Specialists |
| | Other | A corresponding value is displayed on this line number only if input option to report fully-loaded staff costs is not selected. Average other costs for Recovery Specialists (annualized) * number of Recovery Specialists |
| Supervisory | | |
| | Supervisory | A corresponding value is displayed on this line number only if input option to report fully-loaded staff costs is selected. |

TABLE 25-continued

Fraud Investigation & Recoveries

| | |
|---|---|
| Earnings, benefits, and taxes | Average cost of Recovery Supervisors (annualized) * number of Recovery Supervisors<br>A corresponding value is displayed on this line number only if input option to report fully-loaded staff costs is not selected.<br>Average cost of earnings, benefits, and taxes for Recovery Supervisors (annualized) * number of Recovery Supervisors |
| Other | A corresponding value is displayed on this line number only if input option to report fully-loaded staff costs is not selected.<br>Average other costs for Recovery Supervisors (annualized) * number of Recovery Supervisors |
| Chargeback Management System | |
| Depreciation | % of Chargeback Management Systems use attributable to Fraud * Depreciation expense of Chargeback Management Systems (annualized) |
| Licensing | % of Chargeback Management Systems use attributable to Fraud * Licensing expense of Chargeback Management Systems (annualized) |
| Hardware | % of Chargeback Management Systems use attributable to Fraud * Hardware expense of Chargeback Management Systems (annualized) |
| Maintenance | % of Chargeback Management Systems use attributable to Fraud * Maintenance expense of Chargeback Management Systems (annualized) |
| IT Staff | % of Chargeback Management Systems use attributable to Fraud * Staff (FTE) expense of Chargeback Management Systems (annualized) |
| Other | % of Chargeback Management Systems use attributable to Fraud * Other expenses of Chargeback Management Systems (annualized) |
| Overhead | |
| Rent/Lease | If Prevention/Detection/Recovery efforts are conducted in a common facility:<br>% allocation of the facility's usage to Recovery activities * Common facility's rent/lease expense (annualized)<br>If common facility's rent/lease expense is reported on a per square foot/meter basis:<br>Cost of facility's rent/lease expense per square foot/meter * size of Recovery facilities in square feet/meters<br>If common facility's rent/lease expense is reported on a per-employee basis:<br>Cost of facility's rent/lease expense per employee * total number of staff/employees in Recovery function<br>If Prevention/Detection/Recovery efforts are conducted in separate facilities:<br>Rent/lease expense of Recovery facilities (annualized)<br>If Recovery facility's rent/lease expense is reported on a per square foot/meter basis:<br>Cost of facility's rent/lease expense per square foot/meter * size of Recovery facility in square feet/meters<br>If Recovery facility's rent/lease expense is reported on a per-employee basis:<br>Cost of facility's rent/lease expense per employee * total number of staff/employees in Recovery function |
| Computer Equipment | If Prevention/Detection/Recovery efforts are conducted in a common facility:<br>% allocation of the facility's usage to Recovery activities * Common facility's computer equipment expense (annualized)<br>If common facility's computer equipment expense is reported on a per square foot/meter basis:<br>Cost of facility's computer equipment expense per square foot/meter * size of Recovery facilities in square feet/meters<br>If common facility's computer equipment expense is reported on a per employee basis:<br>Cost of facility's computer equipment expense per employee * total number of staff/employees in Recovery function<br>If Prevention/Detection/Recovery efforts are conducted in separate facilities:<br>Computer equipment expense of Recovery facilities (annualized)<br>If Recovery facility's computer equipment expense is reported on a per square foot/meter basis:<br>Cost of facility's computer equipment expense per square foot/meter * size of Recovery facility in square feet/meters<br>If Recovery facility's computer equipment expense is reported on a per-employee basis:<br>Cost of facility's computer equipment expense per employee * total number of staff/employees in Recovery function |
| Utilities | If Prevention/Detection/Recovery efforts are conducted in a common facility:<br>% allocation of the facility's usage to Recovery activities * Common facility's utilities expense (annualized)<br>If common facility's utilities expense is reported on a per square foot/meter basis:<br>Cost of facility's utilities expense per square foot/meter * size of Recovery facilities in square feet/meters<br>If common facility's utilities expense is reported on a per-employee basis:<br>Cost of facility's utilities expense per employee * total number of staff/employees in Recovery function<br>If Prevention/Detection/Recovery efforts are conducted in separate facilities:<br>Utilities expense of Recovery facilities (annualized)<br>If Recovery facility's utilities expense is reported on a per square foot/meter basis:<br>Cost of facility's utilities expense per square foot/meter * size of Recovery facility in square feet/meters<br>If Recovery facility's utilities expense is reported on a per-employee basis:<br>Cost of facility's utilities expense per employee * total number of staff/employees in Recovery function |
| Telephone | If Prevention/Detection/Recovery efforts are conducted in a common facility:<br>% allocation of the facility's usage to Recovery activities * Common facility's telephone expenses (annualized)<br>If common facility's telephone expenses are reported on a per square foot/meter basis:<br>Cost of facility's telephone expenses per square foot/meter * size of Recovery facilities in square feet/meters<br>If common facility's telephone expenses are reported on a per employee basis:<br>Cost of facility's telephone expenses per employee * total number of staff/employees in Recovery function<br>If Prevention/Detection/Recovery efforts are conducted in separate facilities:<br>Telephone expenses of Recovery facilities (annualized)<br>If Recovery facility's telephone expenses are reported on a per square foot/meter basis:<br>Cost of facility's telephone expenses per square foot/meter * size of Recovery facility in square feet/meters<br>If Recovery facility's telephone expenses are reported on a per employee basis:<br>Cost of facility's telephone expenses per employee * total number of staff/employees in Recovery function |

TABLE 25-continued

Fraud Investigation & Recoveries

| | |
|---|---|
| Other | If Prevention/Detection/Recovery efforts are conducted in a common facility: |
| | % allocation of the facility's usage to Recovery activities * Common facility's other expenses (annualized) |
| | If common facility's other expenses are reported on a per square foot/meter basis: |
| | Cost of facility's other expenses per square foot/meter * size of Recovery facilities in square feet/meters |
| | If common facility's other expenses are reported on a per-employee basis: |
| | Cost of facility's other expenses per employee * total number of staff/employees in Recovery function |
| | If Prevention/Detection/Recovery efforts are conducted in separate facilities: |
| | Other expenses of Recovery facilities (annualized) |
| | If Recovery facility's other expenses are reported on a per square foot/meter basis: |
| | Cost of facility's other expenses per square foot/meter * size of Recovery facility in square feet/meters |
| | If Recovery facility's other expenses are reported on a per-employee basis: |
| | Cost of facility's other expenses per employee * total number of staff/employees in Recovery function |
| Legal Fees | |
| Fraud-Related Legal Fees | Value of legal fees related to Fraud Operations (annualized) |
| Fraud Insurance | |
| Fraud Insurance Premiums | Value of fraud insurance premiums (annualized) |
| Other/Miscellaneous Fraud Expenses | |
| Other Fraud Losses | Other known costs of direct fraud operations (annualized) |

TABLE 26

Other Operational Costs

| | |
|---|---|
| Customer Service | |
| Inbound | |
| Fraud-related Customer Inquiries | [(Call received cost) Inbound] * number of inquiries per fraud case * number of fraud cases reported (annualized) |
| Compromised Account-related Fraud Inquiries | If accounts share common card numbers: [(Call received cost) Inbound] * number of inquiries per compromised account * number of compromised account cases reported (annualized) * number of cards/number of accounts |
| | If accounts do not share common card numbers: [(Call received cost) Inbound] * number of inquiries per compromised account * number of compromised account cases reported (annualized) |
| Outbound | |
| Cable-Based Calls to Support Fraud Cases | [(Call cost-cable) Outbound] * number of calls per fraud case-cable * number of fraud cases reported (annualized) |
| Cable-Based Calls to Support Compromised Accounts | If accounts share common card numbers: [(Call cost-cable) Outbound] * number of calls per fraud case-cable * number of compromised account cases reported (annualized) * number of cards/number of accounts |
| | If accounts do not share common card numbers: [(Call cost-cable) Outbound] * number of calls per fraud case-cable * number of compromised account cases reported (annualized) |
| Mobile-Based Calls to Support Fraud Cases | [(Call cost-mobile) Outbound] * number of calls per fraud case-mobile * number of fraud cases reported (annualized) |
| Mobile-Based Calls to Support Compromised Accounts | If accounts share common card numbers: [(Call cost-mobile) Outbound] * number of calls per fraud case-mobile * number of compromised account cases reported (annualized) * number of cards/number of accounts |
| | If accounts do not share common card numbers: [(Call cost-mobile) Outbound] * number of calls per fraud case-mobile * number of compromised account cases reported (annualized) |
| PIN Delivery | |
| PIN Delivery | (Number of PINs delivered * PIN delivery costs-normal * PINs delivered %-normal) + (Number of PINs delivered * PIN delivery costs-other * PINs delivered %-other) |
| Bankcard Processing | |
| Authorization & Settlement | [Authorization fee per transaction * ((number of declines (annualized) * fraud-related declines %) + (number of referrals (annualized) * fraud-related referrals %) + (Number of declines (annualized) * compromised account-related declines %) + (number of referrals (annualized) * compromised account-related referrals %) + (number of fraud cases reported (annualized) * number of transactions per fraud case) + (number of compromised account cases reported (annualized) * number of fraudulent transactions per compromised account))] + [Settlement fee per transaction * ((number of fraud cases reported (annualized) * number of transactions per fraud case) + (number of compromised account cases reported (annualized) * number of fraudulent transactions per compromised account))] |
| Other | Value of fraud-related processing fees (annualized) |
| Card Reissue/Replacement - Fraud | |
| Production | Number of fraud cases reported (annualized) * [(card production costs-Mag Stripe * % of Magnetic Stripe Cards) + (card production costs-ICC * % of ICC Cards)] |
| Delivery | Number of fraud cases reported (annualized) * [(card delivery costs-normal * fraud-related card delivery %-normal) + [(card delivery costs-expedited * fraud-related card delivery %-expedited)] |
| Activation | Number of fraud cases reported (annualized) * ((activation cost-IVR * cards activated-IVR method) + (activation cost-ATM * cards activated-ATM method) + (activation cost letter * cards activated-letter method) + (activation cost-other * cards activated-other method)) |
| Other | Number of fraud cases reported (annualized) * [(other costs) card replacement] |
| Card Reissue/Replacement - Compromised Accounts | |
| Production | If accounts share common card numbers: Production costs per card * number of compromised account cases reported (annualized) * number of cards in portfolio/number of accounts in portfolio |
| | If accounts do not share common card numbers: Production costs per card * Number of compromised account cases reported (annualized) |
| Delivery | Number of compromised account cases reported (annualized) * number of cards in portfolio/number of accounts in portfolio * [(card delivery costs-normal * fraud-related card |

TABLE 26-continued

Other Operational Costs

| | |
|---|---|
| Activation | delivery %-normal) + [(card delivery costs-expedited * fraud-related card delivery %-expedited)]<br>If accounts share common card numbers:<br>Number of compromised account cases reported (annualized) * number of cards/number of accounts * ((activation cost-IVR * cards activated-IVR method) + (activation cost-ATM * cards activated-ATM method) + (activation cost-letter * cards activated-letter method) + (activation cost-other * cards activated other method))<br>If accounts do not share common card numbers:<br>Number of compromised account cases reported (annualized) * ((activation cost-IVR * cards activated-IVR method) + (activation cost-ATM * cards activated-ATM method) + (activation cost-letter * cards activated-letter method) + (activation cost-other * cards activated-other method)) |
| Other | If accounts share common card numbers:<br>Number of compromised account cases reported (annualized) * [(other costs) card replacements] * number of cards/number of accounts<br>If accounts do not share common card numbers:<br>Number of compromised account cases reported (annualized) * [(other costs) card replacements] |
| Compliance | |
| Information Security | Value of technology investments (annualized) + compliance audit costs (annualized) + scan costs (annualized) |
| Fines & Penalties | Value of fines & penalties (annualized) |
| Other | Other compliance costs (annualized) |
| Training | |
| Fraud-Related Training Operating Expenses | Fraudrelated training costs (annualized) |
| Postal | Postal/delivery expenses related to Fraud Operations, excluding those related to card replacements |
| Copy/Fax/Print | Copying/faxing/printing expenses related to Fraud Operations (annualized) |
| Office Supplies | Office supply expenses related to Fraud Operations (annualized) |
| Other | Telephone operating expenses related to Fraud Operations (annualized) |

TABLE 27

First Party ("Friendly") Fraud

| | |
|---|---|
| Cost of First Party Fraud | Value of net credit chargeoffs * first party fraud rate |

TABLE 28

Opportunity Costs

| | |
|---|---|
| Lost Profits | |
| Lost Profits | Lost Revenue * Profit Margin |
| Lost Revenue | Incorrect Declines + Customer Reluctance + Card Unavailable |
| Lost Revenue | |
| Incorrect Declines | Revenues lost from incorrect authorization declines for fraud-based policies or referrals, including transactions declined directly and transactions declined following a referral:<br>Revenues Lost Due to Direct Declines Fraud Component<br>(Value of sales transaction (annualized) * revolving |

TABLE 28-continued

Opportunity Costs

| | |
|---|---|
| | customer rate * annual interest rate charged * days to balance payoff * number of declines (annualized) * fraud related declines (%) * incorrect fraud related declines (%)) + (value of sales transaction (annualized) * number of declines (annualized) * fraud related declines (%) * incorrect fraud related declines (%) * interchange fee rate) + (one of the two calculations below) Compromised Account Component<br>If accounts share common card numbers:<br>((Value of sales transaction (annualized) * revolving customer rate * annual interest rate charged * days to balance payoff * number of declines (annualized) * compromised account related declines (%) * incorrect compromised account related declines (%)) + (value of sales transaction (annualized) * number of declines (annualized) * compromised account related declines (%) * incorrect compromised account related declines (%) * interchange fee rate)) * number of cards/number of accounts<br>If accounts do not share common card numbers:<br>(Value of sales transaction (annualized) * revolving customer rate * annual interest rate charged * days to balance payoff * number of declines (annualized) * compromised account related declines (%) * incorrect compromised account related declines (%)) + (value of sales transaction (annualized) * number of declines (annualized) * compromised account related declines (%) * incorrect compromised account related declines (%) * interchange fee rate) + Revenues Lost Due to Declined Referrals Fraud Component<br>(Value of sales transaction (annualized) * revolving customer rate * annual interest rate charged * days to balance payoff * number of referrals (annualized) * fraud related referrals (%) * fraud related referrals declined (%) * fraud related referrals incorrectly declined (%)) + (value of sales transaction (annualized) * number of referrals (annualized) * fraud related referrals (%) * fraud related referrals declined (%) * fraud related referrals incorrectly declined (%) * interchange fee rate) +<br>(one of the two calculations below)<br>Compromised Account Component<br>If accounts share common card numbers:<br>((Value of sales transaction (annualized) * revolving customer rate * annual interest rate charged * days to balance payoff * number of referrals (annualized) * compromised account related referrals (%) * compromised account related referrals declined (%) * compromised account related referrals incorrectly declined (%)) +<br>(value of sales transaction (annualized) * number of referrals (annualized) * compromised account related referrals (%) * compromised account related referrals declined (%) * compromised account related referrals incorrectly declined (%) * interchange fee rate)) * number of cards/number of accounts<br>If accounts do not share common card numbers:<br>(Value of sales transaction (annualized) * revolving customer rate * annual interest rate charged * days to balance payoff * number of referrals (annualized) * compromised account related referrals (%) * compromised account related referrals declined (%) * compromised account related referrals incorrectly declined (%)) +<br>(value of sales transaction (annualized) * number of referrals (annualized) * compromised aacount related referrals (%) * compromised account related referrals declined (%) * compromised account related rreferrals incorrectly declined (%) * interchange fee rate) |
| Customer Reluctance | Revenues lost from account usage reduction due to decreased customer confidence as a result of cardholder fraud experience, including fraud and compromised accounts:<br>Fraud Component<br>[(Value of sales transaction-value of sales transaction-fraud victim) * number of fraud case reported (annualized)] * [(% revolving customers * annual interest rate charged/365 * days to balance payoff) + interchange fee rate] +<br>(one of the two calculations below)<br>Compromised Account Component<br>If accounts share common card numbers: |

TABLE 28-continued

Opportunity Costs

| | |
|---|---|
| | {[(Value of sales transaction-(value of sales transaction-compromised account)) * number of compromised cases reported (annualized)] * [(% revolving customers * annual interest rate chaged/365 * days to balance payoff) + interchange fee rate]} * number of cards/number of accounts |
| | If accounts do not share common card numbers: |
| | [(Value of sales transaction-(value of sales transaction-compromised account)) * number of compromised cases reported (annualized)] * [(% revolving customers * annual interest rate charged/365 * days to balance payoff) + interchange fee rate]} |
| Card Unavailable | Revenues lost do to card replacement period, including fraud and compromised accounts: |
| | Fraud component |
| | [number of transactions per cardholder (annualized)/365 * days to card replacemt * value of sales transaction * number of fraud cases reported (annualized) * % revolving customers * annual interest rate charged/365 * days to balance payoff] + [number of transactions per cardholder (annualized)/365 * days to card replacement * value of sales transaction * number of fraud cases reported (annualized) * interchange fee rate] + |
| | (one of the two calculation below) |
| | Compromised Account Component |
| | If accounts share common card numbers: |
| | number of compromised account cases reported (annualized)/number of fraud cased reported (annualized) * number of cards/number of accounts * Revenues Lost Due to Card Replacement Period (Fraud) |
| | If accounts do not share common card numbers: |
| | number of compromised account cases reportd (annualized)/number of fraud cases reported (annualized) * Revenues Lost Due to Card Replacement Period (Fraud) |

Similar to the Issuer Data Allocation 600, the Acquirer Data Allocation 700 is organized into the following categories: Fraud Losses 706 which is Direct Fraud Costs 702, Fraud Operating Cost 710 which is Fraud Management Expense 704 and Opportunity Costs 712. The Fraud Operating Cost 710 category is further broken down to Fraud Prevention, Fraud Detection, Fraud Investigation & Recoveries and Other Operational Costs sub-categories.

For each category and sub-category, FIGS. 12A1-12A2 list all of the output items that are generated. The definition and formula for each output item is listed in Tables 29-34 below.

TABLE 29

Fraud Losses

Acquirer Fraud Losses via Chargebacks

| | |
|---|---|
| Value of Chargebacks from Issuer | Value of Chargebacks from Issuer (annualized) |
| Value of Chargeback Recoveries - Merchant | Value of Fraud-related Merchant Chargebacks (annualized) - Value of Fraud-related Representments (annualized) Multiplied by −1 to display as a negative figure |
| Fraud Insurance Recoveries | Value of Fraud Insurance Recoveries (annualized) Multiplied by −1 to display as a negative figure |

TABLE 30

Fraud Prevention

Staff Analysis

| | |
|---|---|
| Analysis | A corresponding value is displayed on this line number only if input option to report fully-loaded staff costs is selected. |
| | Average cost of Prevention Analysts (annualized) * Number of Prevention Analysts |

TABLE 30-continued

Fraud Prevention

| | |
|---|---|
| Earnings, benefits, and taxes | A corresponding value is displayed on this line number only if input option to report fully-loaded staff costs is not selected. |
| | Average cost of earnings, benefits, and taxes for Prevention Analysts (annualized) * Number of Prevention Analysts |
| Other | A corresponding value is displayed on this line number only if input option to report fully-loaded staff costs is not selected. |
| | Average other costs for Prevention Analysts (annualized) * Number of Prevention Analysts |

PIN Management System

| | |
|---|---|
| Depreciation | Depreciation expense of PIN Management Systems (annualized) |
| Licensing | Licensing expense of PIN Management Systems (annualized) |
| Hardware | Hardware expense of PIN Management Systems (annualized) |
| Maintenance | Maintenance expense of PIN Management Systems (annualized) |
| IT Staff | Staff (FTE) expense of PIN Management Systems (annualized) |
| Other | Other expenses of PIN Management Systems (annualized) |

PIN-Based Security

| | |
|---|---|
| Upgrades & Enhancements | Value of PIN-based security upgrades & enhancements (annualized) |

Overhead

| | |
|---|---|
| Rent/Lease | If Prevention/Detection/Recovery efforts are conducted in a common facility: |
| | % allocation of the facility's usage to Prevention activities * Common facility's rent/lease expense (annualized) |
| | If common facility's rent/lease expense is reported on a per square foot/meter basis: |
| | Cost of facility's rent/lease expense per square foot/meter * size of Prevention facilities in square feet/meters |
| | If common facility's rent/lease expense is reported on a per-employee basis: |
| | Cost of facility's rent/lease expense per employee * Total number of staff/employees in Prevention function |
| | If Prevention/Detection/Recovery efforts are conducted in separate facilities: |
| | Rent/lease expense of Prevention facilities (annualized) |
| | If Prevention facility's rent/lease expense is reported on a per square foot/meter basis: |
| | Cost of facility's rent/lease expense per square foot/meter * size of Prevention facility in square feet/meters |
| | If Prevention facility's rent/lease expense is reported on a per-employee basis: |
| | Cost of facility's rent/lease expense per employee * Total number of staff/employees in Prevention function |
| Computer Equipment | If Prevention/Detection/Recovery efforts are conducted in a common facility: |
| | % allocation of the facility's usage to Prevention activities * Common facility's computer equipment expense (annualized) |
| | If common facility's computer equipment expense is reported on a per square foot/meter basis: |
| | Cost of facility's computer equipment expense per square foot/meter * size of Prevention facilities in square feet/meters |
| | If common facility's computer equipment expense is reported on a per employee basis: |
| | Cost of facility's computer equipment expense per employee * Total number of staff/employees in Prevention function |
| | If Prevention/Detection/Recovery efforts are conducted in separate facilities: |
| | Computer equipment expense of Prevention facilities (annualized) |

TABLE 30-continued

Fraud Prevention

| | |
|---|---|
| | If Prevention facility's computer equipment expense is reported on a per square foot/meter basis:<br>Cost of facility's computer equipment expense per square foot/meter * size of Prevention facility in square feet/meters<br>If Prevention facility's computer equipment expense is reported on a per-employee basis:<br>Cost of facility's computer equipment expense per employee * Total number of staff/employees in Prevention function |
| Utilities | If Prevention/Detection/Recovery efforts are conducted in a common facility:<br>% allocation of the facility's usage to Prevention activities * Common facility's utilities expense (annualized)<br>If common facility's utilities expense is reported on a per square foot/meter basis:<br>Cost of facility's utilities expense per square foot/meter * size of Prevention facilities in square feet/meters<br>If common facility's utilities expense is reported on a per-employee basis:<br>Cost of facility's utilities expense per employee * Total number of staff/employees in Prevention function<br>If Prevention/Detection/Recovery efforts are conducted in separate facilities:<br>Utilities expense of Prevention facilities (annualized)<br>If Prevention facility's utilities expense is reported on a per square foot/meter basis:<br>Cost of facility's utilities expense per square foot/meter * size of Prevention facility in square feet/meters<br>If Prevention facility's utilities expense is reported on a per-employee basis:<br>Cost of facility's utilities expense per employee * Total number of staff/employees in Prevention function |
| Telephone | If Prevention/Detection/Recovery efforts are conducted in a common facility:<br>% allocation of the facility's usage to Prevention activities * Common facility's telephone expenses (annualized)<br>If common facility's telephone expenses are reported on a per square foot/meter basis:<br>Cost of facility's telephone expenses per square foot/meter * size of Prevention facilities in square feet/meters<br>If common facility's telephone expenses are reported on a per employee basis:<br>Cost of facility's telephone expenses per employee * Total number of staff/employees in Prevention function<br>If Prevention/Detection/Recovery efforts are conducted in separate facilities:<br>Telephone expenses of Prevention facilities (annualized)<br>If Prevention facility's telephone expenses are reported on a per square foot/meter basis:<br>Cost of facility's telephone expenses per square foot/meter * size of Prevention facility in square feet/meters<br>If Prevention facility's telephone expenses are reported on a per employee basis:<br>Cost of facility's telephone expenses per employee * Total number of staff/employees in Prevention function |
| Other | If Prevention/Detection/Recovery efforts are conducted in a common facility:<br>% allocation of the facility's usage to Prevention activities * Common facility's other expenses (annualized)<br>If common facility's other expenses are reported on a per square foot/meter basis:<br>Cost of facility's other expenses per square foot/meter * size of Prevention facilities in square feet/meters<br>If common facility's other expenses are reported on a per-employee basis:<br>Cost of facility's other expenses per employee * Total number of staff/employees in Prevention function<br>If Prevention/Detection/Recovery efforts are conducted in separate facilities:<br>Other expenses of Prevention facilities (annualized)<br>If Prevention facility's other expenses are reported on a per square foot/meter basis:<br>Cost of facility's other expenses per square foot/meter * size of Prevention facility in square feet/meters<br>If Prevention facility's other expenses are reported on a per-employee basis:<br>Cost of facility's other expenses per employee * Total number of staff/employees in Prevention function |

TABLE 31

Fraud Detection

| | |
|---|---|
| Staff | |
| Alert Management | |
| Alert Management | A corresponding value is displayed on this line number only if input option to report fully-loaded staff costs is selected.<br>Average cost of Alert Staff (annualized) * Number of Alert Staff |
| Earnings, benefits, and taxes | A corresponding value is displayed on this line number only if input option to report fully-loaded staff costs is not selected.<br>Average cost of earnings, benefits, and taxes for Alert Staff (annualized) * Number of Alert Staff |
| Other | A corresponding value is displayed on this line number only if input option to report fully-loaded staff costs is not selected.<br>Average other costs for Alert Staff (annualized) * Number of Alert Staff |
| Administrative | |
| Administrative | A corresponding value is displayed on this line number only if input option to report fully-loaded staff costs is selected.<br>Average cost of Administrative Assistants (annualized) * Number of Administrative Assistants |
| Earnings, benefits, and taxes | A corresponding value is displayed on this line number only if input option to report fully-loaded staff costs is not selected.<br>Average cost of earnings, benefits, and taxes for Administrative Assistants (annualized) * Number of Administrative Assistants |
| Other | A corresponding value is displayed on this line number only if input option to report fully-loaded staff costs is not selected.<br>Average other costs for Administrative Assistants (annualized) * Number of Administrative Assistants |
| Chargeback | |
| Chargeback | A corresponding value is displayed on this line number only if input option to report fully-loaded staff costs is selected.<br>Average cost of Detection Specialists (annualized) * Number of Detection Specialists |
| Earnings, benefits, and taxes | A corresponding value is displayed on this line number only if input option to report fully-loaded staff costs is not selected.<br>Average cost of earnings, benefits, and taxes for Detection Specialists (annualized) * Number of Detection Specialists |
| Other | A corresponding value is displayed on this line number only if input option to report fully-loaded staff costs is not selected.<br>Average other costs for Detection Specialists (annualized) * Number of Detection Specialists |
| Supervisory | |
| Supervisory | A corresponding value is displayed on this line number only if input option to report fully-loaded staff costs is selected.<br>Average cost of Detection Supervisors (annualized) * Number of Detection Supervisors |

TABLE 31-continued

Fraud Detection

| | |
|---|---|
| Earnings, benefits, and taxes | A corresponding value is displayed on this line number only if input option to report fully-loaded staff costs is not selected. Average cost of earnings, benefits, and taxes for Detection Supervisors (annualized) * Number of Detection Supervisors |
| Other | A corresponding value is displayed on this line number only if input option to report fully-loaded staff costs is not selected. Average other costs for Detection Supervisors (annualized) * Number of Detection Supervisors |
| Management | |
| Management | A corresponding value is displayed on this line number only if input option to report fully-loaded staff costs is selected. Average cost of Fraud Managers (annualized) * Number of Fraud Managers |
| Earnings, benefits, and taxes | A corresponding value is displayed on this line number only if input option to report fully-loaded staff costs is not selected. Average cost of earnings, benefits, and taxes for Fraud Managers (annualized) * Number of Fraud Managers |
| Other | A corresponding value is displayed on this line number only if input option to report fully-loaded staff costs is not selected. Average other costs for Fraud Managers (annualized) * Number of Fraud Managers |
| Fraud Detection System | |
| Depreciation | Depreciation expense of Fraud Detection Systems (annualized) |
| Licensing | Licensing expense of Fraud Detection Systems (annualized) |
| Hardware | Hardware expense of Fraud Detection Systems (annualized) |
| Maintenance | Maintenance expense of Fraud Detection Systems (annualized) |
| IT Staff | Staff (FTE) expense of Fraud Detection Systems (annualized) |
| Other | Other expenses of Fraud Detection Systems (annualized) |
| Fraud Analysis System | |
| Depreciation | Depreciation expense of Fraud Analysis Systems (annualized) |
| Licensing | Licensing expense of Fraud Analysis Systems (annualized) |
| Hardware | Hardware expense of Fraud Analysis Systems (annualized) |
| Maintenance | Maintenance expense of Fraud Analysis Systems (annualized) |
| IT Staff | Staff (FTE) expense of Fraud Analysis Systems (annualized) |
| Other | Other expenses of Fraud Analysis Systems (annualized) |
| Overhead | |
| Rent/Lease | If Prevention/Detection/Recovery efforts are conducted in a common facility: % allocation of the facility's usage to Detection activities * Common facility's rent/lease expense (annualized) If common facility's rent/lease expense is reported on a per square foot/meter basis: Cost of facility's rent/lease expense per square foot/meter * size of Detection facilities in square feet/meters If common facility's rent/lease expense is reported on a per-employee basis: Cost of facility's rent/lease expense per employee * Total number of staff/employees in Detection function If Prevention/Detection/Recovery efforts are conducted in separate facilities: Rent/lease expense of Detection facilities (annualized) If Prevention facility's rent/lease expense is reported on a per square foot/meter basis: Cost of facility's rent/lease expense per square foot/meter * size of Detection facility in square feet/meters If Detection facility's rent/lease expense is reported on a per-employee basis: Cost of facility's rent/lease expense per employee * Total number of staff/employees in Detection function |
| Computer Equipment | If Prevention/Detection/Recovery efforts are conducted in a common facility: % allocation of the facility's usage to Detection activities * Common facility's computer equipment expense (annualized) If common facility's computer equipment expense is reported on a per square foot/meter basis: Cost of facility's computer equipment expense per square foot/meter * size of Detection facilities in square feet/meters If common facility's computer equipment expense is reported on a per employee basis: Cost of facility's computer equipment expense per employee * Total number of staff/employees in Detection function If Prevention/Detection/Recovery efforts are conducted in separate facilities: Computer equipment expense of Detection facilities (annualized) If Detection facility's computer equipment expense is reported on a per square foot/meter basis: Cost of facility's computer equipment expense per square foot/meter * size of Detection facility in square feet/meters If Detection facility's computer equipment expense is reported on a per employee basis: Cost of facility's computer equipment expense per employee * Total number of staff/employees in Detection function |
| Utilities | If Prevention/Detection/Recovery efforts are conducted in a common facility: % allocation of the facility's usage to Detection activities * Common facility's utilities expense (annualized) If common facility's utilities expense is reported on a per square foot/meter basis: Cost of facility's utilities expense per square foot/meter * size of Detection facilities in square feet/meters If common facility's utilities expense is reported on a per-employee basis: Cost of facility's utilities expense per employee * Total number of staff/employees in Detection function If Prevention/Detection/Recovery efforts are conducted in separate facilities: Utilities expense of Detection facilities (annualized) If Detection facility's utilities expense is reported on a per square foot/meter basis: Cost of facility's utilities expense per square foot/meter * size of Detection facility in square feet/meters If Detection facility's utilities expense is reported on a per-employee basis: Cost of facility's utilities expense per employee * Total number of staff/employees in Detection function |
| Telephone | If Prevention/Detection/Recovery efforts are conducted in a common facility: % allocation of the facility's usage to Detection activities * Common facility's telephone expenses (annualized) If common facility's telephone expenses are reported on a per square foot/meter basis: Cost of facility's telephone expenses per square foot/meter * size of Detection facilities in square feet/meters If common facility's telephone expenses are reported on a per Total employee basis: Cost of facility's telephone expenses per employee * Total number of staff/employees in Detection function If Prevention/Detection/Recovery efforts are conducted in separate facilities: Telephone expenses of Detection facilities (annualized) If Detection facility's telephone expenses are reported on a per square foot/meter basis: Cost of facility's telephone expenses per square foot/meter * size of Detection facility in square feet/meters |

TABLE 31-continued

Fraud Detection

| | |
|---|---|
| Other | If Detection facility's telephone expenses are reported on a per employee basis:<br>Cost of facility's telephone expenses per employee * Total number of staff/employees in Detection function<br>If Prevention/Detection/Recovery efforts are conducted in a common facility:<br>% allocation of the facility's usage to Detection activities * Common facility's other expenses (annualized)<br>If common facility's other expenses are reported on a per square foot/meter basis:<br>Cost of facility's other expenses per square foot/meter * size of Detection facilities in square feet/meters<br>If common facility's other expenses are reported on a per-employee basis:<br>Cost of facility's other expenses per employee * Total number of staff/employees in Detection function<br>If Prevention/Detection/Recovery efforts are conducted in separate facilities:<br>Other expenses of Detection facilities (annualized)<br>If Detection facility's other expenses are reported on a per square foot/meter basis:<br>Cost of facility's other expenses per square foot/meter * size of Detection facility in square feet/meters<br>If Detection facility's other expenses are reported on a per-employee basis:<br>Cost of facility's other expenses per employee * Total number of staff/employees in Detection function |

TABLE 32

Fraud Investigation & Recoveries

| | |
|---|---|
| Staff | |
| Administrative | |
| Administrative | A corresponding value is displayed on this line number only if input option to report fully-loaded staff costs is selected.<br>Average cost of Administrative Assistants (annualized) * Number of Administrative Assistants |
| Earnings, benefits, and taxes | A corresponding value is displayed on this line number only if input option to report fully-loaded staff costs is not selected.<br>Average cost of earnings, benefits, and taxes for Administrative Assistants (annualized) * Number of Administrative Assistants |
| Other | A corresponding value is displayed on this line number only if input option to report fully-loaded staff costs is not selected.<br>Average other costs for Administrative Assistants (annualized) * Number of Administrative Assistants |
| Chargeback | |
| Chargeback | A corresponding value is displayed on this line number only if input option to report fully-loaded staff costs is selected.<br>Average cost of Recovery Specialists (annualized) * Number of Recovery Specialists |
| Earnings, benefits, and taxes | A corresponding value is displayed on this line number only if input option to report fully-loaded staff costs is not selected.<br>Average cost of earnings, benefits, and taxes for Recovery Specialists (annualized) * Number of Recovery Specialists |
| Other | A corresponding value is displayed on this line number only if input option to report fully-loaded staff costs is not selected.<br>Average other costs for Recovery Specialists (annualized) * Number of Recovery Specialists |
| Supervisory | |
| Supervisory | A corresponding value is displayed on this line number only if input option to report fully-loaded staff costs is selected.<br>Average cost of Recovery Supervisors (annualized) * Number of Recovery Supervisors |
| Earnings, benefits, and taxes | A corresponding value is displayed on this line number only if input option to report fully-loaded staff costs is not selected.<br>Average cost of earnings, benefits, and taxes for Recovery Supervisors (annualized) * Number of Recovery Supervisors |
| Other | A corresponding value is displayed on this line number only if input option to report fully-loaded staff costs is not selected.<br>Average other costs for Recovery Supervisors (annualized) * Number of Recovery Supervisors |
| Chargeback Management System | |
| Depreciation | % of Chargeback Management Systems use attributable to Fraud * Depreciation expense of Chargeback Management Systems (annualized) |
| Licensing | % of Chargeback Management Systems use attributable to Fraud * Licensing expense of Chargeback Management Systems (annualized) |
| Hardware | % of Chargeback Management Systems use attributable to Fraud * Hardware expense of Chargeback Management Systems (annualized) |
| Maintenance | % of Chargeback Management Systems use attributable to Fraud * Maintenance expense of Chargeback Management Systems (annualized) |
| IT Staff | % of Chargeback Management Systems use attributable to Fraud * Staff (FTE) expense of Chargeback Management Systems (annualized) |
| Other | % of Chargeback Management Systems use attributable to Fraud * Other expenses of Chargeback Management Systems (annualized) |
| Overhead | |
| Rent/Lease | If Prevention/Detection/Recovery efforts are conducted in a common facility:<br>% allocation of the facility's usage to Recovery activities * Common facility's rent/lease expense (annualized)<br>If common facility's rent/lease expense is reported on a per square foot/meter basis:<br>Cost of facility's rent/lease expense per square foot/meter * size of Recovery facilities in square feet/meters<br>If common facility's rent/lease expense is reported on a per-employee basis:<br>Cost of facility's rent/lease expense per employee * Total number of staff/employees in Recovery function<br>If Prevention/Detection/Recovery efforts are conducted in separate facilities:<br>Rent/lease expense of Recovery facilities (annualized)<br>If Recovery facility's rent/lease expense is reported on a per square foot/meter basis:<br>Cost of facility's rent/lease expense per square foot/meter * size of Recovery facility in square feet/meters<br>If Recovery facility's rent/lease expense is reported on a per-employee basis:<br>Cost of facility's rent/lease expense per employee * Total number of staff/employees in Recovery function |
| Computer Equipment | If Prevention/Detection/Recovery efforts are conducted in a common facility:<br>% allocation of the facility's usage to Recovery activities * Common facility's computer equipment expense (annualized)<br>If common facility's computer equipment |

TABLE 32-continued

Fraud Investigation & Recoveries

| | |
|---|---|
| Utilities | expense is reported on a per square foot/meter basis:<br>Cost of facility's computer equipment expense per square foot/meter * size of Recovery facilities in square feet/meters<br>If common facility's computer equipment expense is reported on a per employee basis:<br>Cost of facility's computer equipment expense per employee * Total number of staff/employees in Recovery function<br>If Prevention/Detection/Recovery efforts are conducted in separate facilities:<br>Computer equipment expense of Recovery facilities (annualized)<br>If Recovery facility's computer equipment expense is reported on a per square foot/meter basis:<br>Cost of facility's computer equipment expense per square foot/meter * size of Recovery facility in square feet/meters<br>If Recovery facility's computer equipment expense is reported on a per employee basis:<br>Cost of facility's computer equipment expense per employee * Total number of staff/employees in Recovery function<br>If Prevention/Detection/Recovery efforts are conducted in a common facility:<br>% allocation of the facility's usage to Recovery activities * Common facility's utilities expense (annualized)<br>If common facility's utilities expense is reported on a per square foot/meter basis:<br>Cost of facility's utilities expense per square foot/meter * size of Recovery facilities in square feet/meters<br>If common facility's utilities expense is reported on a per-employee basis:<br>Cost of facility's utilities expense per employee * Total number of staff/employees in Recovery function<br>If Prevention/Detection/Recovery efforts are conducted in separate facilities:<br>Utilities expense of Recovery facilities (annualized)<br>If Recovery facility's utilities expense is reported on a per square foot/meter basis:<br>Cost of facility's utilities expense per square foot/meter * size of Recovery facility in square feet/meters<br>If Recovery facility's utilities expense is reported on a per-employee basis:<br>Cost of facility's utilities expense per employee * Total number of staff/employees in Recovery function |
| Telephone | If Prevention/Detection/Recovery efforts are conducted in a common facility:<br>% allocation of the facility's usage to Recovery activities * Common facility's telephone expenses (annualized)<br>If common facility's telephone expenses are reported on a per square foot/meter basis:<br>Cost of facility's telephone expenses per square foot/meter * size of Recovery facilities in square feet/meters<br>If common facility's telephone expenses are reported on a per employee basis:<br>Cost of facility's telephone expenses per employee * Total number of staff/employees in Recovery function<br>If Prevention/Detection/Recovery efforts are conducted in separate facilities:<br>Telephone expenses of Recovery facilities (annualized)<br>If Recovery facility's telephone expenses are reported on a per square foot/meter basis:<br>Cost of facility's telephone expenses per square foot/meter * size of Recovery facility in square feet/meters<br>If Recovery facility's telephone expenses are reported on a per employee basis:<br>Cost of facility's telephone expenses per employee * Total number of staff/employees in Recovery function |
| Other | If Prevention/Detection/Recovery efforts are conducted in a common facility:<br>% allocation of the facility's usage to Recovery activities * Common facility's other expenses (annualized)<br>If common facility's other expenses are reported on a per square foot/meter basis:<br>Cost of facility's other expenses per square foot/meter * size of Recovery facilities in square feet/meters<br>If common facility's other expenses are reported on a per-employee basis:<br>Cost of facility's other expenses per employee * Total number of staff/employees in Recovery function<br>If Prevention/Detection/Recovery efforts are conducted in separate facilities:<br>Other expenses of Recovery facilities (annualized)<br>If Recovery facility's other expenses are reported on a per square foot/meter basis:<br>Cost of facility's other expenses per square foot/meter * size of Recovery facility in square feet/meters<br>If Recovery facility's other expenses are reported on a per-employee basis:<br>Cost of facility's other expenses per employee * Total number of staff/employees in Recovery function |
| Legal Fees | |
| Fraud-Related Legal Fees | Value of Legal fees related to Fraud Operations (annualized) |
| Fraud Insurance | |
| Fraud Insurance Premiums | Value of Fraud Insurance premiums (annualized) |
| Other/Miscellaneous Fraud Expenses | |
| Other Fraud Losses | Other known costs of direct fraud operations (annualized) |

TABLE 33

Other Operational Costs
Customer Service

| | |
|---|---|
| Inbound | |
| Fraud-related Customer Inquiries | [(Call received cost) Inbound] * number of inquiries per fraud case * number of fraud cases reported (annualized) |
| Outbound | |
| Cable-Based Calls to Support Fraud Cases | [(Call cost-cable) Outbound] * number of calls per fraud case-cable * number of fraud cases reported (annualized) |
| Mobile-Based Calls to Support Fraud Cases | [(Call cost-mobile) Outbound] * number of calls per fraud case-mobile * number of fraud cases reported (annualized) |
| Compliance | |
| Information Security | Value of technology investments (annualized) + compliance audit costs (annualized) + scan costs (annualized) |
| Fines & Penalties | Value of fines & penalties (annualized) |
| Other | Other compliance costs (annualized) |

TABLE 33-continued

Other Operational Costs
Customer Service

| Training | |
|---|---|
| Fraud-Related Training Bankcard Processing | Fraud-related training costs (annualized) |
| Authorization & Settlement | [Authorization fee per transaction * number of incorrect fraud-related declines (annualized)] + [Settlement fee per transaction * number of incorrect fraud-related declines (annualized)] |
| Other | Value of fraud-related processing fees (annualized) |
| Operating Expenses | |
| Postal | Postal/delivery expenses-except those related to card replacements-related to Fraud Operations (annualized) |
| Copy/Fax/Print | Copying/faxing/printing expenses related to Fraud Operations (annualized) |
| Office Supplies | Office supply expenses related to Fraud Operations (annualized) |
| Other | Telephone operating expenses related to Fraud Operations (annualized) |

TABLE 34

Opportunity Costs

| Lost Profits | |
|---|---|
| Lost Profits | Lost Revenue * Profit Margin |
| Lost Revenue | Incorrect Declines + Other Oppurtunity Costs |
| Lost Revenue | |
| Incorrect Declines | Revenues lost from authorization declines due to established parameters that incorrectly decline for fraud-based policies or referrals. Number of incorrect fraud related declines (annualized) * (merchant sales volume (annualized)/number of transactions (annualized)) * (merchant discount rate − interchange rate) |
| Other Opportunity Costs | Fraud-related opportunity costs (annualized) |

Similar to the Issuer and Acquirer Data Allocations (600, 700), the Merchant Data Allocation 800 is organized into the following categories: Fraud Loss 806 which is Direct Fraud Cost 802, Fraud Operating Cost 810 which is Fraud Management Expense 804, and Opportunity Costs 812. The Fraud Operating Cost 810 is further broken down to Fraud Loss Prevention and Other Operational Costs sub-categories.

For each category and sub-category, FIG. 13 lists all of the output items that are generated. The definition and formula for each output item is listed in Tables 35-38 below.

TABLE 35

Fraud Losses

| Merchant Fraud Losses | |
|---|---|
| Value of Chargebacks | Number of Fraud-related Chargebacks (annualized) * Value of Fraud-related Chargeback |
| Value of Fraud Claims Directly Credited | Value of Fraud Claims Directly Credited (annualized) |
| Value of Fraud Insurance Recoveries | Value of Fraud Insurance Recoveries (annualized) |

TABLE 36

Fraud Loss Prevention

| Staff Analysis - Loss Prevention | |
|---|---|
| Analysis - Loss Prevention | A corresponding value is displayed on this line number only if input option to report fully-loaded staff costs is selected. Average cost of Loss Prevention Analysis Staff (annualized) * Number of Loss Prevention Analysts * Percentage of Loss Prevention accounted for through Fraud Operations |
| Earnings, benefits, and taxes | A corresponding value is displayed on this line number only if input option to report fully-loaded staff costs is not selected. Average cost of Loss Prevention Analysis Staff (annualized) * Number of Loss Prevention Analysts * Percentage of Loss Prevention accounted for through Fraud Operations |
| Other | A corresponding value is displayed on this line number only if input option to report fully-loaded staff costs is not selected. Average other costs for Loss Prevention Analysis Staff (annualized) * Number of Loss Prevention Analysts * Percentage of Loss Prevention accounted for through Fraud Operations |
| Analysis - Copy Request | |
| Analysis - Copy Request | A corresponding value is displayed on this line number only if input option to report fully-loaded staff costs is selected. Average cost of Copy Request Analysis Staff (annualized) * Number of Copy Request Analysts |
| Earnings, benefits, and taxes | A corresponding value is displayed on this line number only if input option to report fully-loaded staff costs is not selected. Average cost of Copy Request Analysis Staff (annualized) * Number of Copy Request Analysts |
| Other | A corresponding value is displayed on this line number only if input option to report fully-loaded staff costs is not selected. Average other costs for Copy Request Analysis Staff (annualized) * Number of Copy Request Analysts |
| Management - Loss Prevention | |
| Management - Loss Prevention | A corresponding value is displayed on this line number only if input option to report fully-loaded staff costs is selected. Average cost of Loss Prevention Management Staff (annualized) * Number of Loss Prevention Managers * Percentage of Loss Prevention accounted for through Fraud Operations |
| Earnings, benefits, and taxes | A corresponding value is displayed on this line number only if input option to report fully-loaded staff costs is not selected. Average cost of Loss Prevention Management Staff (annualized) * Number of Loss Prevention Managers * Percentage of Loss Prevention accounted for through Fraud Operations |
| Other | A corresponding value is displayed on this line number only if input option to report fully-loaded staff costs is not selected. Average other costs for Loss Prevention Management Staff (annualized) * Number of Loss Prevention Managers * Percentage of Loss Prevention accounted for through Fraud Operations |
| Management - Copy Request | |
| Management - Copy Request | A corresponding value is displayed on this line number only if input option to report fully-loaded staff costs is selected. Average cost of Copy Request Management Staff (annualized) * Number of Copy Request Managers |

TABLE 36-continued

Fraud Loss Prevention

| | |
|---|---|
| Earnings, benefits, and taxes | A corresponding value is displayed on this line number only if input option to report fully-loaded staff costs is not selected. Average cost of Copy Request Management Staff (annualized) * Number of Copy Request Managers |
| Other | A corresponding value is displayed on this line number only if input option to report fully-loaded staff costs is not selected. Average other costs for Copy Request Management Staff (annualized) * Number of Copy Request Managers |
| Systems & Services | |
| In-House | |
| Depreciation | Depreciation expense of Payer Authentication system (annualized) + Depreciation expense of Dispute Management system (annualized) + Depreciation expense of Other systems (annualized) |
| Licensing | Licensing expense of Payer Authentication system (annualized) + Licensing expense of Dispute Management system (annualized) + Licensing expense of Other systems (annualized) |
| Hardware | Hardware expense of Payer Authentication system (annualized) + Hardware expense of Dispute Management system (annualized) + Hardware expense of Other systems (annualized) |
| Maintenance | Maintenance expense of Payer Authentication system (annualized) + Maintenance expense of Dispute Management system (annualized) + Maintenance expense of Other systems (annualized) |
| IT Staff | Staff (FTE) expense of Payer Authentication system (annualized) + Staff (FTE) expense of Dispute Management system (annualized) + Staff (FTE) expense of Other systems (annualized) |
| Transaction Fees | Transaction fee expense of Payer Authentication system (annualized) + Transaction fee expense of Dispute Management system (annualized) + Transaction fee expense of Other systems (annualized) |
| Other | Other expense of Payer Authentication system (annualized) + Other expense of Dispute Management system (annualized) + Other expense of Other systems (annualized) |
| Outsourced | |
| Licensing | Licensing expense of Address Verification system (annualized) + Licensing expense of Card Verification system (annualized) |
| Hardware | Hardware expense of Address Verification system (annualized) + Hardware expense of Card Verification system (annualized) |
| Maintenance | Maintenance expense of Address Verification system (annualized) + Maintenance expense of Card Verification system (annualized) |
| Transaction Fees | Transaction fee expense of Address Verification system (annualized) + Transaction fee expense of Card Verification system (annualized) |
| Managed Fraud Prevention | Cost of externally managed fraud screens, negative lists, or other prevention/detection services (annualized) |
| External Models | Cost of externally managed behavioral/decision models (annualized) |
| Other | Other expense of Address Verification (annualized) + Other expense of Card Verification system (annualized) |
| Overhead | |
| Rent/Lease | Rent/lease expense of facility (annualized) * Percentage of facility occupied by Loss Prevention * Percentage of Loss Prevention accounted for through Fraud Operations If rent/lease expense of facility is reported on a per square foot/meter basis: Rent/lease expense of facility per square foot/meter (annualized) * Facility size in square feet/meters * Percentage of facility occupied by Loss Prevention * Percentage of Loss Prevention accounted for through Fraud Operations If rent/lease expense of facility is reported on a per-employee basis: Rent/lease expense of facility per employee (annualized) * [(total number of FTE Loss Prevention staff * Percentage of facility occupied by Loss Prevention) + (total number of FTE Copy Request staff)] * Percentage of Loss Prevention accounted for through Fraud Operations |
| Computer Equipment | Computer equipment expense of facility (annualized) * Percentage of facility occupied by Loss Prevention * Percentage of Loss Prevention accounted for through Fraud Operations If computer equipment expense of facility is reported on a per square foot/meter basis: Computer equipment expense of facility per square foot/meter (annualized) * Facility size in square feet/meters * Percentage of facility occupied by Loss Prevention * Percentage of Loss Prevention accounted for through Fraud Operations If computer equipment expense of facility is reported on a per-employee basis: Computer equipment expense of facility per employee (annualized) * [(total number of FTE Loss Prevention staff * Percentage of facility occupied by Loss Prevention) + (total number of FTE Copy Request staff)] * Percentage of Loss Prevention accounted for through Fraud Operations |
| Utilities | Utilities expense of facility (annualized) * Percentage of facility occupied by Loss Prevention * Percentage of Loss Prevention accounted for through Fraud Operations If utilities expense of facility is reported on a per square foot/meter basis: Utilities expense of facility per square foot/meter (annualized) * Facility size in square feet/meters * Percentage of facility occupied by Loss Prevention * Percentage of Loss Prevention accounted for through Fraud Operations If utilities expense of facility is reported on a per-employee basis: Utilities expense of facility per employee (annualized) * [(total number of FTE Loss Prevention staff * Percentage of facility occupied by Loss Prevention) + (total number of FTE Copy Request staff)] * Percentage of Loss Prevention accounted for through Fraud Operations |
| Telephone | Telephone expense of facility (annualized) * Percentage of facility occupied by Loss Prevention * Percentage of Loss Prevention accounted for through Fraud Operations If telephone expense of facility is reported on a per square foot/meter basis: Telephone expense of facility per square foot/meter (annualized) * Facility size in square feet/meters * Percentage of facility occupied by Loss Prevention * Percentage of Loss Prevention accounted for through Fraud Operations If telephone expense of facility is reported on a per-employee basis: Telephone expense of facility per employee (annualized) * [(total number of FTE Loss Prevention staff * Percentage of facility occupied by Loss Prevention) + (total number of FTE Copy Request staff)] * Percentage of Loss Prevention accounted for through Fraud Operations |
| Other | Other expense of facility (annualized) * Percentage of facility occupied by Loss Prevention * Percentage of Loss Prevention accounted for through Fraud Operations If other expense of facility is reported on a per square foot/meter basis: Other expense of facility per square foot/meter (annualized) * Facility size in square feet/meters * Percentage of facility occupied by Loss Prevention * Percentage of Loss Prevention accounted for through Fraud Operations If other |

TABLE 36-continued

Fraud Loss Prevention

| | |
|---|---|
| | expense of facility is reported on a per-employee basis: Other expense of facility per employee (annualized) * [(total number of FTE Loss Prevention staff * Percentage of facility occupied by Loss Prevention) + (total number of FTE Copy Request staff)] * Percentage of Loss Prevention accounted for through Fraud Operations |
| Misc. Fraud Management | Miscellaneous Loss Prevention costs (annualized) * Percentage of Loss Prevention accounted for through Fraud Operations |
| Legal Fees | |
| Fraud-Related Legal Fees | Value of Legal fees related to Fraud Operations (annualized) |
| Fraud Insurance | |
| Fraud Insurance Premiums | Value of Fraud insurance premiums (annualized) |
| Other/Miscellaneous Fraud Expenses | |
| Other Fraud Losses | Other known costs of direct fraud operations (annualized) |

TABLE 37

Other Operational Costs

| | |
|---|---|
| Customer Service | |
| Inbound | |
| Fraud-related Customer Inquiries | [(Call received cost) Inbound] * number of inquiries per fraud-related dispute * number of disputes (annualized) * fraud-related disputes (%) |
| Outbound | |
| Cable-Based Calls to Support Fraud Disputes | [(Call cost-cable) Outbound] * number of calls per fraud-related dispute-cable * number of disputes (annualized) * fraud-related disputes (%) |
| Mobile-Based Calls to Support Fraud Disputes | [(Call cost-mobile) Outbound] * number of calls per fraud-related dispute-mobile * number of disputes (annualized) * fraud-related disputes (%) |
| Compliance | |
| Information Security | Value of technology investments (annualized) + compliance audit costs (annualized) + scan costs (annualized) |
| Fines & Penalties | Value of fines & penalties (annualized) |
| Other | Other compliance costs (annualized) |
| Training | |
| Fraud-Related Training | Fraud-related training costs (annualized) |
| Operating Expenses | |
| Postal | Postal/delivery expenses related to Loss Prevention activities (annualized) * Percentage of Loss Prevention accounted for through Fraud Operations |
| Copy/Fax/Print | Copying/faxing/printing expenses related to Loss Prevention activities (annualized) * Percentage of Loss Prevention accounted for through Fraud Operations |
| Office Supplies | Office supply expenses related to Loss Prevention activities (annualized) * Percentage of Loss Prevention accounted for through Fraud Operations |
| Other | Telephone operating expenses related to Loss Prevention activities (annualized) * Percentage of Loss Prevention accounted for through Fraud Operations |

TABLE 38

Opportunity Costs

| | |
|---|---|
| Lost Profits | |
| Lost Profits | Lost Revenue * Profit Margin |
| Lost Revenue | Incorrect Declines + Other Opportunity Costs |
| Lost Revenue | |
| Incorrect Declines | Revenues lost from authorization declines due to established parameters that incorrectly decline for fraud-based policies or referrals. [(Value of incorrect declines (annualized)) ISSUER] + [(Value of incorrect declines (annualized)) MERCHANT] |
| Other Opportunity Costs | Fraud-related opportunity costs (annualized) |

The above data allocations (relating to fraud loss for issuer, acquirer, and merchant) enable each processing entity to better understand the economic impact of fraud. In addition, if the entities (issuer, acquirer, and merchant) wish to gain insight into the overall industry-wide impact of fraud loss, the present invention facilitates many comparative analysis for benchmarking (or peer performance benchmarking) among the participating entities. Prior to the present invention, because entities do not perform the same set of activities for all their clients, nor define their data in a consistent manner, it was difficult to match expenses with appropriate activity for different entities (e.g., the difference of fraud management expense as defined by a merchant and by an issuer).

The Performance Measures reports (FIGS. 14A-14F) of the present invention illustrate examples of consistent and comparable metrics applied across different functions of participating processing entities. As can be seen, various different Performance Measures such as "Total Fraud Cost per Unit", "Total Fraud Cost to Total Volume", and "Opportunity Cost per Unit" among others are derived by different formulas from the data allocations of FIGS. 11A-13 and inputs of FIGS. 7A-7E3. For example, the "Opportunity Cost per Unit" is derived from dividing Opportunity Cost by number of Units. For an issuer, this unit is related to credit card accounts, while for an acquirer, this unit is related to the portfolio of merchants that deals with the acquirer. Because comparative metrics is used, the Performance Measures can provide a more meaningful analysis to different entities.

FIG. 15 illustrates an example Total Cost of Fraud report showing the allocated costs for the various components of the total cost of fraud aggregated from the Total Cost of Fraud Summary for issuer, acquirer, and merchant. The report shows actual allocated dollar values of Cost of Fraud such as Opportunity Costs for each entity as well as the total cost of fraud for all participating entities ($12,097,623.96). Because comparative metrics is used, the present invention generates a true Total Cost of Fraud report for the entities inclusive of the merchant, acquirer, and issuer.

Figure 16:
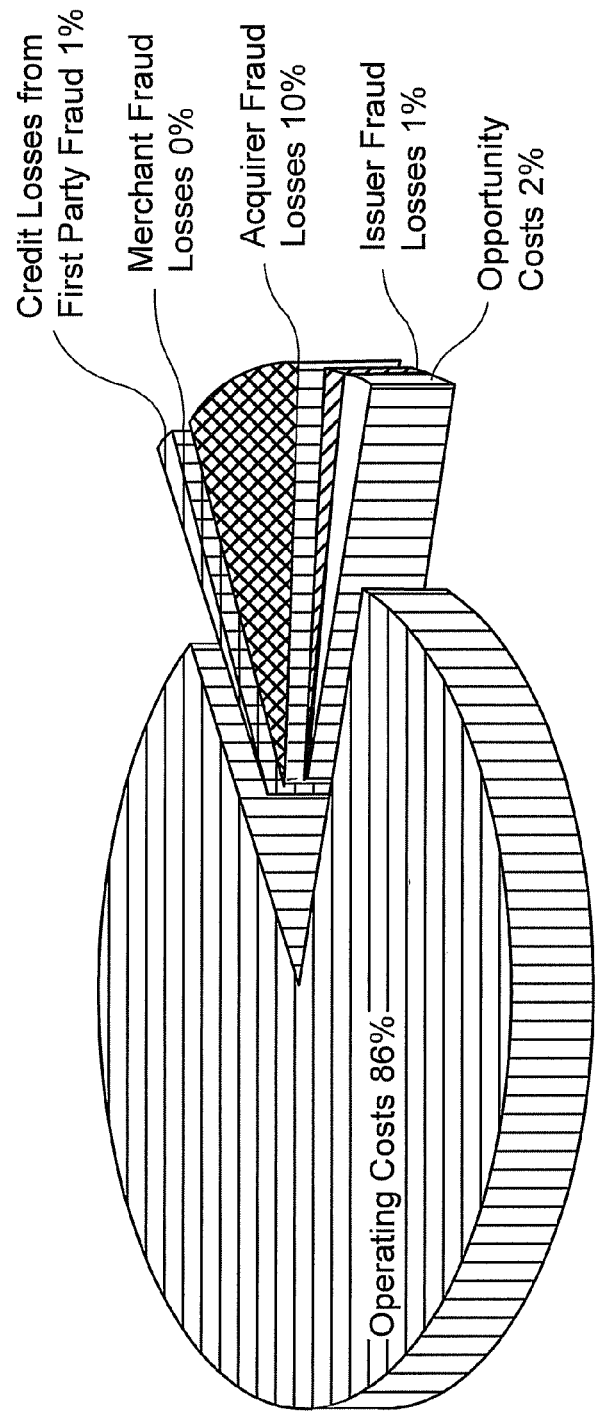
FIG. 16 illustrates an example management report that graphically represents the total cost of fraud along with all its components.

FIG. 16 graphically illustrates different components of the Total Cost of Fraud. The report shows each cost component as a percentage of the total cost of fraud. The report shows that the cost of fraud including credit losses from first party fraud, merchant fraud losses, acquirer fraud losses, issuer fraud losses, and the opportunity costs comprise only a small portion of the total cost of fraud. As can be appreciated by persons of ordinary skill in the art, the operating cost of the issuer, acquirer, and the merchant makes up 86% of the total cost of fraud. Thus, the present invention illustrates that the direct fraud loss is only a minor component of the total cost of fraud.

In an alternative embodiment, the assessment module 34 receives inputs (see FIGS. 7A-7E3) from multiple issuers, merchants and acquirers and provides an industry-wide reference cost of fraud data which is an aggregated cost of fraud data for use by the individual entities for use as benchmark data.

In the embodiment shown, the input form 11 is a single electronic spreadsheet containing a defined set of input requirements which is common to all business entities including issuers, acquirers and merchants. Specifically, the input requirement set for an issuer is common to all issuers providing data, the input requirement set for an acquirer is common to all acquirers, and the input requirement set for a merchant is common to all merchants. Alternatively, three separate spreadsheets containing commonly defined set of input requirements for issuers, acquires and merchants, respectively may be provided.

In yet another embodiment, instead of distributing the spreadsheets to participating business entities (stakeholders), the business entities themselves may access the fraud assessment module 34 through the Internet to enter the input data. The fraud assessment module determines, based on an aggregation of the received data, the reference cost of fraud data including direct fraud loss, fraud management expense (fraud operating cost) and opportunity cost.

The reference cost of fraud data include aggregated performance measures that are identical to those in FIGS. 14A-14F and reference total cost of fraud breakdown report in FIG. 15 except that the they represent industry wide averages of aggregated data, rather than for a particular business entity. Calculation of the aggregated performance measures data for issuers involves aggregating input values and/or allocated values for all issuers. For example, for the performance measure entitled "Issuer Total Fraud Cost per Account" (see FIG. 14A), the allocated values "Net Fraud Losses+Fraud Management Expense+Opportunity Costs" for all issuers are added together and divided by the total "Number of Accounts" for all issuers. Similar calculations of the aggregated performance measures for acquirers and merchants are made (see FIGS. 14C-14F).

Calculation of the aggregated reference total cost of fraud breakdown for issuers involves aggregating allocated values for all issuers including aggregation of fraud loss, fraud management expense, and opportunity cost. For example, the assessment module adds the allocated values for "Fraud Prevention" (see FIG. 17) for all issuers ($463,244,000.05) and calculates the percentage of the added value as a portion (8.76%) of the total cost of fraud for all issuers ($5,295,265,000.29). This means that an issuer spends an average of 8.76% of the total cost of fraud as management expense for fraud prevention. As another example, FIG. 17 shows that an acquirer spends an average of 78.07% of the total cost of fraud as fraud management expense (fraud operating cost). Similar calculations of the reference cost of fraud data are shown in FIG. 17.

Illustrated at the bottom of FIG. 17 are calculations of the reference total cost of fraud data for all business entities inclusive of issuers, acquirers, and merchants. The reference data include direct fraud losses from merchants, direct fraud losses from acquirers, direct fraud losses from issuers, first party losses from issuers, fraud operating costs from all business entities, opportunity costs for all business entities and the total cost of fraud for all entities. The reference data also include percentages of the data items as a function of the total cost of fraud for all entities. For example, FIG. 17 shows that the average opportunity cost for a business entity is 1.84% of the total cost of fraud for all entities.

The reference cost of fraud data as shown in FIG. 17 for all business entities inclusive of issuers, acquirers, and merchants serve as benchmark data for each participating entity.

Each business entity can use the reference data to compare against its own fraud related data and thereby make more intelligent decisions. For example, if the reference data provides that the average cost for fraud detection for an issuer is 17.27% of the total cost of fraud and average issuer fraud loss is 1.59% as shown in FIG. 17 while the particular issuer's own cost for fraud detection is only 5% and the direct issuer fraud loss is 17%, that issuer now knows that it is spending much less on fraud detection than the industry average which may be the cause for the higher than average direct fraud loss of 17%. This is very useful information as the issuer may be able to save money by marginally increasing the fraud detection expense to substantially reduce the direct fraud loss.

The reference cost of fraud data can be made even more useful by aggregating the cost of fraud data by industry groups or related industries. For example, the assessment module may aggregate data from merchants in the travel industry only and provide the reference data for that industry.

The foregoing specific embodiments represent just some of the ways of practicing the present invention. Many other embodiments are possible within the spirit of the invention. Accordingly, the scope of the invention is not limited to the foregoing specification, but instead is given by the appended claims along with their full range of equivalents.

What is claimed is:

1. A system for providing reference cost of fraud data related to financial presentation devices that are presentable to providers of goods or services, the system comprising:
   a processor;
   a fraud assessment module executable by the processor and providing a commonly defined set of input requirements for a plurality of business entities, the fraud assessment module configured to:
   receive, from the plurality of business entities, sales data related to a plurality of financial presentation devices and operating cost data related to fraud associated with the plurality of financial presentation devices, the received data conforming to the commonly defined set of input requirements; and
   determine, based on the received data, the reference cost of fraud data, the reference cost of fraud data including a direct fraud loss, a fraud operating cost, and an opportunity cost representing lost revenue that would otherwise be generated by use of the financial presentation devices to conduct transactions in the absence of fraud, the determined reference cost of fraud data being accessible by the plurality of business entities for use as benchmark data.

2. The system according to claim 1, wherein the fraud assessment module operates to determine the reference cost of fraud data by aggregating the direct fraud loss, fraud operating cost and opportunity cost of the plurality of business entities.

3. The system according to claim 1, wherein the fraud assessment module operates to receive the sales data and operating cost data from a plurality of issuers and the determined reference cost of fraud data relate to average direct fraud loss, average fraud operating cost and average opportunity cost among the plurality of issuers.

4. The system according to claim 1, wherein the fraud assessment module operates to receive the sales data and operating cost data from a plurality of acquirers and the determined reference cost of fraud data relate to average direct fraud loss, average fraud operating cost and average opportunity cost among the plurality of acquirers.

5. The system according to claim 1, wherein the fraud assessment module operates to receive the sales data and operating cost data from a plurality of merchants and the determined reference cost of fraud data relate to average direct fraud loss, average fraud operating cost and average opportunity cost among the plurality of merchants.

6. The system according to claim 1, wherein the fraud assessment module operates to determine, as part of the reference cost of fraud data, an average fraud operating cost, wherein
the fraud operating cost includes operating expenses associated with activities of prevention, detection, investigation and recovery of fraud loss associated with the financial presentation devices.

7. The system according to claim 1, wherein the fraud assessment module operates to allocate to the opportunity cost one or more of:
a revenue loss due to incorrect declines of the financial presentation devices; and
a revenue loss due to decreased user confidence as a result of fraud related to the financial presentation devices of the users.

8. The system according to claim 1, wherein the fraud assessment module operates to allocate to the opportunity cost one or more of:
a revenue loss associated with compromised accounts; and
a revenue loss during the replacement period of the financial presentation devices.

9. The system according to claim 1, wherein the fraud assessment module operates to determine as part of the direct fraud loss, based on the received sales data and cost data, a first party fraud loss representing losses attributed to misrepresentation of usage by authorized holders of the financial presentation devices.

10. The system according to claim 1, wherein the fraud assessment module operates to include, as part of the fraud operating cost, expenses related to information technology system, which are attributable to fraud operations.

11. The system according to claim 1, wherein the fraud assessment module is operable to receive one or more of the following:
cost data related to information technology system, which is attributable to fraud operations;
cost data related to received telephone calls, which is attributable to inquiries related to fraud;
cost data related to outbound telephone calls to users of the financial presentation devices, which is attributable to inquiries related to fraud; and
cost data related to replacement of the financial presentation devices, which is attributable to fraud.

12. A method for providing reference cost of fraud data related to financial presentation devices that are presentable to providers of goods or services, the method comprising:
receiving by a processor, from the plurality of business entities, sales data related to a plurality of financial presentation devices and operating cost data related to fraud associated with the plurality of financial presentation devices, the received data conforming to a commonly defined set of input requirements; and
determining by the processor, based on the received data, the reference cost of fraud data, the reference cost of fraud data including a direct fraud loss, a fraud operating cost and an opportunity cost representing lost revenue that would otherwise be generated by use of the financial presentation devices to conduct transactions in the absence of fraud, the determined reference cost of fraud data being accessible by the plurality of business entities for use as benchmark data.

13. The method according to claim 12, wherein the step of determining includes aggregating the direct fraud loss, fraud operating cost and opportunity cost of the plurality of business entities.

14. The method according to claim 12, wherein:
the step of receiving includes receiving the sales data and operating cost data from a plurality of issuers; and
the determined reference cost of fraud data relate to average direct fraud loss, average fraud operating cost and average opportunity cost among the plurality of issuers.

15. The method according to claim 12, wherein:
the step of receiving includes receiving the sales data and operating cost data from a plurality of acquirers; and
the determined reference cost of fraud data relate to average direct fraud loss, average fraud operating cost and average opportunity cost among the plurality of acquirers.

16. The method according to claim 12, wherein:
the step of receiving includes receiving the sales data and operating cost data from a plurality of merchants; and
the determined reference cost of fraud data relate to average direct fraud loss, average fraud operating cost and average opportunity cost among the plurality of merchants.

17. The method according to claim 12, wherein:
the step of determining includes determining, as part of the reference cost of fraud data, an average fraud operating cost, wherein
the fraud operating cost includes operating expenses associated with activities of prevention, detection, investigation and recovery of fraud loss associated with the financial presentation devices.

18. The method according to claim 12, wherein the step of determining includes allocating to the opportunity cost one or more of:
a revenue loss due to incorrect declines of the financial presentation devices; and
a revenue loss due to decreased user confidence as a result of fraud related to the financial presentation devices of the users.

19. The method according to claim 12, wherein the step of determining includes allocating to the opportunity cost one or more of:
a revenue loss associated with compromised accounts; and
a revenue loss during the replacement period of the financial presentation devices.

20. The method according to claim 12, wherein the step of determining includes determining as part of the direct fraud loss, based on the received sales data and cost data, a first party fraud loss representing losses attributed to misrepresentation of usage by authorized holders of the financial presentation devices.

21. The method according to claim 12, wherein the step of determining includes determining, as part of the fraud operating cost, expenses related to information technology system, which are attributable to fraud operations.

22. The method according to claim 12, wherein the step of receiving includes receiving one or more of the following:
cost data related to information technology system, which is attributable to fraud operations;

cost data related to received telephone calls, which is attributable to inquiries related to fraud;

cost data related to outbound telephone calls to users of the financial presentation devices, which is attributable to inquiries related to fraud; and cost data related to replacement of the financial presentation devices, which is attributable to fraud.

23. The system of claim 1, wherein the financial presentation device is a credit card, debit card, or prepaid card.

24. The method of claim 12, wherein the financial presentation device is a credit card, debit card, or prepaid card.

\* \* \* \* \*